(12) United States Patent
Chittoor et al.

(10) Patent No.: US 8,595,113 B1
(45) Date of Patent: Nov. 26, 2013

(54) FACILITY FOR THE FINDING, ACQUISITION, AND MAINTENANCE OF INTELLECTUAL PROPERTY ASSETS

(76) Inventors: Venkataraman Chittoor, Newcastle, WA (US); Muthiah Kumarappa Annamalai, Sammamish, WA (US); Brent Frei, Bellevue, WA (US); Dimitri Dadiomov, Menlo Park, CA (US); Chris Olds, Bellevue, WA (US); Keith Ragusa, Seattle, WA (US); Mark Waddle, Sammamish, WA (US)

( * ) Notice: Subject to any disclaimer, the term of this patent is extended or adjusted under 35 U.S.C. 154(b) by 1101 days.

(21) Appl. No.: 12/013,392

(22) Filed: Jan. 11, 2008

(51) Int. Cl.
*G06Q 40/00* (2012.01)

(52) U.S. Cl.
USPC .............................. 705/36 R; 705/35; 705/37

(58) Field of Classification Search
USPC ........ 705/36 R, 30, 37, 310, 500, 27, 39, 1.1, 705/35; 715/230, 229, 233
See application file for complete search history.

(56) References Cited

U.S. PATENT DOCUMENTS

| | | | |
|---|---|---|---|
| 5,999,907 A | 12/1999 | Donner | |
| 6,154,725 A | 11/2000 | Donner | |
| 6,263,314 B1 | 7/2001 | Donner | |
| 6,556,992 B1 | 4/2003 | Barney et al. | |
| 6,931,389 B1 | 8/2005 | Bleizeffer et al. | |
| 6,952,698 B2 | 10/2005 | Delaire et al. | |
| 7,092,935 B2 | 8/2006 | Yourlo et al. | |
| 7,292,994 B2 | 11/2007 | Prokoski | |
| 7,546,265 B1 | 6/2009 | Donner | |
| 7,634,455 B1 | 12/2009 | Keene et al. | |
| 7,716,103 B1 | 5/2010 | Donner | |
| 7,835,969 B1 | 11/2010 | Donner | |
| 7,865,959 B1 | 1/2011 | Lewis | |
| 8,145,506 B2 | 3/2012 | Haskell et al. | |
| 2001/0034695 A1* | 10/2001 | Wilkinson ...................... | 705/37 |
| 2002/0004775 A1 | 1/2002 | Kossovsky et al. | |
| 2002/0095368 A1 | 7/2002 | Tran | |
| 2002/0143760 A1 | 10/2002 | Kim et al. | |
| 2004/0153374 A1 | 8/2004 | Nelson | |
| 2004/0220842 A1 | 11/2004 | Barney | |
| 2005/0108118 A1* | 5/2005 | Malackowski et al. ......... | 705/30 |
| 2005/0256777 A1 | 11/2005 | Kotera et al. | |
| 2005/0261927 A1 | 11/2005 | Bilak et al. | |
| 2006/0010055 A1 | 1/2006 | Morita et al. | |
| 2006/0036635 A1 | 2/2006 | Williams | |
| 2006/0259315 A1* | 11/2006 | Malackowski et al. ........... | 705/1 |
| 2007/0088645 A1* | 4/2007 | Lin .............................. | 705/36 R |
| 2007/0136373 A1 | 6/2007 | Piasecki et al. | |
| 2007/0244837 A1 | 10/2007 | Plow et al. | |
| 2007/0276796 A1 | 11/2007 | Sampson | |

(Continued)

OTHER PUBLICATIONS

"Anaqua—Patent Management." Anaqua, Inc., Jul. 24, 2008. URL: http://www.anaqua.com/products/patents.html.

(Continued)

*Primary Examiner* — Behrang Badii
(74) *Attorney, Agent, or Firm* — Perkins Coie LLP

(57) ABSTRACT

A facility for the finding, acquisition, and maintenance of intellectual property assets is described. The facility receives an indication of potentially acquirable intellectual property assets. The facility qualifies the potentially acquirable intellectual property assets using pre-determined qualification criteria. The facility receives an indication of the value of the potentially acquirable intellectual property assets. The facility provides information regarding the potentially acquirable intellectual property assets to a user for use in negotiating the acquisition of one or more of the potentially acquirable intellectual property assets.

40 Claims, 66 Drawing Sheets

(56) References Cited

U.S. PATENT DOCUMENTS

| | | |
|---|---|---|
| 2008/0005103 A1 | 1/2008 | Ratcliffe et al. |
| 2008/0126951 A1 | 5/2008 | Sood et al. |
| 2008/0140641 A1 | 6/2008 | Wang |
| 2008/0294683 A1 | 11/2008 | Graham et al. |
| 2009/0171858 A1* | 7/2009 | Kwitek ............ 705/36 R |
| 2009/0182739 A1 | 7/2009 | Crockett et al. |
| 2009/0300016 A1 | 12/2009 | Kile, Jr. |
| 2009/0328105 A1 | 12/2009 | Craner et al. |
| 2010/0262653 A1 | 10/2010 | Chaffee et al. |

OTHER PUBLICATIONS

Jensen, C. "Clientdataset Aggregates and GroupState," 2002, captured from <edn.embarcadero.com/article/29272>, 1 page.

* cited by examiner

FIG. 4

| PQR | Subject | #Pats | Date | LP1 | LP2 | LP3 | LP4 | LP5 | LP6 |
|---|---|---|---|---|---|---|---|---|---|
| □ PQR1 | PQR | 1 | 6/8/2007 | 1 | 1 | 1 | 0 | 0 | |
| □ PQR2 | | 1 | 4/3/2007 | 0 | 0 | 0 | 0 | 0 | |
| □ PQR3 | Pqr | 1 | 3/27/2007 | 1 | 0 | 1 | 0 | 0 | |
| □ PQR4 | PQR | 4 | 12/22/2006 | 0 | 0 | 0 | 0 | 0 | |
| □ PQR5 | PQR | 6 | 12/14/2006 | 3 | 0 | 3 | 0 | 0 | |
| □ PQR6 | PQR Test 3 | 1 | 12/14/2006 | 4 | 1 | 5 | 0 | 0 | |
| □ PQR7 | Test subject | 1 | 11/28/2006 | 1 | 0 | 1 | 0 | 0 | |
| □ PQR8 | Test subject | 1 | 11/28/2006 | 1 | 0 | 1 | 0 | 0 | |
| □ PQR9 | PQR TEST | 1 | 11/28/2006 | 1 | 0 | 1 | 0 | 0 | |
| □ PQR10 | Test subject | 1 | 11/28/2006 | 1 | 0 | 1 | 0 | 0 | |
| □ PQR11 | Test subject | 1 | 11/28/2006 | 1 | 0 | 1 | 0 | 0 | |
| □ PQR12 | PQR | 1 | 11/28/2006 | 1 | 0 | 1 | 0 | 0 | |
| □ PQR13 | PQR | 2 | 11/28/2006 | 2 | 0 | 2 | 0 | 0 | |
| □ PQR14 | | 2 | 11/28/2006 | 2 | 0 | 2 | 0 | 0 | |
| □ PQR15 | Test subject | | | | | | | | |

*FIG. 9*

Request a New TAS

- At which level would you like to specify the TAS fields? (priority, target date, format, message)
  - ⦿ Use the Same Values for all TAS.
  - ○ Specify the values for each TAS individually.

Priority: ⦿ Normal ○ High
Target Date: 11/30/2007
Final Valuation Due Date: 11/26/2007
Format: ⦿ Online TAS ⦿ Spreadsheet TAS
Message to the analyst:
Test Message

| TAS | | |
|---|---|---|
| 1 | Test Message | |
| | Semiconductor | |

Test Deal

Home > TAS Summary     Assets|My PQRs|Search PQRs|My TAS|Deals|Tech|Tech Eval|Diligence|Intake|Priority View|OPS Query|Reports|Admin|Help Deal: Name ~1805     < Return

TAS_ ~1810

| | | | | | | | | | | | | | | |
|---|---|---|---|---|---|---|---|---|---|---|---|---|---|---|
| Analyst: | Name | | Assigned by: | Name | | | | Priority: | Normal | | | | | |
| Date completed: | 5/31/2007 | | Date requested: | 4/24/2007 | | | | Target date: | 5/14/2007 | | | | | |

| | Asset | Title | Technology Area | Key Valuation | Current Use | Relevant to Standards | Validity Opinion | Closest Relevant Art | Indep. Claims | Current Value | Current Value Explanation | Claim Technical Scope | Licensee Candidates |
|---|---|---|---|---|---|---|---|---|---|---|---|---|---|
| 1 View Analysis | xxxxxx | Title 4,000,000 | Area | Value | Widely Used | | | | x | | — | — | |
| 2 View Analysis | xxxxxx | Title 4,000,001 | Area | Value | Widely Used | | | | x | | — | — | |
| 3 View Analysis | xxxxxx | Title 4,000,002 | Area | Value | Widely Used | | | | x | | — | — | |

TCLs
Plan 2: Kno. Est. Total Assets
| | Kno. | Est. | Total | | | Active Expired Totals | | | | | | |
|---|---|---|---|---|---|---|---|---|---|---|---|---|
| Plan 2: | 3 | 0 | 3 | | | Kno. Est. Tot. Kno. Est. Tot. Kno. Est. Tot | | | | | | |
| LP1 | 3 | 0 | 3 | US Pats | | 3 | 0 | 3 | 0 | 0 | 0 | 3 | 0 | 3 |
| LP2 | 3 | 1 | 3 | US Apps | | 0 | 0 | 0 | 0 | 0 | 0 | 0 | 0 | 0 |
| LP3 | 1 | 0 | 1 | Intl Pats | | 0 | 0 | 0 | 0 | 0 | 0 | 0 | 0 | 0 |
| LP4 | 0 | 0 | 0 | Intl Apps | | 0 | 0 | 0 | 0 | 0 | 0 | 0 | 0 | 0 |
| LP5 | 0 | 0 | 0 | Totals | | 3 | 0 | 3 | 0 | 0 | 0 | 3 | 0 | 3 |
| LP6 | 0 | 0 | 0 | | | | | | | | | |

Save and Manage Assets

▼ Technology In Progress | DEAL ASSET TAS VIEW | Request New Final Valuation | IMPORT TAS | Request TAS

Portfolio Architect — 1202

Notes:
Assigning to PA for Tech valuation

Date Moved to Valuation: 11/24/2007    Assigned on 107 11/24/2007
TAS complete for all Assets? ☒Yes  Priority Drop Dead Date: 11/30/2007
Final Valuation Requested: (not yet requested)
Final Valuation Due Date: 11/26/2007
Final Valuation Complete? ☒Yes  Date Completed: 11/24/2007
Top Authorized Amount:
AN Template Received? ☒Yes Date Received: 11/24/2007
AN Topic Section Complete? ☒Yes Date Completed: 11/24/2007 — 1210

| | TAS | Analyst | Status | # | Priority | Request | Target | Comp. |
|---|---|---|---|---|---|---|---|---|
| | TAS | NAME | New | 3 | Normal | 11/24/07 | 11/30/07 | |
| | TAS | NAME | New | 3 | Normal | 11/24/07 | 11/30/07 | |

2905

Historical Technology Notes (0)

▶ Diligence    Status 1 – Diligence Requested    0% complete

▶ Intake    Status: Not yet requested    to request Intake, set the Intake Status ▶ Prosecution ▶ Finance ▶ Contract

Home > TAS Summary   Assets|My PQRs|Search PQRs|My TAS|Deals|Tech|Tech Eval|Diligence|Intake|Priority View|OPS Query|Reports|Admin|Help

| Color Key | Hot (Highest Importance) | Expected to fund this month | No deliverables | Handshake sent – Contract not executed |

| Final Valuation | Due Diligence | Intake - First Look | Intake - Resolving | Hot Funding |
|---|---|---|---|---|
| Deal Name | Deal Name | Deal Name | Deal Name | 0 Deals |
| Deal Name | Deal Name | Deal Name | Deal Name | Funding |
| Deal Name | Deal Name | High Pri Deal | Deal Name | 0 Deals |
| Deal Name | Deal Name | Deal Name | Deal Name | Recently Funded |
| Deal Name | Deal Name | Deal Name | Deal Name | Deal Name |
| Deal Name | Deal Name | Deal Name | Deal Name | Deal Name |
| Deal Name | Deal Name | Deal Name | Deal Name | Deal Name |
| Deal Name | Deal Name | Deal Name | Deal Name | Recently On-Hold |
| Deal Name | Deal Name | Deal Name | Deal Name | Deal Name |
| Deal Name | Deal Name | Deal Name | Deal Name | Deal Name |
| Deal Name | Deal Name | Deal Name | Deal Name | Recently Busted |
| Deal Name | Deal Name | Deal Name | Deal Name | Deal Name |
| Deal Name | Deal Name | Deal Name | Deal Name | Deal Name |
| Deal Name | Deal Name | Deal Name | Deal Name | Deal Name |
| Deal Name | Deal Name | Deal Name | Deal Name | Deal Name |
| Deal Name | Deal Name | Deal Name | Deal Name | |
| Deal Name | Deal Name | Deal Name | Deal Name | |
| Deal Name | Deal Name | Deal Name | Deal Name | |

Home > TAS Summary     Assets|My PQRs|Search PQRs|My TAS|Deals|Tech|Tech Eval|Diligence|Intake|Priority View|OPS Query|Reports|Admin|Help

| Color Key | Hot (Highest) Importance | Expected to fund this month | No deliverables | Handshake sent – Contract not executed |
|---|---|---|---|---|

| Final Valuation | Due Diligence | | Intake - First Look | 2505 | Intake - Resolving | | Hot Funding |
|---|---|---|---|---|---|---|---|
| Deal Name | Deal Name | ▥ | Deal Name | ▥ | Deal Name | | 0 Deals |
| Deal Name | Deal Name | ▥ | Deal Name | ▥ | Deal Name | | Funding |
| Deal Name | Deal Name | ▥ | High Pri Deal | ▥ | Deal Name | | 0 Deals |
| Deal Name | Deal Name | ▥ | Deal Name | ▥ | Deal Name | | Recently Funded |
| Deal Name | Deal Name | ▥ | Deal Name | ▥ | Deal Name | ▥ | Deal Name |
| Deal Name | Deal Name | ▥ | Deal Name | ▥ | Deal Name | ▥ | Deal Name |
| Deal Name | Deal Name | ▥ | Deal Name | ▥ | Deal Name | ▥ | Deal Name |
| Deal Name | Deal Name | ▥ | Deal Name | ▥ | Deal Name | | Recently On-Hold |
| Deal Name | Deal Name | ▥ | Deal Name | ▥ | Deal Name | ▥ | Deal Name |
| Deal Name | Deal Name | ▥ | Deal Name | ▥ | Deal Name | ▥ | Deal Name |
| Deal Name | Deal Name | ▥ | Deal Name | ▥ | Deal Name | | Recently Busted |
| Deal Name | Deal Name | ▥ | Deal Name | ▥ | Deal Name | ▥ | Deal Name |
| Deal Name | Deal Name | ▥ | Deal Name | ▥ | Deal Name | ▥ | Deal Name |
| Deal Name | Deal Name | ▥ | Deal Name | ▥ | Deal Name | ▥ | Deal Name |
| Deal Name | Deal Name | ▥ | Deal Name | ▥ | Deal Name | ▥ | Deal Name |
| Deal Name | Deal Name | ▥ | Deal Name | ▥ | Deal Name | ▥ | Deal Name |
| Deal Name | Deal Name | ▥ | Deal Name | ▥ | Deal Name | | |
| Deal Name | Deal Name | ▥ | Deal Name | ▥ | Deal Name | | |

Home > TAS Summary     Assets|My PQRs|Search PQRs|My TAS|Deals|Tech|Tech Eval|Diligence|Intake|Priority View|OPS Query|Reports|Admin|Help Unassigned Diligence Requests (85)

| Deal | DiligenceLead | PreIntakeLead | Status | Date Requested | Diligence Target Date | PreIntake Target Date |
|---|---|---|---|---|---|---|
| Deal Name | Lead Name | (un-assigned) | 2-Diligence In Progress | 2/27/2007 | 3/30/2007 | |
| Deal Name | Lead Name | (un-assigned) | 3.1-Pre-Intake Requested | 5/26/2007 | | 7/18/2007 |
| Deal Name | Lead Name | (un-assigned) | 2-Diligence In Progress | 5/29/2007 | | |
| Deal Name | (un-assigned) | (un-assigned) | 1-Diligence Requested | 11/29/2007 | | |
| Deal Name | (un-assigned) | (un-assigned) | 1-Diligence Requested | 11/20/2007 | | |
| Deal Name | (un-assigned) | (un-assigned) | 1-Diligence Requested | 10/29/2007 | | |
| Deal Name | (un-assigned) | (un-assigned) | 1-Diligence Requested | 12/4/2007 | | |
| Deal Name | (un-assigned) | (un-assigned) | 1-Diligence Requested | 12/4/2007 | | |
| Deal Name | (un-assigned) | (un-assigned) | 1-Diligence Requested | 11/29/2007 | | |
| Deal Name | (un-assigned) | (un-assigned) | 1-Diligence Requested | Thu 12/13 | | |
| Deal Name | (un-assigned) | (un-assigned) | 1-Diligence Requested | Fri 12/14 | | |
| Deal Name | (un-assigned) | (un-assigned) | 1-Diligence Requested | 11/13/2007 | | |
| Deal Name | (un-assigned) | (un-assigned) | 1-Diligence Requested | 12/10/2007 | | |
| Deal Name | (un-assigned) | (un-assigned) | 1-Diligence Requested | 11/12/2007 | | |

Expand All   Collapse All

Assigned Diligence (10)
- Lead Name (2)
- Lead Name (2)
- Lead Name (1)
- Lead Name (3)
- Lead Name (2)

Expand All   Collapse All

Assigned Pre-Intake (15)
- Lead Name (1)
- Lead Name (4)
- Lead Name (3)

MDR_

| Deal Number | Outside Counsel Assigned | TAS Rating | Tech Category | Class Codes | Group Art Unit | Patent No. | Country | Title | Inventors | Patent Date | Appln No. | Appln Date | 371 Filing Date |
|---|---|---|---|---|---|---|---|---|---|---|---|---|---|
| | | | | Class Code Information | Number | Number | US | Title | Inventor(s) | Date | Number | Date | |
| | | | | Class Code Information | Number | Number | US | Title | Inventor(s) | Date | Number | Date | |
| | | | | Class Code Information | | Number | US | Title | Inventor(s) | | Number | Date | |

| MDR_ | | | | | | | | | | | | | |
|---|---|---|---|---|---|---|---|---|---|---|---|---|---|
| Deal Name | Deal Number | Outside Counsel Assigned | TAS Rating | Tech Category | Class Codes | Group Art Unit | Patent No. | Country | Title | Inventors | Patent Date | Appln No. | Appln Date |
| | | | | | Class Code Information | Number | Number | US | Title | Inventor(s) | Date | Number | Date |
| | | | | | | | | | | | | | |
| | | | | | Class Code Information | Number | Number | US | Title | Inventor(s) | Date | Number | Date |
| | | | | | | | | | | | | | |

▼ Intake          Status: Not yet requested          to request Intake, set the Intake Status Date Moved to Intake  11/21/07
              Status  0-Diligence Requested
Level of Intake Review  [Make a selection]
   Percent Complete  0%

Estimated Start Date  [    ]    Estimated Complete Date  [    ]
      Intake Due Date  [    ]       Intake Drop Dead Date  [    ]

Intake First Look
        Intake Lead  [Not assigned]
   Intake Deliverables
          Received?  ☑ Yes  Date Received  11/29/07
Resolving Issues
 First Look Complete Date  [          ]
Most Recent Deliverables  ☐ Yes  Date Received  [    ]
          Received?  Complete  ☐

Notes:

Historical Intake Notes (0)

Home > TAS Summary   Assets|My PQRs|Search PQRs|My TAS|Deals|Tech|Tech Eval|Diligence|Intake|Priority View|OPS Query|Reports|Admin|Help Unassigned Intake Requests (30)

| Deal | Status | Date Requested | Intake Target Date |
|---|---|---|---|
| Deal Name | 0 - Intake Requested | 2/15/2007 | |
| Deal Name | 0 - Intake Requested | | |
| Deal Name | 0 - Intake Requested | 2/27/2007 | |
| Deal Name | 0 - Intake Requested | 1/30/2007 | |
| Deal Name | 0 - Intake Requested | Today 9:56 AM | |
| Deal Name | 0 - Intake Requested | 7/1/2007 | |
| Deal Name | 0 - Intake Requested | 10/18/2007 | |
| Deal Name | 0 - Intake Requested | 11/7/2007 | |
| Deal Name | 0 - Intake Requested | 7/27/2007 | |
| Deal Name | 0 - Intake Requested | 9/16/2007 | |
| Deal Name | 0 - Intake Requested | | |
| Deal Name | 0 - Intake Requested | 5/18/2007 | |
| Deal Name | 0 - Intake Requested | 5/7/2007 | |
| Deal Name | 0 - Intake Requested | 10/22/2007 | |

{ 3305

Assigned Intake       Expand All  Collapse All

- Lead Name (72)
- Lead Name (13)
- Lead Name (7)
- Lead Name (13)
- Lead Name (15)
- Lead Name (1)
- Lead Name (16)
- Lead Name (1)
- Lead Name (1)
- Lead Name (1)
- Lead Name (1)
- Lead Name (3)

◄ Intake   Status: 1 – Intake In Progress                                0% complete Date Moved to Intake: 11/8/2007

Status: [1 - Intake In Progress ▼]

Level of Intake Review: [Full Intake ▼]

Percent Complete: [0%]

Estimated Start Date: [11/08/2007] 📅    Estimated Complete Date: [11/13/2007] 📅

Intake Due Date: [____] 📅              Intake Drop Dead Date: [____] 📅

Intake First Look

Intake Lead: [Intake Lead ▼]

Initial Deliverables Received ☐Yes  Date Received: [____] 📅  Assigned on: [08/28/2007] 📅

Resolving Issues

First Look Complete Date: [____] 📅

Most Recent Deliverables Received? ☐Yes  Date Received: [____] 📅

Complete ☐

Notes:

Historical Intake Notes (0)

| Deal Name | Deal Number | Outside Counsel Assigned | TAS Rating | Tech Category | MDR_ Class Codes | Group Art Unit | Patent No. | Country | Title | Inventors | Patent Date | Appln No. | Appln Date |
|---|---|---|---|---|---|---|---|---|---|---|---|---|---|
| | | | | | Class Code Information | Number | Number | US | Title | Inventor(s) | Date | Number | Date |
| | | | | | | | | | | | | | |
| | | | | | Class Code Information | Number | Number | US | Title | Inventor(s) | Date | Number | Date |
| | | | | | | | | | | | | | |

3500

*FIG. 35A* xxxxxxxxxxxxxxxxxxxxxxxxxxxxxxxx_Seller Actions Report

| FILE NO | STATUS | DOCUMENT ISSUES | TITLE ISSUES | SELLER ACTION | RESOLUTION/ DATE |
|---|---|---|---|---|---|
| All Assets | | | Substantially all seller's assets are included in deal. | Provide consent of Member/ Managers of LLC approving the transactions pursuant to the PPA. | |
| ########## | Expired | | Unable to verify current owner. | Provide documentation current owner. | |
| ########## | Expired | | Unable to verify applicant. | Provide documentation confirmation application. | |
| ########## | | | Unable to verify current owner. | Provide documentation current owner. | |
| ########## | Expired | | Unable to verify applicant. | Provide documentation confirmation application. | |
| ########## | | | Unable to verify current owner. | Provide documentation current owner. | |
| ########## | Expired | | Unable to verify applicant. | Provide documentation confirmation application. | |
| ########## | | | Unable to verify current owner. | Provide documentation current owner. | |

*FIG. 35B*

Home > Deal View | Assets | My PQRs | Search

Deal Info

| | | | |
|---|---|---|---|
| Name: | Test Deal | ID: 5767 | |
| State: | Active ▽ | Stage: 5-Closing ▽ | |
| Deal Owner: | | | Save and View Deal Flow Email |
| Finder: | ▽ | Fee: Percent: 3.0% | State history |
| Seller's Legal Name: | | View PQR | Active   Today 11/24 |
| Asking Price: | | Mark as Reverse Deal | Stage history |
| Offer Price: | | | 5-Closing    Today 11/24 |
| Importance: | Normal ▽ | Save and View Handshake | 4-Negotiation Today 11/24 |
| | | | 3-Valuation  Today 11/24 |
| | | | 2-Qualify    Today 11/24 |
| | | | 1-Prospecting Today 11/24 |

Notes: Seller Prospecting to Sell their Assets

Marketing Info

| | | Costs | |
|---|---|---|---|
| Region: | ▽ | Upfront Price: | |
| Segment: | ▽ | PerApp Issuance Fee: | |
| Competitor: | | Other Costs: | |
| Technology Area(s): | 1 | Total Finders' Fee: | |
| Licensee(s): | None | Acquisition Cost: | |
| | | Cost Per Asset: | |
| | | Profit Participation: % | |

TCLs

| | Kno. | Est. | Total |
|---|---|---|---|
| Plan 2: | 3 | 0 | 3 |
| LP1 | 3 | 0 | 3 |
| LP2 | 3 | 0 | 3 |
| LP3 | 3 | 0 | 3 |
| LP4 | 3 | 0 | 3 |
| LP5 | 3 | 0 | 3 |
| LP6 | 3 | 0 | 3 |

Assets

| | Active | | | Expired | | | Totals | | |
|---|---|---|---|---|---|---|---|---|---|
| | Kno. | Est. | Tot. | Kno. | Est. | Tot. | Kno. | Est. | Tot. |
| US Patents: | 3 | 0 | 3 | 0 | 0 | 0 | 3 | 0 | 3 |
| US Applications: | 0 | 0 | 0 | 0 | 0 | 0 | 0 | 0 | 0 |
| Int'l Patents: | 0 | 0 | 0 | 0 | 0 | 0 | 0 | 0 | 0 |
| Int'l App's: | 0 | 0 | 0 | 0 | 0 | 0 | 0 | 0 | 0 |
| Totals: | 3 | 0 | 3 | 0 | 0 | 0 | 3 | 0 | 3 |

Save and Manage Assets

▼ Technology | TAS Complete for All Assets | Deal Asset TAS View | Request New Final Valuation | Import TAS | Request TAS ▼ Diligence | Status: 3.1 - Pre-Intake Requested Historical Deal Notes (0)

FIG. 36

| Entity, LPs |

ENTITY:

Entity Type     <u>Acquisition Entity</u>

[from Handshake]    [name]

Agreement Type as Proposed in the HS:

[from Handshake]

Agreement Type as Negotiated:

☐ PPA    With BE? ○ Yes ⊙ No    ☐ Other   [Other text required if other is checked]
☐ PLA    MPA? ○ Yes ⊙ No
☐ Other Date Assets Assigned    Date of Put Execution ☐ UpsideDown    [Date]            [Date]

LPs:

Current LPs: [from DealView, Assets]            Is Seller an LP? ○ Yes ⊙ No

SLPs pre-elected? ○ Yes ⊙ No [Text]       Advisory Committee Notified?
                                                  ○ Yes ⊙ No
LPs unelected? ○ Yes ⊙ No [Text]          Date Sent [Date]

Final LPs (at Funding)    Final LPs (at Notice)    Date Received [Date]

[Text]                     [Text]

CONTRACT:

Who has contract?
○ Us
○ Seller

IV may contact seller directly?
○ Yes
○ No

Date Contract Requested
[from Handshake]

First Draft Sent to DTL?
Date

FLP Approval Rec'd?
○ Yes
○ No

Assigned to OC for Drafting? ○ Yes ⦿ No

OC Assignment Date:
Date

Draft is with:
○ Us
○ Them

Amendments?

To contract:
○ Yes
○ No

To Price:
○ Yes
○ No

To Core Assets:
○ Yes
○ No

Date Sent/Received:
Date

Target Date for Draft:
Date

Name of most recent draft?
[name]

Date most recent draft?
Date

Date CM asked to review?
Date

Rec'd original signed contract
Date

Rec'd original signed exh. B/C:
Date

Date CM asked to review?
Date

Offer Sent:
Date

Due Date of Counter-Signature
Date

LICENSEES:

From the Deal Team:

[from DealView]

Known Licensees/CNTS:

Enter Text
Enter More Text

Potential Licensees:

Enter Text
Enter More Text

Grantback Section
As Proposed in HS:

[condensed from HS checklist]

As Negotiated:
- ☐ None  ☐ Nontransferable
- ☐ Transferable
  - # ☐ Times
  - ☐ Covered Products
  - ☐ Incremental Differences
  - ☐ With Sales Growth Cap
  - ☐ Unlimited ☐ Sale of Business Lines
☐ Seller + Affiliates
☐ Other  [Other text required if other is checked]

Licensees

Agreements, CIA

AGREEMENTS:

NDA?    Type?        Date signed        What it covers:
○ Yes    ○ 1 Way      [Date]            Enter Text
⦿ No     ○ 2 Way                       Enter More Text Consulting        Date signed      Parties:
Agreement:        [Date]            Enter Text
○ Yes                                     Enter More Text
⦿ No                # of Years       Key Terms:
                            [Text]            Enter Text
Period [monthly/qtrly...]   Rate/hr.         Enter More Text
[select type]           [number]
                            Amount         Termination Conditions
                            [number]        Enter Text
                                                     Enter More Text

COMMON INTEREST AGREEMENT (CIA):
CIA Executed for Seller? ○ Yes ⦿ No
Rec'd CIA executed for Seller and our OC:
[Date]

UCC REVIEW/SEARCH:

Clear      UCC Search Performed

[name]      [Date]

Issues

[name]

CORPORATE REVIEW: ○ Yes ● No

Existence      Issues

[name]      [name]

DIVERSION? ● Yes ○ No

| Factors: | No | Yes | |
|---|---|---|---|
| FLP Approval Required? | ☑ | ☐ | |
| Need Unpublished Apps? | ☑ | ☐ | |
| More than 5 Assets? | ☑ | ☐ | (can be calculated) |
| Are there Foreigns? | ☑ | ☐ | (can be calculated) |
| Elongated COT (more than 2)? | ☑ | ☐ | |
| Security Interests? | ☑ | ☐ | |
| Existence Lapsed? | ☑ | ☐ | |
| Substantially All Assets? | ☑ | ☐ | |
| University? | ☑ | ☐ | |

UCC, Corporate Review, Diversion

ACQUISITION NOTICE:

VLP? Amount: TCO Drafted?
○ Yes [amount] Date
⦿ No

| | Patent Topics | Licensing Topics | |
|---|---|---|---|
| Draft Circulated | Write-Up Rec'd | Write-Up Rec'd | |
| Date | Date | Date | |
| Preview Circulated | Add'l write-up Rec'd | Add'l write-up Rec'd | Preview Approved |
| Date | Date | Date | Date |
| Preview Re-circulated | Add'l write-up Rec'd | Add'l write-up Rec'd | Review Approved |
| Date | Date | Date | Date |
| Review Circulated | | | |
| Date | | | |

AN Sent? Scheduled Send Date: Date Sent:
○ Yes Date Date
⦿ No

COUNSEL:

Primary OC for Acquisition:

POC: [name]

DV, Contracts OC Acq list

Address:
Street1
Street1
City, State ZIP
(International)

Phone [name]
Email [name]

Secondary OC for Acquisition:

POC: [name]

DV, Contracts OC Acq list

Address:
Street1
Street1
City, State ZIP
(International)

Phone [name]
Email [name]

Tertiary OC for Acquisition:

POC: [name]

DV, Contracts OC Acq list

Address:
Street1
Street1
City, State ZIP
(International)

Phone [name]
Email [name]

Counsel

Contract Summary Sheet

| | No | Yes | |
|---|---|---|---|
| Convenant to License? | ☑ | ☐ | |
| Seller License? | ☑ | ☐ | |
| Are there Licensees/CNTS? | ☑ | ☐ | |
| ☐ Exhibit | | | |
| ☐ Black List | | | |
| ☐ White List | | | |
| Assertion/Invitation to License | ☑ | ☐ | Details |
| Letters? | ☑ | ☐ | Details |
| Issue Bonus? | ☑ | ☐ | Details |
| NonStandard Reporting? | ☑ | ☐ | Details |
| NonStandard Backend? | ☑ | ☐ | Details |
| Restrictions to/Notice on Abandonment? | ☑ | ☐ | Details |
| Obligation to keep certain Assets alive? | ☑ | ☐ | Details |
| Obligation to Use Certain OC? | ☑ | ☐ | Details |
| Seller Manages Prosecution Admin? | ☑ | ☐ | Details |
| Additional Payment? | ☑ | ☐ | Details |
| Consulting Agreements? | ☑ | ☐ | Details |
| Has the Notice Changed? | ☑ | ☐ | Details |
| ☐ Discl. accepted | | | |
| ☐ App filed | | | |
| Excluded Assets from families? | ☑ | ☐ | Details |
| ☐ CIP | | | Details |
| ☐ Other | | | Details |

Enter Text
Enter More Text

[Send Asset List Email]

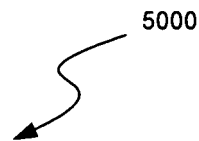
FIG. 50
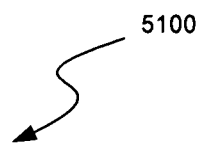
FIG. 51

FIG. 52

Action Details Screen (Dependent on Action Selected) — 5200

| Field | Value |
|---|---|
| IV Docket: | Non-Editable Text from IPM |
| OC Docket: | Non-Editable Text from IPM |
| Appl. #: | Non-Editable Text from IPM |
| Patent #: | Non-Editable Text from IPM |
| Status: | Non-Editable Text from IPM |
| Country: | Non-Editable Text from IPM |
| Deal: | Non-Editable Text from IPM |

Action: Non-Editable Text
Portfolio Administrator: PA from IPM

Reply-To: Enter Text
(Attorney Email Address)

Comments: Enter Text / Enter More Text

Date Mailed: Enter Text
Due Date: Enter Text

[Attach Office Action] [Attach Draft Response] [Submit] [Cancel]

HELP

| Working Attorney | | | | | | | |
|---|---|---|---|---|---|---|---|
| Select Attorney | | | | | | | |
| | 25 Due Next | Order by OC | Order by Action | 5510 | | | |

| Action | # |
|---|---|
| Office Action | 33 |
| Final Office Action | 23 |
| Notice of Allowance/Continuation Recommendation | 11 |
| Restriction Requirement/Divisional Proposal | 5 |
| Broadening Reissue | 16 |
| Foreign Filing Decision | 21 |
| National Stage Decision | 9 |
| Other | 8 |

Final Office Action

| Due Date | IV Docket # | Deal | Country | Serial # | Patent # | Title | TAS |
|---|---|---|---|---|---|---|---|

Asset Transaction History

Asset Information

Deal: ..........    App #: ..........    Title #: ..........

IV Docket: ..........    Patent #: ..........    Action: ..........

Country: ..........    Firm: ..........    Mail Date: ..........

Status: ..........    Atty: ..........    Due Date: ..........

TAS

| Submission Date | Submitted By | Action Type | Action Due Date | Status | Working Attorney | Action Completed Date |
|---|---|---|---|---|---|---|
| | | | | | | |

FACILITY FOR THE FINDING, ACQUISITION, AND MAINTENANCE OF INTELLECTUAL PROPERTY ASSETS

CROSS-REFERENCE TO RELATED APPLICATIONS

This application is related to the following co-pending U.S. Patent Applications: 1) U.S. patent application Ser. No. 12/008,673 (entitled DEAL MANAGEMENT FOR A FACILITY FOR THE FINDING AND ACQUISITION OF INTELLECTUAL PROPERTY ASSETS); 2) U.S. patent application Ser. No. 12/008,685 (entitled PATENT QUERY REPORTING FOR A FACILITY FOR THE FINDING AND ACQUISITION OF INTELLECTUAL PROPERTY ASSETS); 3) U.S. patent application Ser. No. 12/008,671 (entitled DEAL ASSET MANAGEMENT FOR A FACILITY FOR THE FINDING AND ACQUISITION OF INTELLECTUAL PROPERTY ASSETS); 4) U.S. patent application Ser. No. 12/008,672 (entitled ANALYSIS AND VALUATION MANAGEMENT FOR A FACILITY FOR THE FINDING AND ACQUISITION OF INTELLECTUAL PROPERTY ASSETS); 5) U.S. patent application Ser. No. 12/008,686 (entitled STRATEGIC MANAGEMENT FOR A FACILITY FOR THE FINDING AND ACQUISITION OF INTELLECTUAL PROPERTY ASSETS); 6) U.S. patent application Ser. No. 12/008,687 (entitled PORTFOLIO MANAGEMENT FOR A FACILITY FOR THE FINDING AND ACQUISITION OF INTELLECTUAL PROPERTY ASSETS); 7) U.S. patent application Ser. No. 12/008,674 (entitled MASTER DILIGENCE REVIEW FOR A FACILITY FOR THE FINDING AND ACQUISITION OF INTELLECTUAL PROPERTY ASSETS); 8) U.S. Patent Application No. 61/010,958 (entitled DILIGENCE MANAGEMENT FOR A FACILITY FOR THE FINDING AND ACQUISITION OF INTELLECTUAL PROPERTY ASSETS); and 9) U.S. Patent Application No. 61/010,957 (entitled INTAKE MANAGEMENT FOR A FACILITY FOR THE FINDING AND ACQUISITION OF INTELLECTUAL PROPERTY ASSETS), each of which is hereby incorporated by reference in its entirety.

TECHNICAL FIELD

The present invention is generally directed toward workflow automation.

BACKGROUND

Intellectual property assets, such as U.S. patents, U.S. patent applications, non-U.S. patents, and non-U.S. patent applications, are generally transferable. Accordingly, it can be desirable in some circumstances to acquire existing intellectual property assets.

BRIEF DESCRIPTION OF THE DRAWINGS

FIG. 4 is a display diagram showing a sample display presented by the facility in connection with the creation of a new Deal in some embodiments.

FIGS. 8-10 are display diagrams showing sample displays presented by the facility in connection with Patent Query Reports in some embodiments.

FIGS. 13A and 13B are display diagrams showing sample displays presented by the facility in connection with requests for Technical Analysis Spreadsheets for Deal assets in some embodiments.

FIG. 16 is a display diagram showing a sample display presented by the facility in connection with a Technical Analysis Spreadsheet Request being assigned to an External Analyst in some embodiments.

FIG. 17 is a display diagram showing a sample display presented by the facility in connection with a Technical Evaluation view in some embodiments.

FIG. 20 is a display diagram showing a sample display presented by the facility in connection with a completed Technical Analysis Summary view in some embodiments.

FIGS. 21 and 22 are display diagrams showing sample displays presented by the facility in connection with a technical analysis done by an External Analyst in some embodiments.

FIG. 23 is a display diagram showing a sample display presented by the facility in connection with another Technical Analysis Summary view in some embodiments.

FIG. 24 is a display diagram showing a sample display presented by the facility in connection with a Deal for which the technical analysis has been completed in some embodiments.

FIGS. 25A-C are display diagrams showing sample displays presented by the facility in connection with the priority of a Deal being changed in some embodiments.

FIG. 26 is a display diagram showing a sample display presented by the facility in connection with a Deal in a Negotiation stage in some embodiments.

FIG. 27 is a display diagram showing a sample display presented by the facility in connection with a Deal for which Diligence has been requested in some embodiments.

FIG. 28 is a display diagram showing a sample display presented by the facility in connection with a Diligence Manager view in some embodiments.

FIG. 29 is a display diagram showing a sample display presented by the facility in connection with the assignment of a Deal to a Diligence Lead in some embodiments.

FIGS. 30 and 31 are display diagrams showing sample displays presented by the facility in connection with Diligence Sheets in some embodiments.

FIG. 32 is a display diagram showing a sample display presented by the facility in connection with a Deal for which Intake has been requested in some embodiments.

FIG. 33 is a display diagram showing a sample display presented by the facility in connection with an Intake Manager view in some embodiments.

FIG. 34 is a display diagram showing a sample display presented by the facility in connection with a Deal for which Intake has been requested in some embodiments.

FIG. 35A is a display diagram showing a sample display presented by the facility in connection with an Intake Sheet for a Deal in some embodiments.

FIG. 35B is a display diagram showing a sample display presented by the facility in connection with a Problems Report in some embodiments.

FIG. 36 is a display diagram showing a sample display presented by the facility in connection with a Deal at a Contract stage in some embodiments.

FIGS. 37-45 are display diagrams showing sample displays presented by the facility in connection with aspects of Deal contracts in some embodiments.

FIG. 46 is a display diagram showing a sample display presented by the facility in connection with a Deal at a Closing stage in some embodiments.

FIGS. 50 and 51 are display diagrams showing sample displays presented by the facility in connection a Prosecution Action System in some embodiments.

FIG. 52 is a display diagram showing a sample display presented by the facility in connection with an action detail interface of a Prosecution Action System in some embodiments.

FIG. 55 is a display diagram showing a sample display presented by the facility in connection with a working attorney queue interface in some embodiments.

FIG. 56 is a display diagram showing a sample display presented by the facility in connection with an action response interface for a working attorney in some embodiments.

FIG. 57 is a display diagram showing a sample display presented by the facility in connection with an asset transaction history interface in some embodiments.

DETAILED DESCRIPTION

Figure 1:
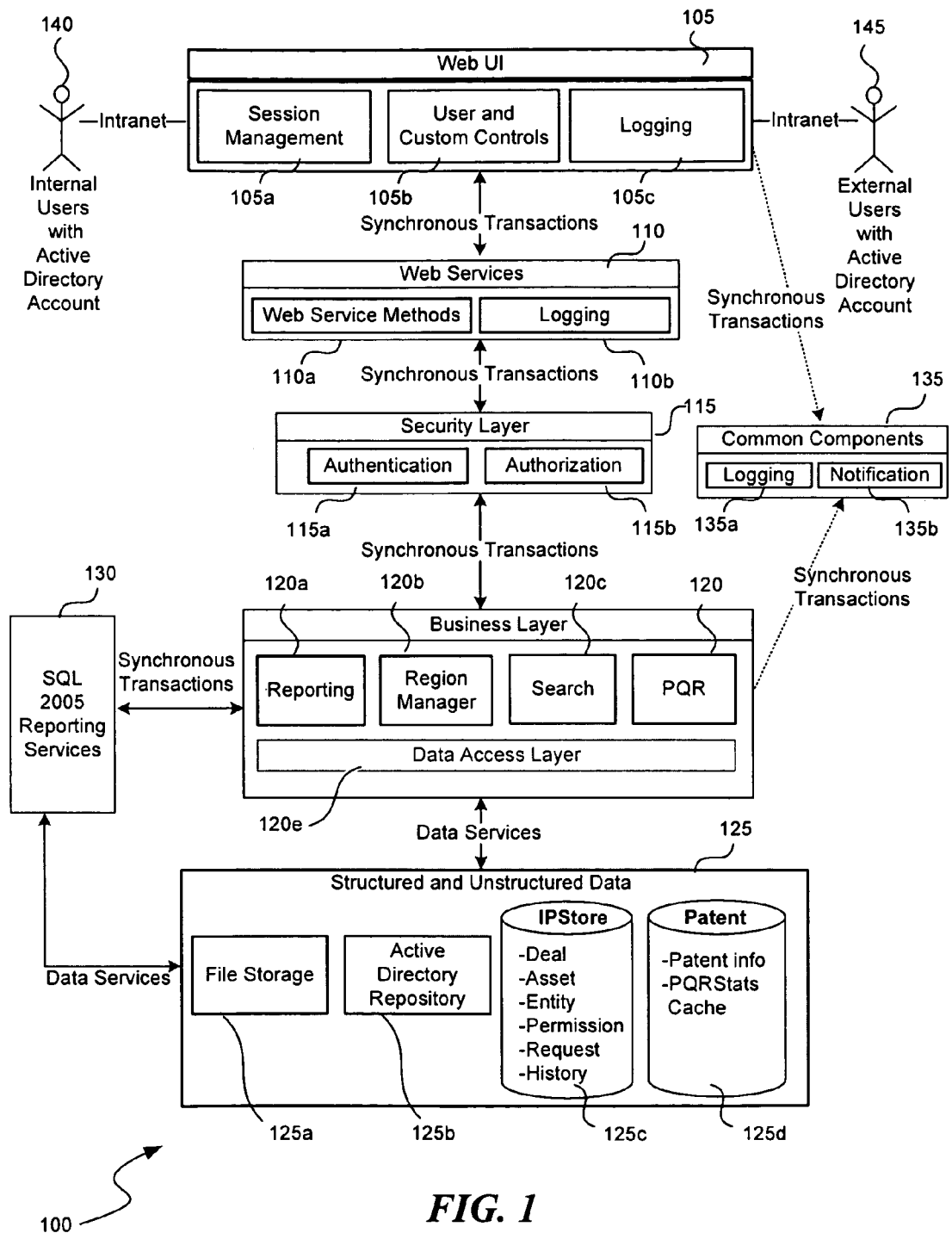
FIG. 1 is a block diagram showing a high-level architecture employed by the facility in some embodiments.
Figure 2A:
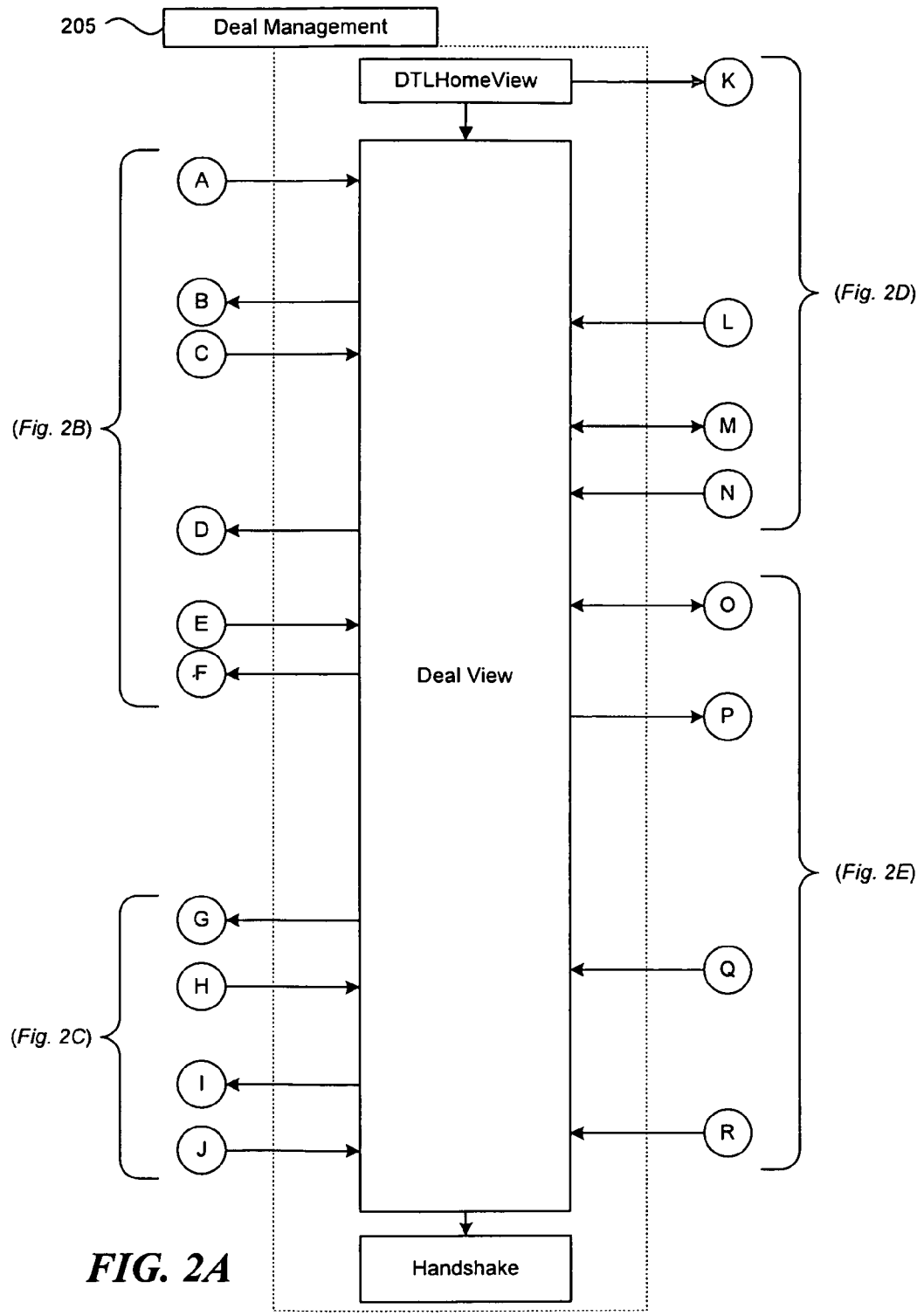
FIGS. 2A-2E are block diagrams showing interactions between various components of the facility in some embodiments.
Figure 2B:
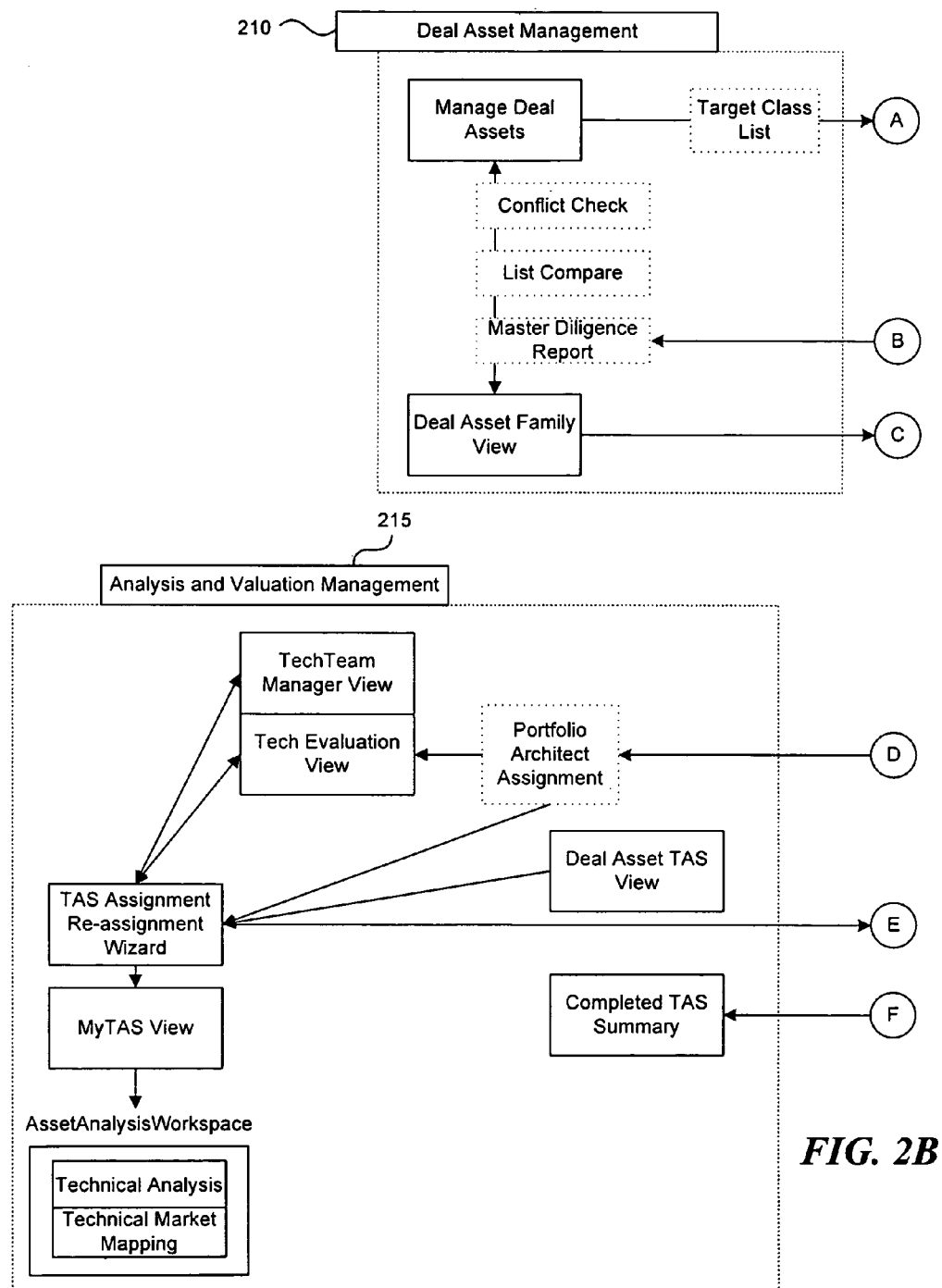
Figure 2C:
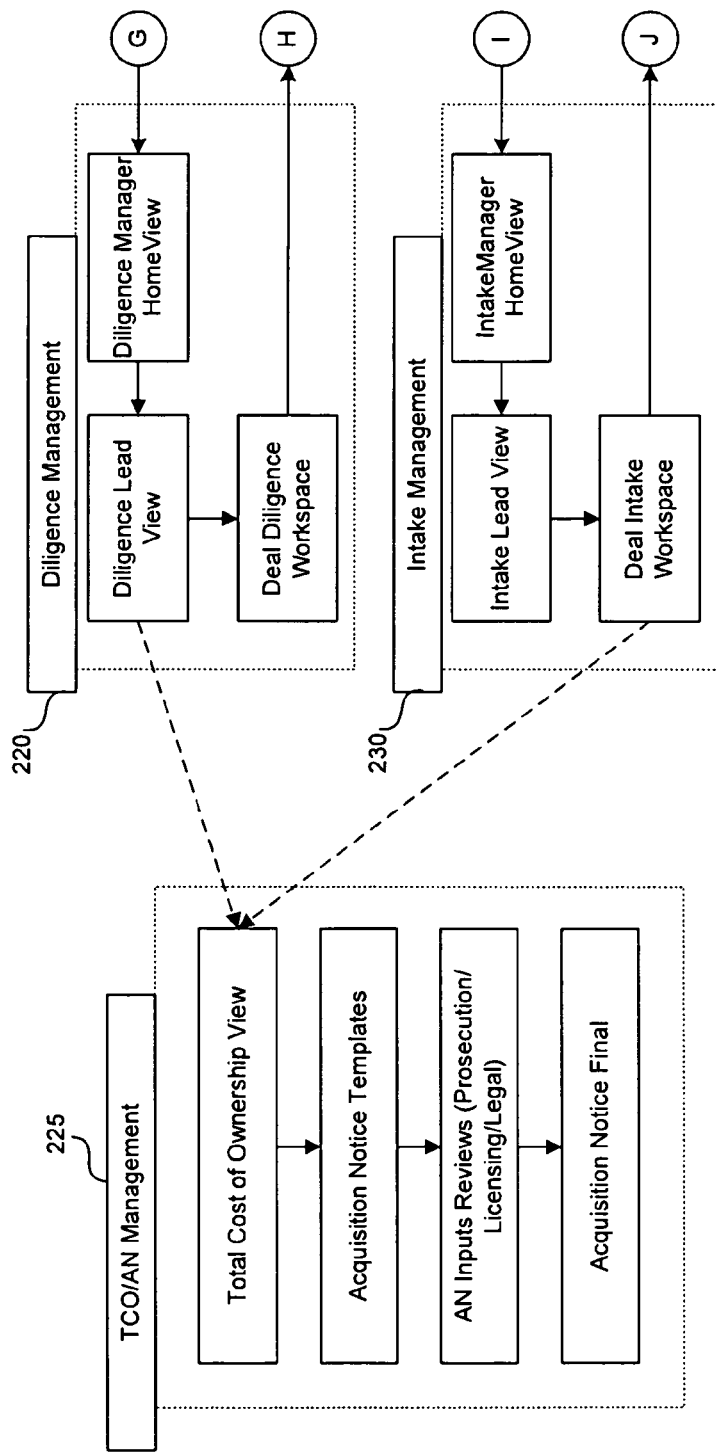
Figure 2D:
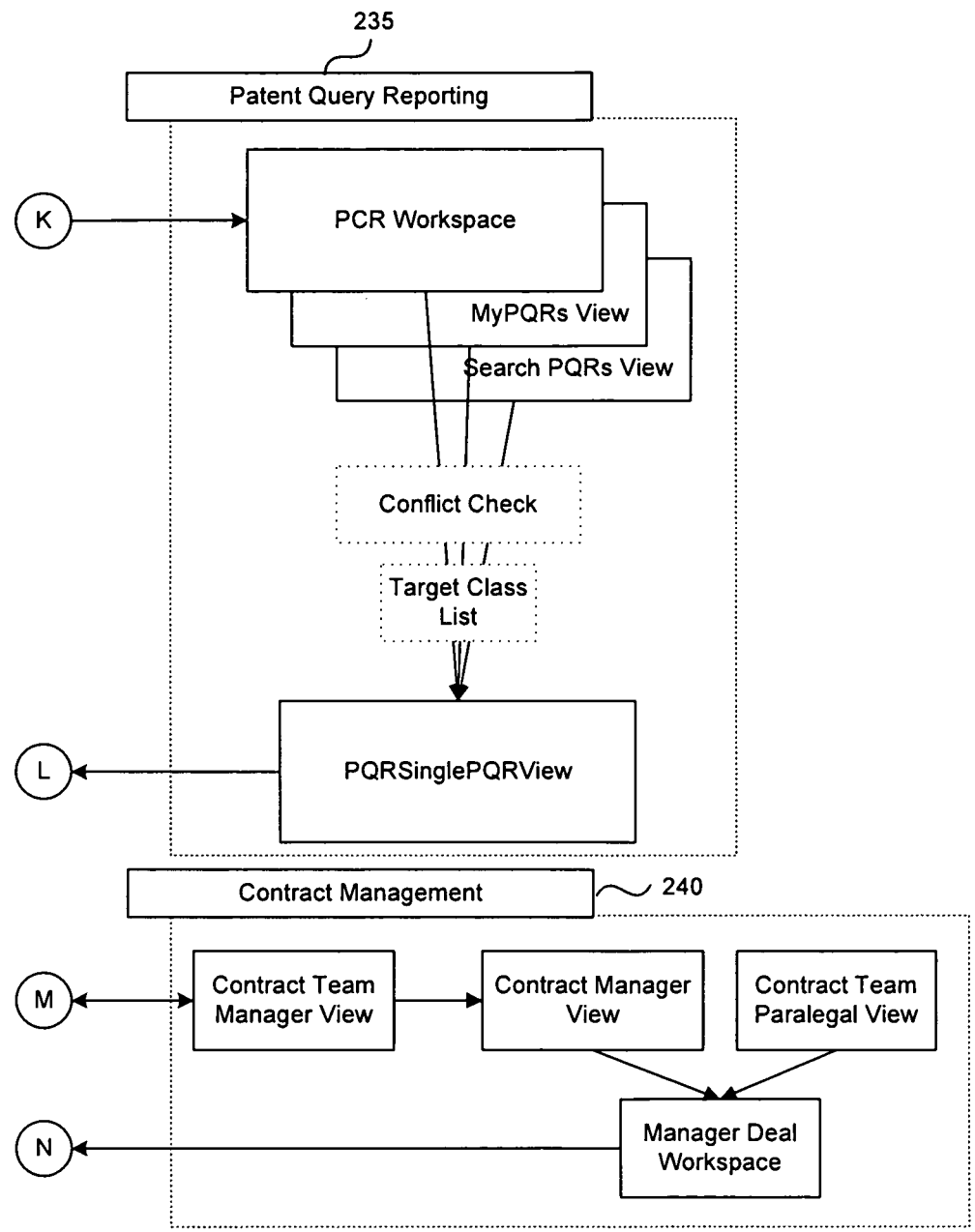
Figure 2E:
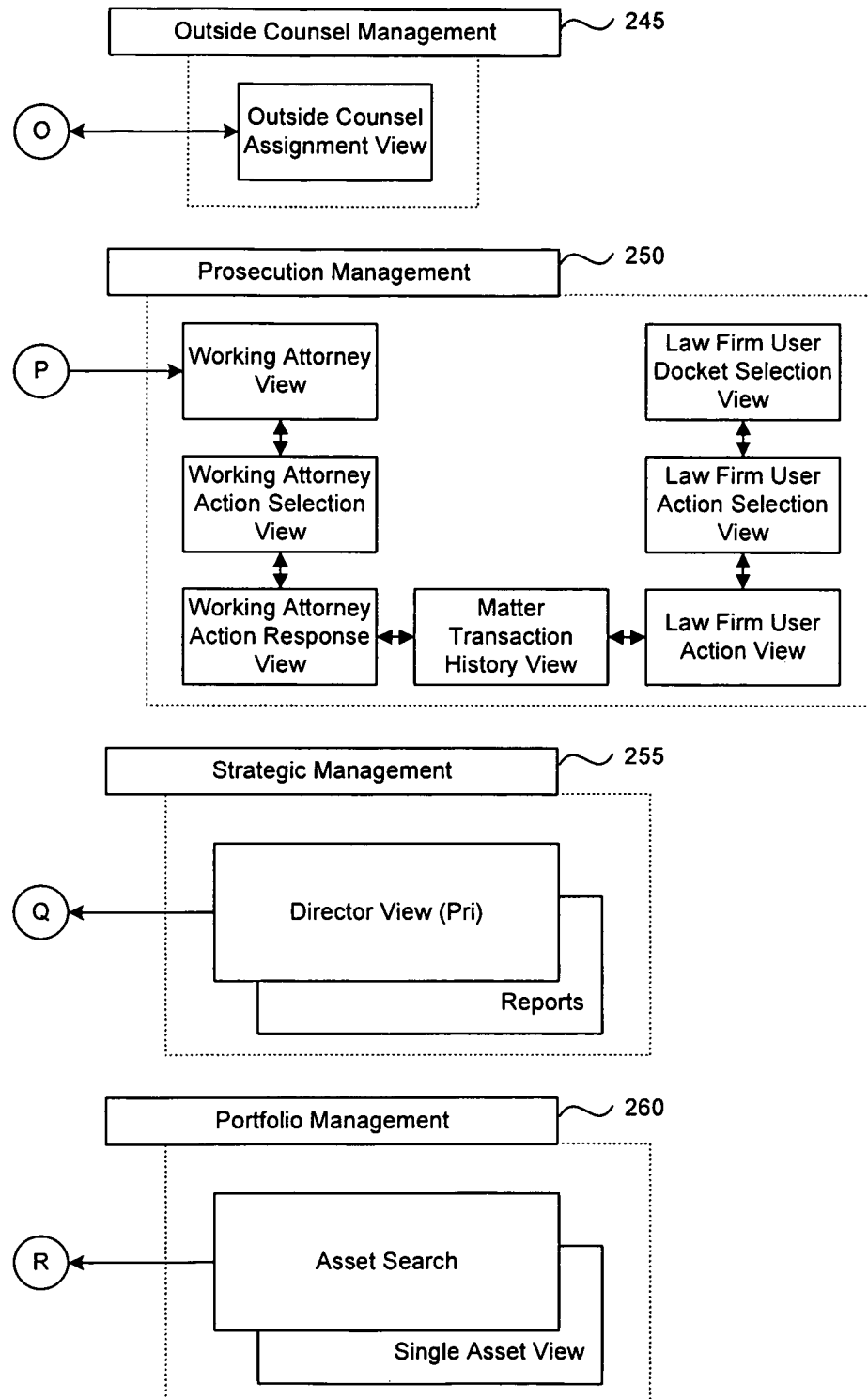

The inventors have recognized that the process of finding, acquiring and maintaining intellectual property assets, such as U.S. patents, U.S. patent applications, non-U.S. patents, and non-U.S. patent applications, poses several problems. A first problem is that intellectual property assets can be difficult to value. Intellectual property assets can be blemished by issues occurring during their creation or prosecution. A second problem is that such issues can be difficult to uncover and/or resolve. The process of finding, acquiring and maintaining intellectual property assets can involve numerous parties (e.g., sellers, buyers, agents, etc.). A third problem is that it can be difficult to coordinate the actions of the involved parties.

A hardware and/or software facility ("facility") for facilitating the finding, acquisition, and maintenance of intellectual property assets ("assets") is described. The facility implements a workflow system to enable the process (or processes, but described as the "process" in singular) of finding, acquiring, and maintaining assets. In such a workflow system, the facility enables the process of finding, acquiring, and maintaining assets to be divided into specific stages. Each stage can have associated with it specific tasks or work items to be performed by users of the system. The resolution of the tasks or work items associated with a specific stage may be necessary to complete the stage, or the process may be able to move onto the next stage before all the tasks or work items associated with the previous stage have been completed. Once an asset has been found and acquired, the facility enables the ongoing maintenance of the asset.

In some embodiments, the facility enables the division of the process of finding, acquiring, and maintaining assets into the following stages: 1) Prospecting; 2) Qualification; 3) Valuation; 4) Negotiation; 5) Diligence; 6) Intake; 7) Contracts; 8) Closing; and 9) Post-Closing. In some embodiments, the facility orders the stages in various ways. The stages (and associated tasks or work items) may be completed effectively in series, or the stages (and associated tasks or work items) may be completed in an effectively parallel fashion. In some embodiments, certain stages may be completed in series and others in parallel. In some embodiments, the process of finding, acquiring, and maintaining assets is divided into more or fewer stages. Those of skill in the art will understand that the process of finding, acquiring, and maintaining assets described herein is only for purposes of illustration.

The facility enables the finding, acquisition, and maintenance of varied types of assets. For example, the facility enables the finding, acquisition, and maintenance of U.S. patents, U.S. patent applications, non-U.S. patents, and non-U.S. patent applications. The facility is not limited to enabling the finding, acquisition, and maintenance of the aforementioned types of assets; rather, it is equally applicable to other types of assets, such as copyrights, trademarks, and trade secrets. An owner or seller of an asset may have complete title (e.g., all or substantially all rights) to the asset or less than complete title to the asset (e.g., less than all or substantially all rights, a fractional interest in the asset, an exclusive license to the asset, a non-exclusive license to the asset, etc.). Accordingly, acquiring an asset includes acquiring complete title to the asset as well as acquiring less than complete title to the asset (e.g., acquiring a fractional interest in the asset, acquiring an exclusive license to the asset, acquiring a non-exclusive license to the asset, etc.).

In some embodiments, the facility enables roles to be assigned to users of the facility. A user's role (or roles, described as the user's "role" in singular) determines the level of access that the user may have to certain aspects of the facility. A user with a certain role may be limited to only accessing a certain aspect of the facility, whereas a user with another role may have access to all aspects of the facility. For example, a role that a user may have is that of a Deal Team Leader (DTL). The DTL can be regarded as the owner of the Deal, responsible for shepherding the Deal through the stages of the process to the Deal's successful or unsuccessful conclusion. A DTL may be responsible for and therefore have access to all aspects of the facility for a specific Deal. In some embodiments, the DTL is the only person who can access all aspects of a particular Deal. As another example, another role that a user may have is that of a Contract Team Paralegal (CTP), who may be responsible for preparing legal contracts for a Deal. A CTP may therefore have read-only access to contract-related aspects of a Deal. A user's role also determines the tasks or work items that the user is responsible for. For example, a DTL may be responsible for creating a Deal, negotiating with a seller, and closing the Deal. As another example, a CTP may be responsible for providing contract-related aspects of a Deal. While particular roles and associated access rights are discussed herein, in various embodiments, the facility provides various different sets of roles with various different access rights.

In some embodiments, the facility alerts users to the tasks or work items that are newly assigned to them. When a user logs into the facility, the facility directs the user to his or her work queue to view the tasks or work items newly assigned to him or her. In some embodiments, when a task or work item is assigned to a user, the facility sends a message (e.g., an email message, text message, audio message, phone call, etc.) to that user to alert them to the newly assigned task or work item.

Overview

FIG. 1 is a block diagram showing a high-level architecture 100 employed by the facility in some embodiments for finding and acquiring assets. Internal users 140 and external users 145 interact with the facility through a Web User Interface (UI) Layer 105. The Web UI Layer includes various components including a Session Management component 105a, a User and Custom Control component 105b and a Logging component 105c. The Web UI layer 105 interacts with a Web Services Layer 110, which includes a Web Service Methods component 110a and a Logging component 110b. The web UI layer 105 also interacts with a Common Components layer 135, which includes a Logging component 135a and a Notification component 135b. The Web Services layer 110 interacts with a Security Layer 115, which includes an Authentication component 115a and an Authorization component 115b. The Security Layer 115 interacts with a Business Layer 120, which includes a Reporting component 120a, a Region Manager component 120b, a Search component 120c and a Patent Query Report component 120d. The Business Layer 120 also includes a Data Access Layer 120e. The Business Layer 120 interacts with a Data Layer 125 through the Data Access Layer 120e. The Data Layer 125 includes a File Storage area 125a, an Active Directory Repository 125b, an IPStore database 125c, and a Patent database 125d. The File Storage area 125a can store unstructured data, the Active Directory Repository 125b can store authentication data, and the IPStore database 125c and the Patent database 125d can store structured data, including role-based permissions data. The Data Layer 125 can provide reporting data to the Business Layer 120 via a SQL 2005 Reporting Services component 130. Although the various layers and components of the facility are shown as interacting with each other through synchronous transactions, the various layers and components of the facility can also interact with each other through asynchronous transactions.

FIGS. 2A-2E are block diagrams 200 showing interactions between various components of the facility in some embodiments. At the center is a Deal Management component 205, through which other components of the facility interact. These other components include a Deal Asset Management component 210, an Analysis and Valuation Management component 215, a Diligence Management component 220, a Total Cost of Ownership and Acquisition Notice component 225, an Intake Management component 230, a Patent Query Reporting component 235, a Contract Management component 240, an Outside Counsel Management component 245, a Prosecution Management component 250, a Strategic Management component 255, and a Portfolio Management component 260. The facility can also include other components (not shown) to assist in finding and acquiring intellectual property assets.

Figure 3:
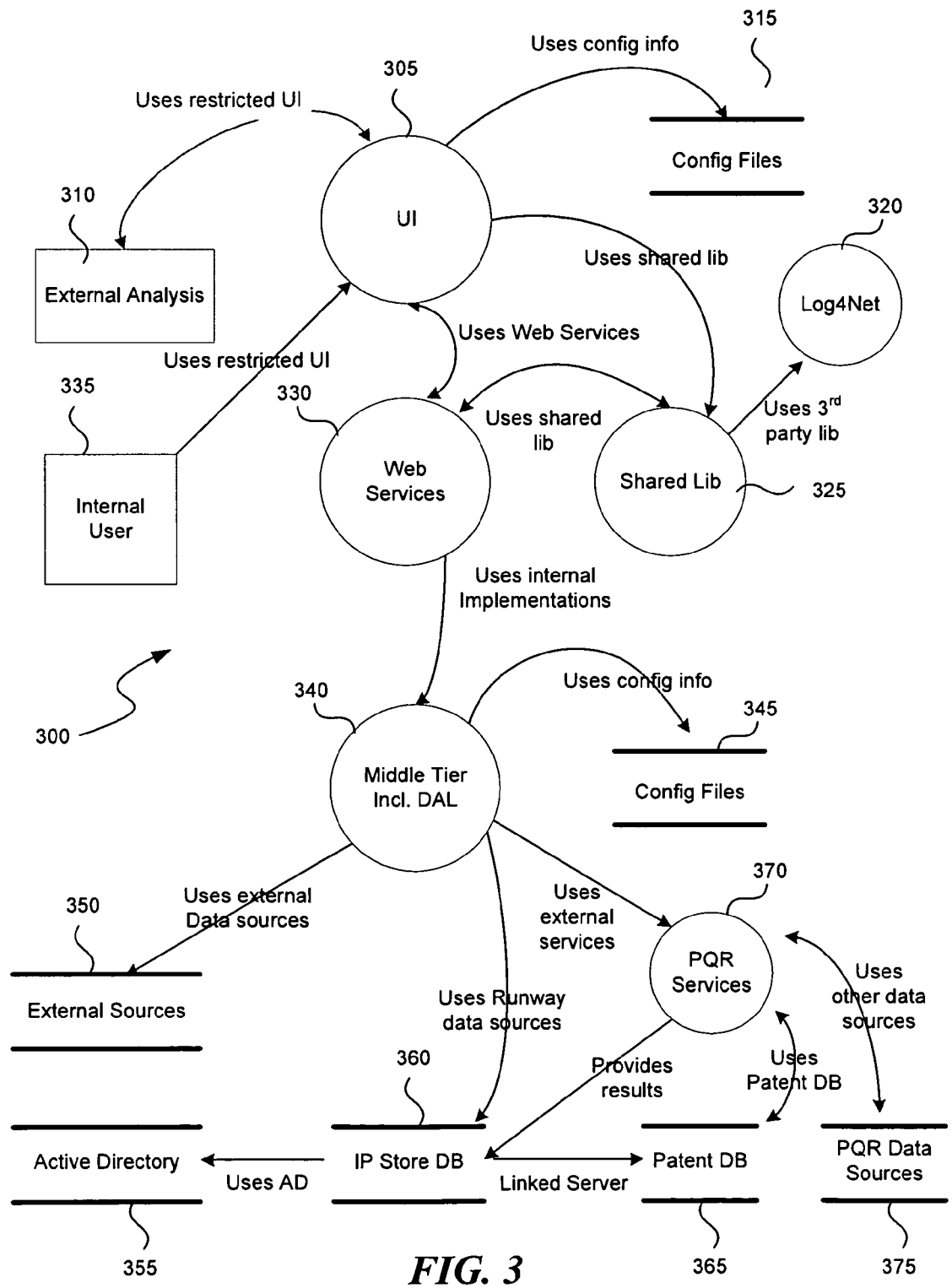
FIG. 3 is a data flow diagram showing data flow between various components of the facility in some embodiments.

FIG. 3 is a data flow diagram 300 showing data flow between various components of the facility in some embodiments. External Analysts 310 and Internal Users 335 interact with a UI component 305, which uses configuration information stored in configuration files 315. The UI layer 305 uses web services provided by Web Services Layer 330. The Web Services Layer 330 uses shared libraries provided by shared libraries 325, as well as third-party libraries provided by a Log4Net component 320. The Web Services Layer 330 uses internal implementations to interact with a Middle Tier Layer 340. The Middle Tier Layer 340 uses configuration information provided by configuration files 345. The Middle Tier Layer 340 also uses data provided by External Data Sources 350 and internal data that is stored by an IPStore database 360 and an Active Directory data store 355. The Middle Tier Layer 340 also interacts with a Patent Query Report Services Layer 370 which uses a Patent database 365 as well as a Patent Query Report data sources database 375.

1. Prospecting

Prospecting generally refers to the process of searching for and finding potentially acquirable assets. Prospecting can be a manual process. For example, a user of an organization implementing the facility can manually contact (e.g., via phone, email, fax, etc.) sellers (e.g., individuals, businesses, universities, etc.) and/or finders (e.g., third-party agents that try to facilitate intellectual property transactions between sellers and buyers) to search for potentially acquirable assets. In some embodiments, the facility supports manual Prospecting by providing users with information about sellers and/or finders. For example, the facility can provide users with information about issued patents that are assigned to universities as well as contact information for technology transfer offices of such universities. Prospecting can also be an automated process. For example, the facility can obtain information regarding potentially acquirable assets (e.g., information about the assets, information about the seller, etc.) via an automated search process. In some embodiments, the facility obtains information regarding potentially acquirable assets by searching databases (e.g., online databases such as the USPTO patents database) to find assets which are related (by parent/child association, similar or same technology category and/or classification, assignee, inventor, examiner, etc.) to find potentially acquirable assets which the organization implementing the facility is interested in obtaining. As another example, the facility can make interfaces available via which sellers and/or finders can provide information (e.g., via email, a web interface, etc.) regarding potentially acquirable assets. In some embodiments, the facility provides users with the information obtained during automated prospecting. Prospecting can also include both manual and automated aspects. In some embodiments, the facility stores information obtained during manual and/or automated Prospecting as parameters for a potential new Deal.

Figure 4:
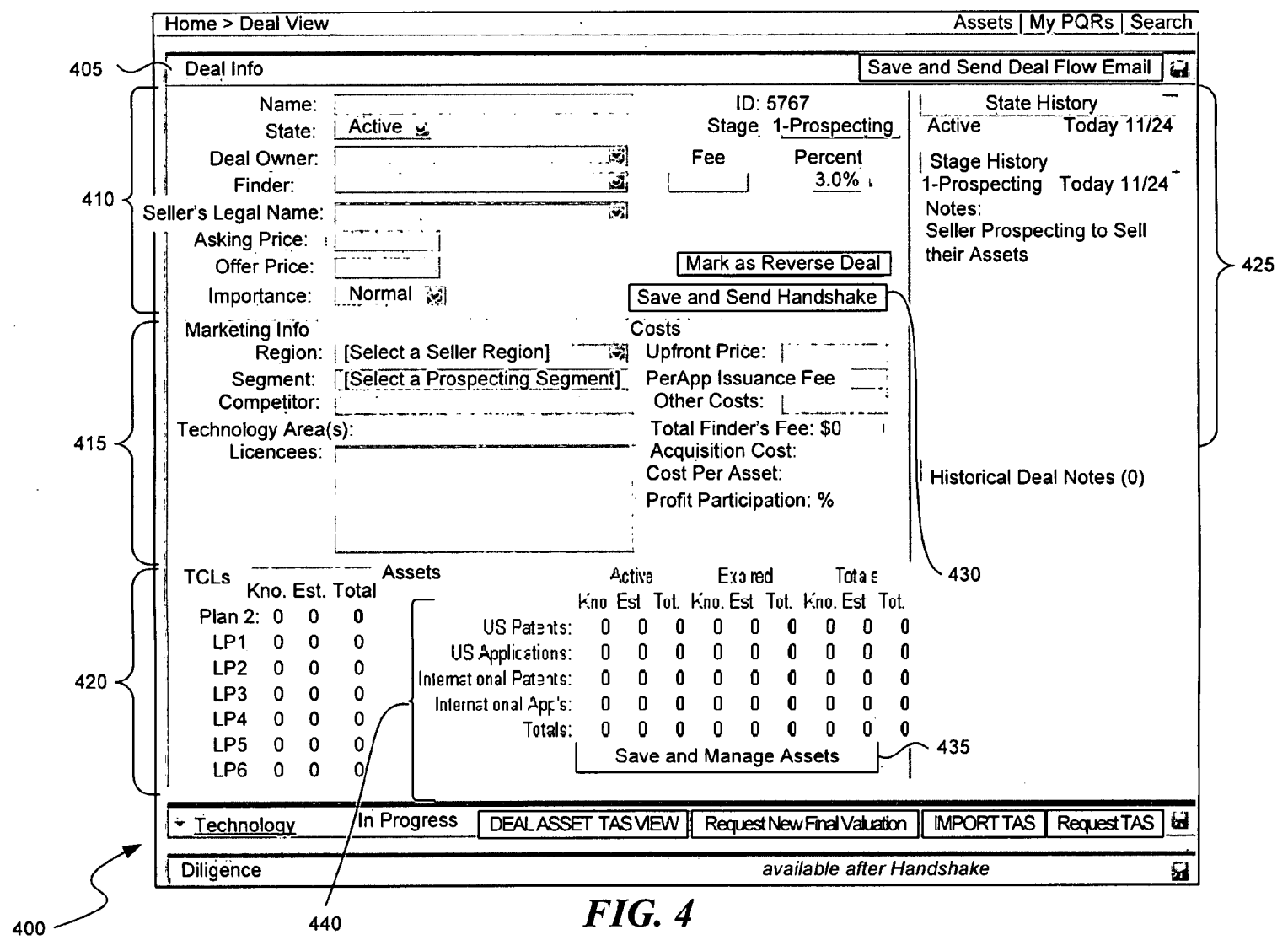

FIG. 4 is a display diagram showing a sample display 400 presented by the facility in connection with the creation of a new Deal in some embodiments. The display 400 corresponds to the Deal view of the Deal Management component 205 of FIG. 2. The interface 400 includes a Deal info region 405. The Deal info region 405 includes various regions that can be used to input, edit, and/or view various details of the Deal. These various regions include region 410, in which the DTL can input, edit, and/or view a Deal name, a Deal state, a Deal owner, a Deal finder, a Seller's name, an asking price, an offer price, importance, a fee, and a Deal stage. The Deal info region 405 also includes a Deal metadata region 425 in which the state history (e.g., active, inactive, on hold, etc.) of the Deal, the stage history of the Deal and notes about the Deal are shown. The Deal stage is currently "1—Prospecting," to indicate that the Deal is at the Prospecting stage.

The Deal info region 405 also includes a marketing info and costs region 415, in which the DTL can input, edit, and/or view a region, a segment, competitors, technology areas, licensees, and costs associated with the Deal, such as upfront price and other costs. The DTL (or other user with the appropriate role-based permissions) can provide the information for the various regions of the Deal info region 405 at the time of creation of a Deal. In some embodiments, the facility receives information regarding a potential Deal via email or obtains information regarding a potential Deal as a result of a search process. The facility populates the fields in the Deal info region 405 with the information regarding the potential Deal and alerts a DTL, whose approval is required in order for a potential Deal to become a Deal.

The Deal info region 405 also includes a TCL region 420. As discussed in further detail below, the TCL region 420 can display the number of TCLs for certain categories or organizations (such as Limited Partners (LPs)) affiliated with the organization implementing the facility. The Deal info region 405 also includes an assets region 440, in which is displayed a table showing the number of active and expired U.S. patents, U.S. applications, international patents and international applications that are part of the Deal. The DTL can select button 435 to save and manage assets or select button 430 to save and send a Handshake.

Figure 5:
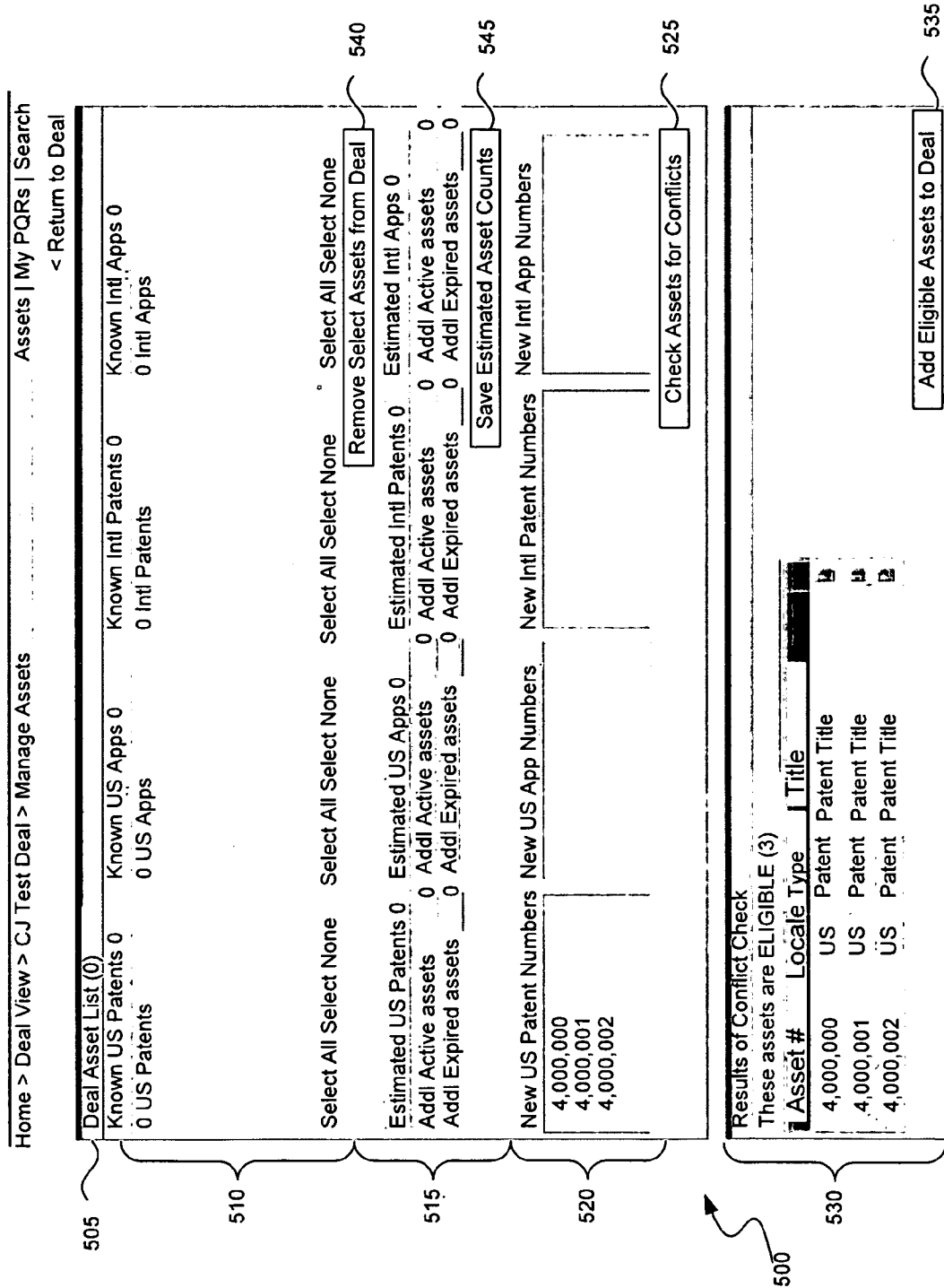
FIGS. 5 and 6 are display diagrams showing sample displays presented by the facility in connection with the performance of a conflict check for assets in a Deal in some embodiments.

FIG. 5 is a display diagram showing a sample display 500 presented by the facility when the save and manage assets button 435 of FIG. 4 is selected. The display 500 corresponds to the Manage Deal Assets view of the Deal Asset Management component 210 of FIG. 2. The interface 500 includes a Deal asset list region 505. The Deal asset list region 505 includes a known region 510 in which known U.S. patents, U.S. applications, international patents and/or international applications are shown. If there are known assets listed, the DTL can select them and select button 540 to remove the selected assets from the Deal. The Deal asset list 505 also includes an estimated region 515 in which estimated counts of U.S. patents, U.S. applications, international patents and/or international applications are shown. The DTL can input, edit, and/or view these estimated counts and save them by selecting button 545. The Deal asset list 505 also includes a new region 520. After the Deal has been saved, the DTL can input into region 520 the numbers (or other identifying indicia) of new U.S. patents, new U.S. applications, new international patents and/or new international applications which are part of a Deal but not yet listed in known region 510. The DTL can then select button 525 to perform an asset conflict check. The facility performs a conflict check and displays the results of the conflict check in conflict check results region 530. For example, as shown, a conflict check has been selected for three U.S. patents: U.S. Pats. Nos. 4,000,000, 4,000,001, and 4,000,002. Each of these patents is shown in the conflict check results region 530 as eligible assets, meaning that they are eligible to be part of the Deal. After a conflict check has been performed, the DTL can select button 535 to add the eligible assets to the Deal. The eligible assets are then displayed in known region 510.

Figure 6:
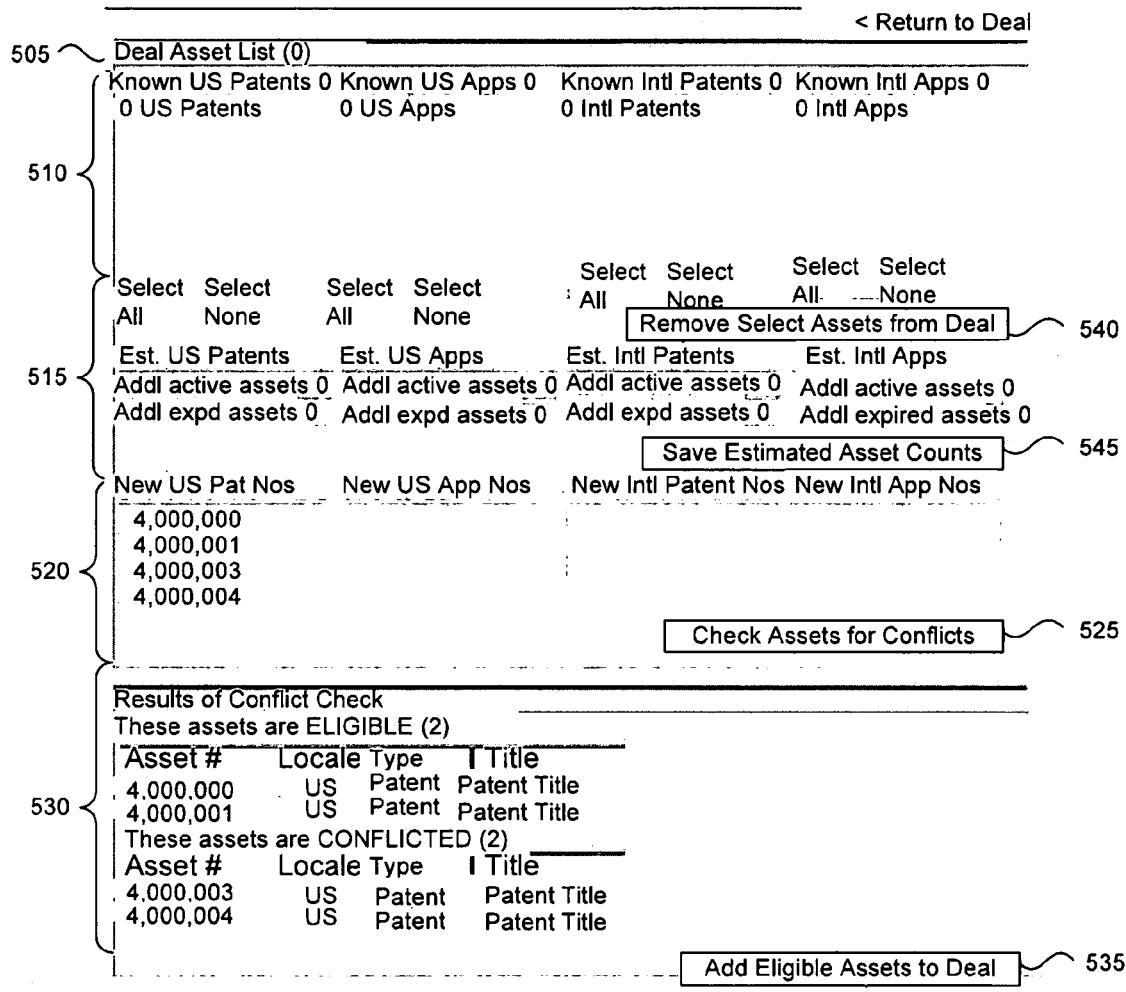

FIG. 6 is a display diagram showing the display 500 of FIG. 5. However, in FIG. 6, a conflict check has been performed for two assets (U.S. Pats. Nos. 4,000,003 and 4,000,004) for which a conflict exists. The facility may determine that a conflict exists for an asset for various reasons. For example, a conflict could exist if an asset is part of another active Deal or if the asset is part of a Deal that has not been successfully concluded. In some embodiments, the facility prevents the DTL from adding any assets for which a conflict exists to the Deal. After the conflict check has been performed, the DTL can select button 535 to add the eligible assets (but not the conflicted assets) to the Deal. The eligible assets are then displayed in known region 510.

Figure 7:
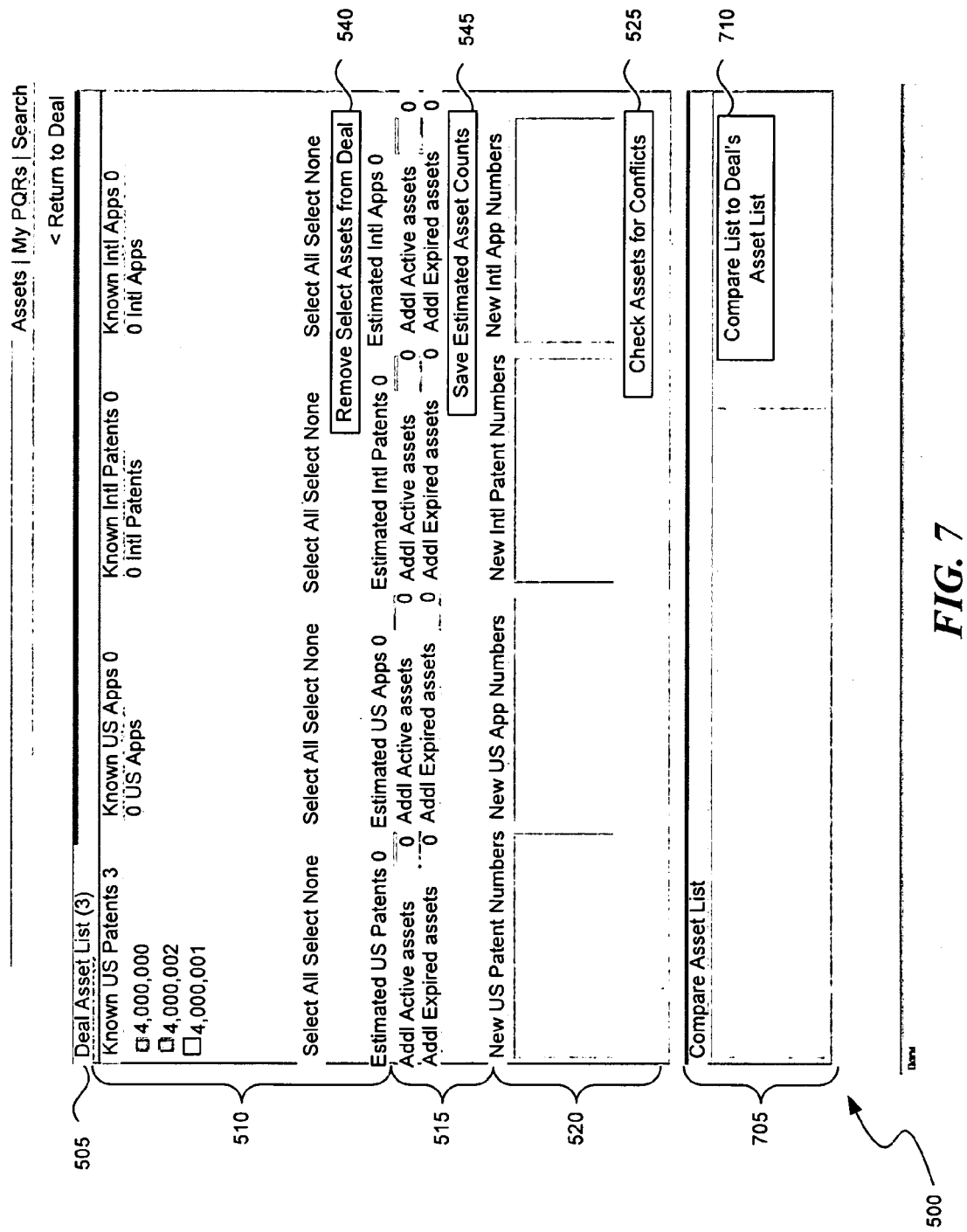
FIG. 7 is a display diagrams showing a sample display presented by the facility in connection with assets being added to a Deal in some embodiments.

FIG. 7 is a display diagram showing the display 500 of FIGS. 5 and 6. After the eligible assets have been added to the Deal, such as by selecting the add eligible assets to deal button 535 of FIGS. 5 and 6, the eligible assets are displayed in known region 510. As previously noted, the assets can be removed from the Deal by selecting them and selecting button 540. As shown in FIG. 7, the display 500 also includes a compare asset list region 705, in which the DTL can provide another list of assets. By selecting button 710, this list of assets can be compared with the list of assets that are already in the Deal (e.g., those shown in known region 510). This enables the DTL to determine if certain assets are already part of the current Deal. The DTL can compare assets any time after eligible assets have been added to the known region 510.

2. Qualification

Qualification generally refers to the process of determining whether the eligible assets in a Deal meet certain criteria that generally must be met in order for the Deal to continue. In some embodiments, the facility qualifies eligible assets in the Deal by checking to see if they fall within one or more sets of assets that the organization implementing the facility desires to obtain. For each of the sets of desired assets, the union of the set of the eligible assets in the Deal and a set of desired assets are the qualified assets.

In some embodiments, after eligible assets have been added to the Deal, the DTL (or other user with the appropriate role-based permissions) requests that the facility perform a Patent Query Report (PQR). The facility performs a PQR to determine, for each asset, if the asset falls into one or more categorizations or organizations. For example, the organization implementing the facility can have one or more lists of desired assets (e.g., shopping lists) that each list a different category of assets (e.g., a list of U.S. patents directed to software inventions, a list of U.S. patents directed to electrical inventions, a list of U.S. patents directed to mechanical inventions, etc.). As another example, organizations affiliated with organizations implementing the facility can each have one or more lists of assets they desire to obtain.

Figure 8:

FIG. 8 is a display diagram showing a display 800 presented by the facility in connection with a performed PQR in some embodiments. The display 800 corresponds to the PQRSinglePQR view of the Patent Query Reporting component 235 of FIG. 2. The PQR, labeled with reference character 802, includes six assets, shown individually as assets 805a-f. The categorizations or organizations are shown as categorizations or organizations 810a-f in the display 800. The facility performed the PQR by comparing the assets in the PQR against the list of assets in each particular categorization or organization. A match between an asset in the PQR and the assets in the categorization or organization is shown as a number in the column corresponding to the categorization or organization 810. The number of matches is called the number of TCL hits. In some embodiments, instead of indicating a number of TCL hits, the facility displays a metric related to the number of TCL hits (e.g., a number weighted to indicate a relative importance). The total number of TCL hits for each categorization or organization for each asset is shown in the column TCL total 815. After the PQR has been run, a DTL can select button 820 in order to create a Deal with these selected assets. Alternately, a PQR can be run for assets that are already part of a Deal. A DTL can thus determine if a list of assets being offered by a Seller in a potential Deal fall into one or more categorizations or organizations, and use this information to decide whether or not to move forward with the Deal, or how to move forward with the Deal.

FIG. 9 is a display diagram showing a sample display 900 presented by the facility for displaying the PQRs assigned to a person. The display 900 corresponds to the MyPQRs view of the Patent Query Reporting component 235 of FIG. 2. The DTL (or other user with the appropriate role-based permissions) can access the display 900 in order to view PQRs created by the DTL or assigned to the DTL. The display 900 includes a region 905 that shows all the PQRs created by or assigned to the DTL. As depicted, information about 15 PQRs is shown in region 905. This information includes the PQR name, the PQR subject, the number of assets in the PQR, the date requested, and the number of TCL hits for each particular categorization or organization. Region 910 includes a search interface for searching or filtering PQRs and region 915 includes a region to enable the DTL to request another PQR.

Figure 10:

FIG. 10 is a display diagram showing a sample display 1000 presented by the facility for depicting the results of a search for PQRs. The display 1000 corresponds to the Search-PQRs view of the Patent Query Reporting component 235 of FIG. 2. The DTL (or other user with the appropriate role-based permissions) can access the display 1000 from the region 910 of the display 900 of FIG. 9, or the DTL can search for PQRs using the region 1010. For example, the DTL can search for PQRs by the requestor of the PQRs. The results of a search are shown in region 1005, including the name of the PQR, the PQR requestor, the PQR subject, the PQR state, the number of assets in the particular PQR, the date requested, and the number of TCL hits for each particular categorization or organization.

Figure 11:
FIG. 11 is a display diagram showing a sample display presented by the facility in connection with a Deal Handshake request in some embodiments.

FIG. 11 is a display diagram showing a sample display 1100 presented by the facility in connection with a Deal Handshake request in some embodiments. The display 1100 corresponds to the Handshake view of the Deal Management component 205 of FIG. 2. In some embodiments, a Handshake request serves as a notification to the facility and to users of the facility that a new Deal can progress to subsequent stages (e.g., Valuation, Diligence, Contracts, etc.). The DTL can provide information about the Deal in the regions shown in the interface 1100. For example, the DTL can specify whether Diligence is to be proceeded with. The DTL can also specify whether or not a file history review was done, and if so, which law firm and attorneys did the file history review. The DTL can attach a PQR report. The DTL can send the Handshake request by selecting button 1105.

3. Valuation

At this point, the DTL has provided the facility with initial information about the Deal, and the DTL has also provided an indication of one or more eligible and qualified assets to the facility. In order to know whether or not to make an offer, accept an offer, or to propose a counteroffer, the DTL generally needs to have an estimate of the value or worth of the assets. In some embodiments, the facility enables the DTL to assign the Deal to a Portfolio Architect for technical valuation of the assets in the Deal.

Figure 12:
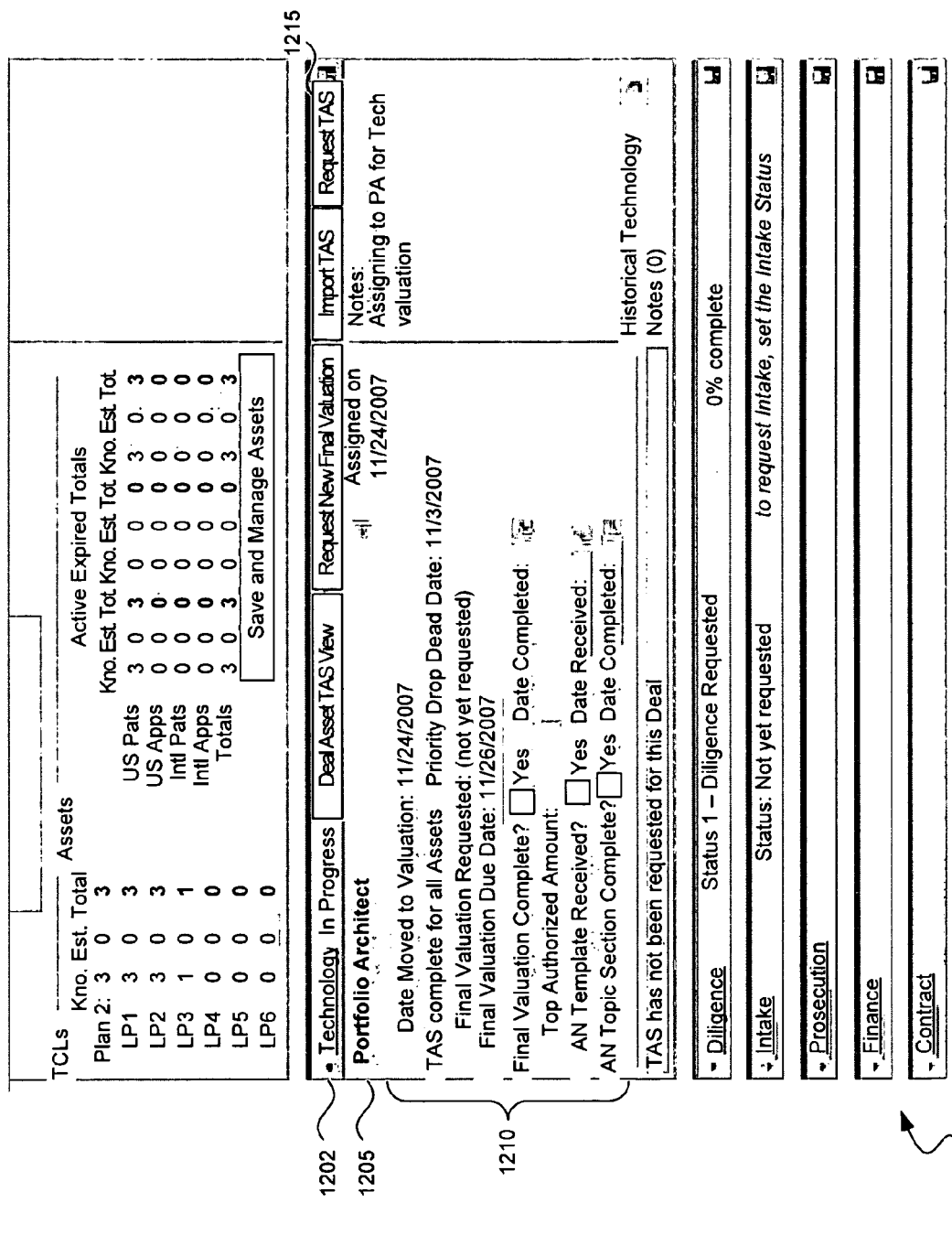
FIG. 12 is a display diagram showing a sample display presented by the facility in connection with Deal assets being assigned for valuation in some embodiments.

FIG. 12 is a display diagram showing a sample display 1200 presented by the facility in connection with requesting a technical valuation of the assets in the Deal in some embodiments. The display 1200 corresponds to the Technology section of the Deal view of the Deal Management component 205 of FIG. 2. The DTL (or other user with the appropriate role-based permissions) can access the display 1200 to provide information regarding requesting a technical valuation of the assets in the Deal. The display 1200 includes a technology region 1202, in which the DTL can input, view, and/or edit information regarding the assets in the Deal. The technology region 1202 includes a Portfolio Architect region 1205, which enables the DTL to select a Portfolio Architect (PA) for the Deal assets. A PA is responsible for the valuation of the Deal assets. The technology region 1202 also includes a region 1210, in which the DTL can input, view, and/or edit information regarding the assets in the Deal, including the date moved to the valuation, whether or not a final valuation was requested, the final valuation due date, whether the final valuation is complete, and other information. The DTL can request a Technical Analysis Spreadsheet (TAS) by selecting button 1215.

Figure 13A:
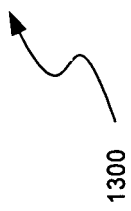

FIGS. 13A and 13B are display diagrams showing sample displays 1300 presented by the facility in connection with requesting a TAS in some embodiments. The displays 1300 correspond to the TAS Assignment/Re-Assignment Wizard view of the Analysis and Valuation Management component 215 of FIG. 2. The DTL (or other user with the appropriate role-based permissions) accesses the displays 1300 by selecting button 1215 of FIG. 12. In FIG. 13A, the display 1300 includes a region 1305 which displays the analysts which are available for performing portfolio analysis. Analysts include both Internal Analysts (IAs) that are part of the organization implementing the facility and External Analysts (EAs). The region 1300 also includes a region 1310 which displays the assets that are currently part of the Deal. The region 1300 also includes a region 1315 which shows the assignment of an analyst to one or more Deal assets. An analyst can be specified for some or all assets in a Deal, or an analyst can be specified for each individual asset in the Deal. In FIG. 13B, the DTL can provide further information about the new TAS request in region 1320.

Figure 14:
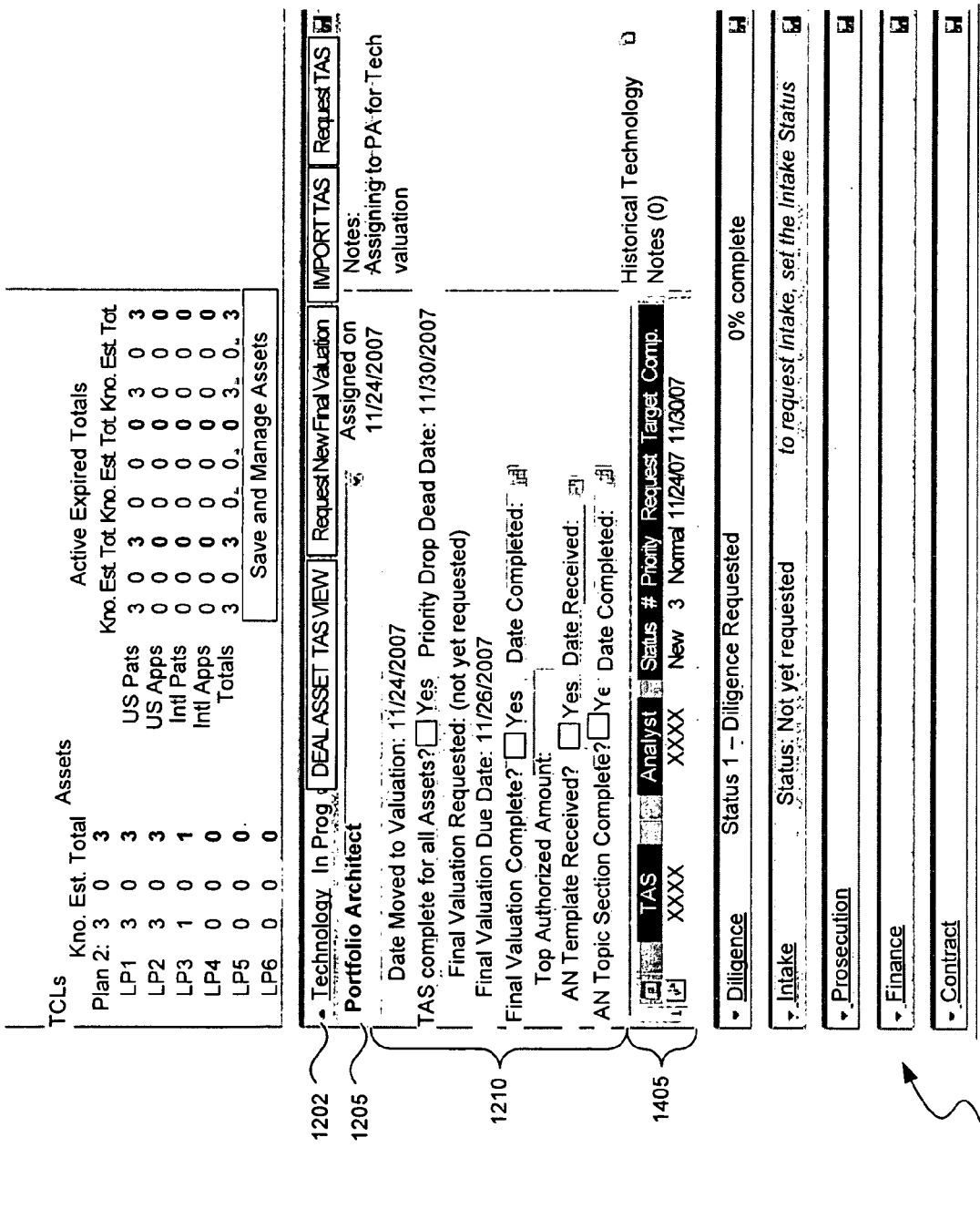
FIG. 14 is a display diagram showing a sample display presented by the facility in connection with a Deal for which a Technical Analysis Spreadsheet has been requested for the Deal assets in some embodiments.

FIG. 14 depicts the interface 1200 of FIG. 12 after a TAS has been requested for the Deal assets. The TAS request is shown in region 1405 of the technology region 1202. The region 1405 includes information about the TAS request, including the name of the TAS request, the analyst assigned to the TAS request, the status of the TAS request, the priority of the TAS request, the date requested and the target date for completion of the TAS.

Figure 15:
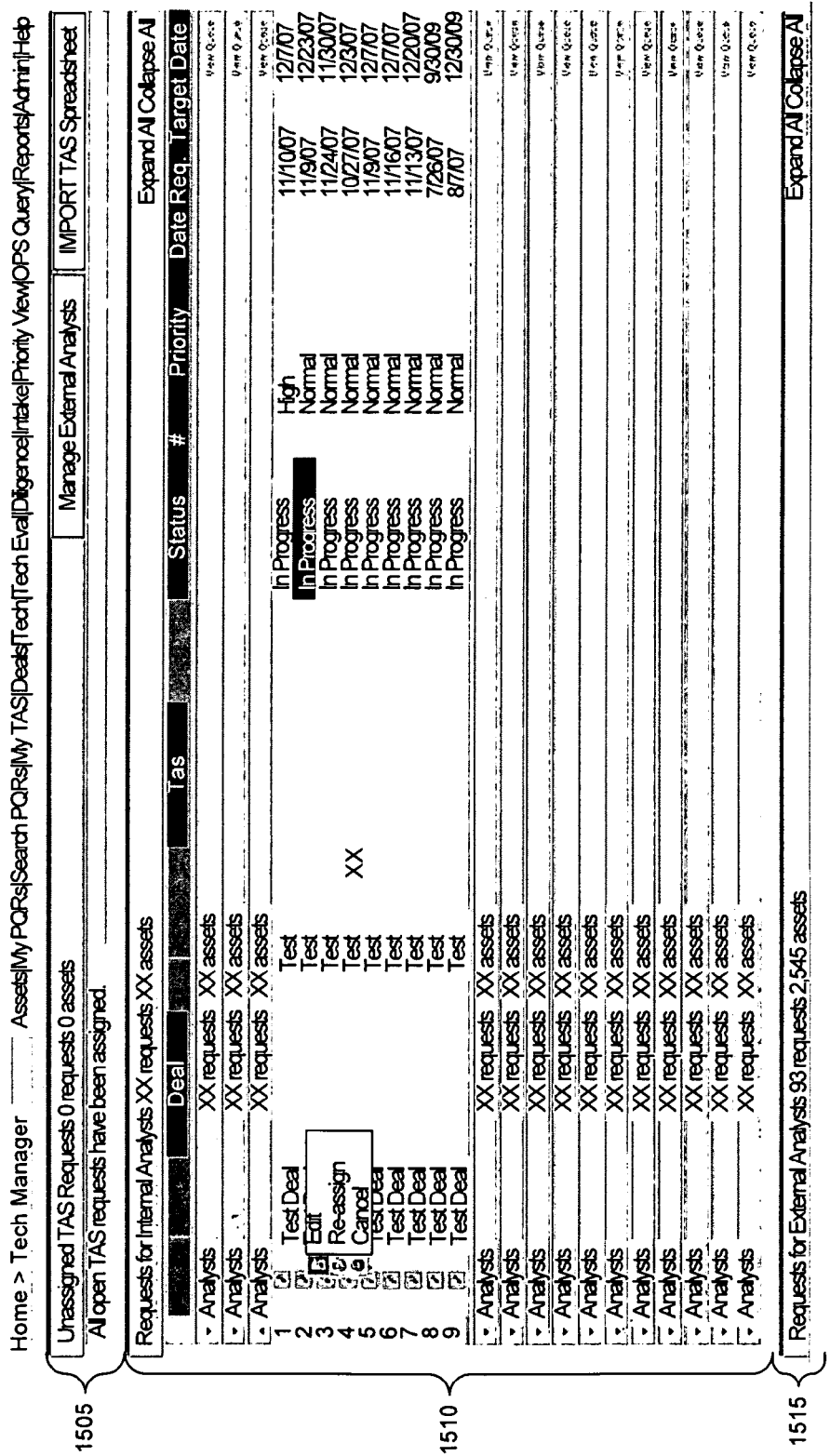
FIG. 15 is a display diagram showing a sample display presented by the facility in connection with the work queue of a Portfolio Architect in some embodiments.

FIG. 15 is a display diagram showing a sample display 1500 presented by the facility in connection with the work queue of a PA in some embodiments. The display 1500 corresponds to the TechTeam Manager view of the Analysis and Valuation Management component 215 of FIG. 2. The PA (or other user with the appropriate role-based permissions) typically accesses the display 1500 in order to see the unassigned and assigned TAS requests. The facility presents the unassigned TAS requests in region 1505. The facility presents the TAS requests that have been assigned to the PA in region 1510. The TAS requests are shown on a per-PA basis in region

1510. Also in region 1510 is shown information about each TAS request such as the name of the Deal, the assets in the Deal and the name of the TAS, the status of the TAS request as well as the priority of the TAS request and the date requested. Region 1515 shows requests for External Analysts.

Figure 16:
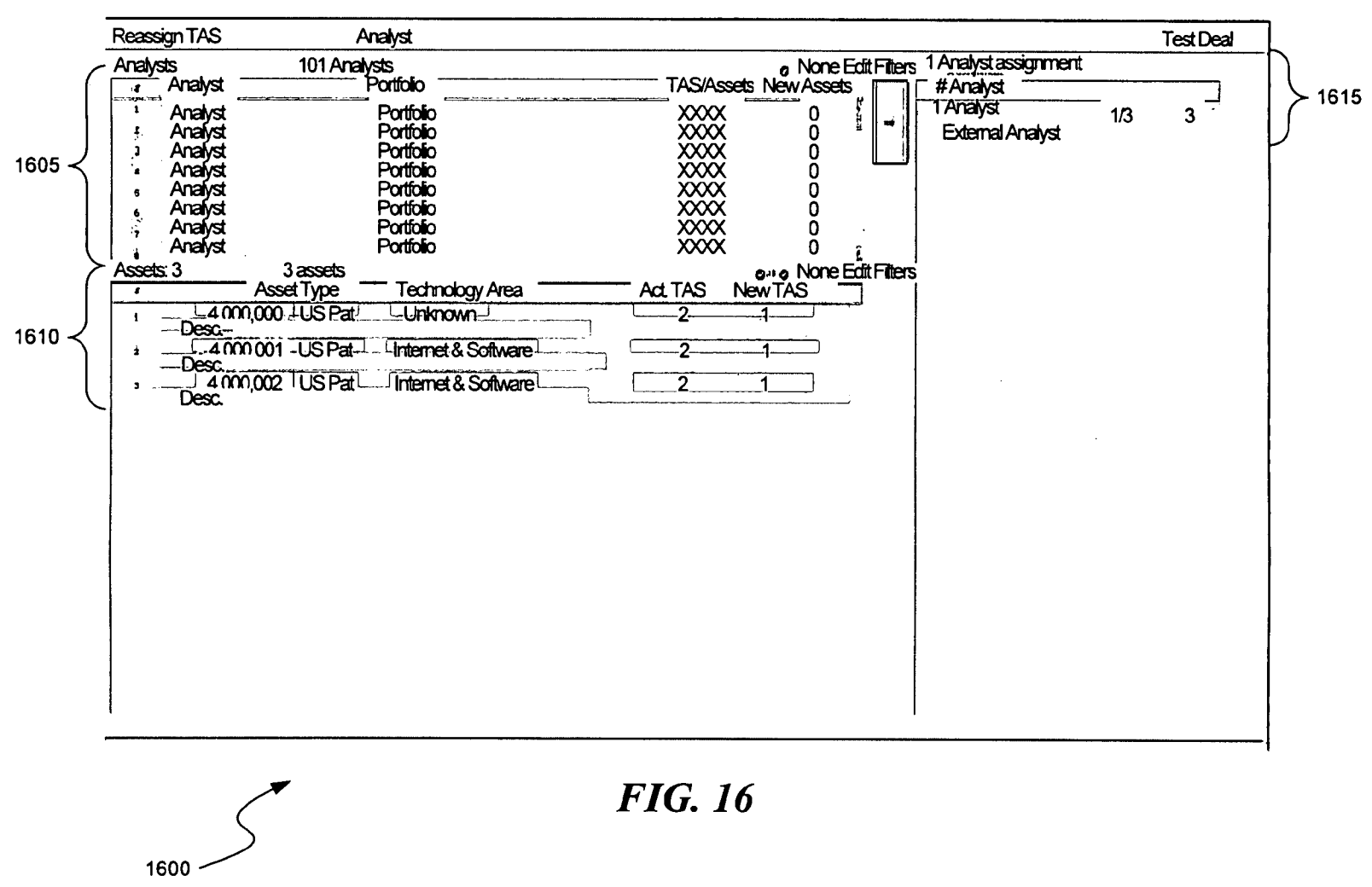

FIG. 16 is a display diagram showing a sample display 1600 presented by the facility in connection with a TAS request being reassigned to an EA in some embodiments. The display 1600 corresponds to the TAS Assignment/Re-Assignment Wizard view of the Analysis and Valuation Management component 215 of FIG. 2. The PA (or other user with the appropriate role-based permissions) can reassign a TAS to another analyst, such as an EA. In region 1605 are currently shown the analysts that are currently available to perform a TAS. In region 1610 are shown the assets for which a TAS has been requested. Region 1615 shows the result of a reassignment of a TAS to an EA.

Figure 17:
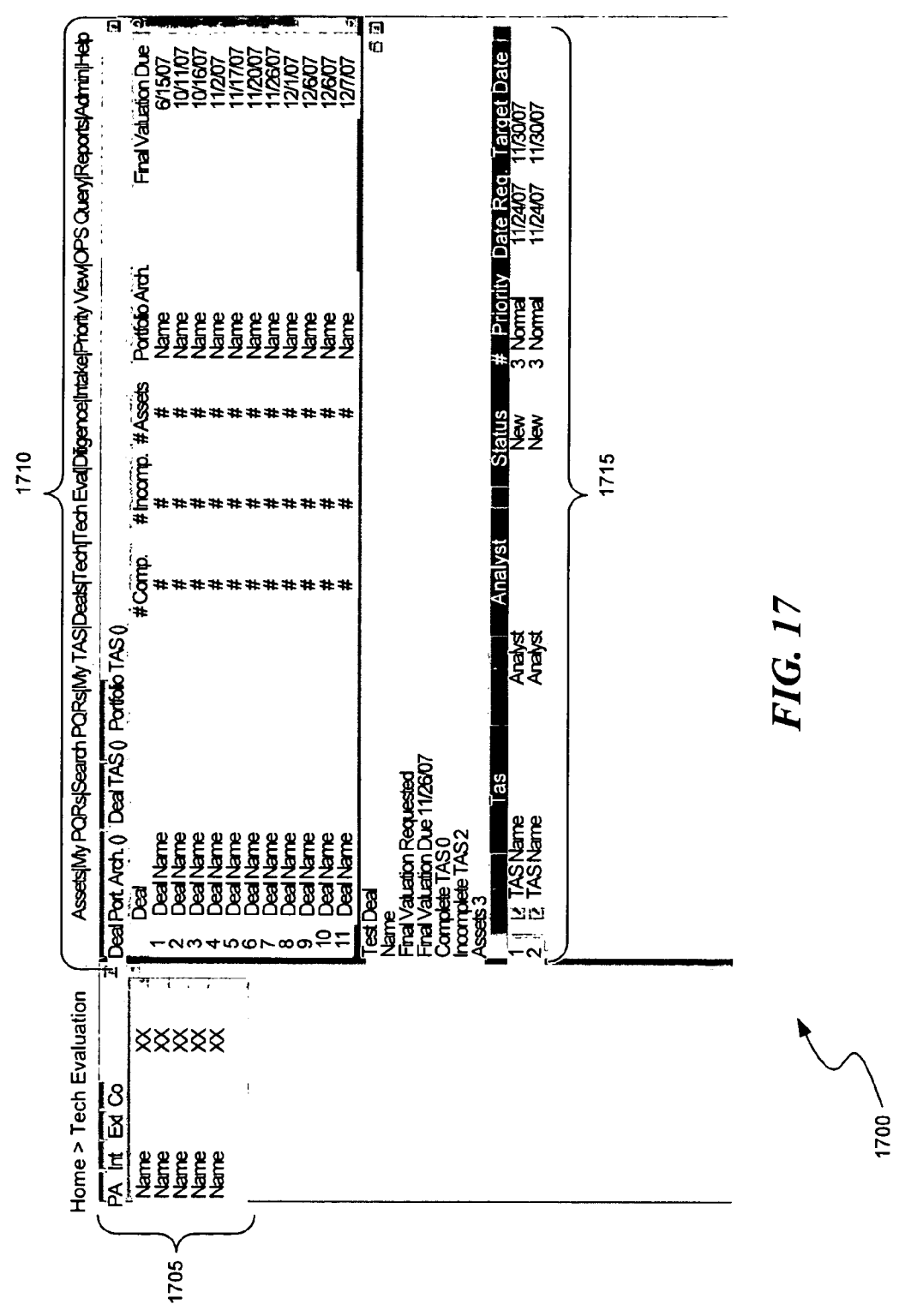

FIG. 17 is a display diagram showing a sample display 1700 presented by the facility in connection with a Technical Evaluation view available to a PA in some embodiments. The display 1700 corresponds to the Tech Evaluation view of the Analysis and Valuation Management component 215 of FIG. 2. The PA (or other user with the appropriate role-based permissions) can access the display 1700 to view information about the analysts assigned to TASs for Deals with which the PA is associated. The display 1700 includes a region 1705 which displays the analysts working on the Deals with which the PA is associated, organized by PA, IA, EA and company. The display 1700 also includes a region 1710 which shows the Deals with which the PA is associated. The display 1700 also includes a region 1715 which shows details of a particular Deal, including the analysts to whom assets in the Deal have been assigned for performing a Technical Analysis.

Figure 18:
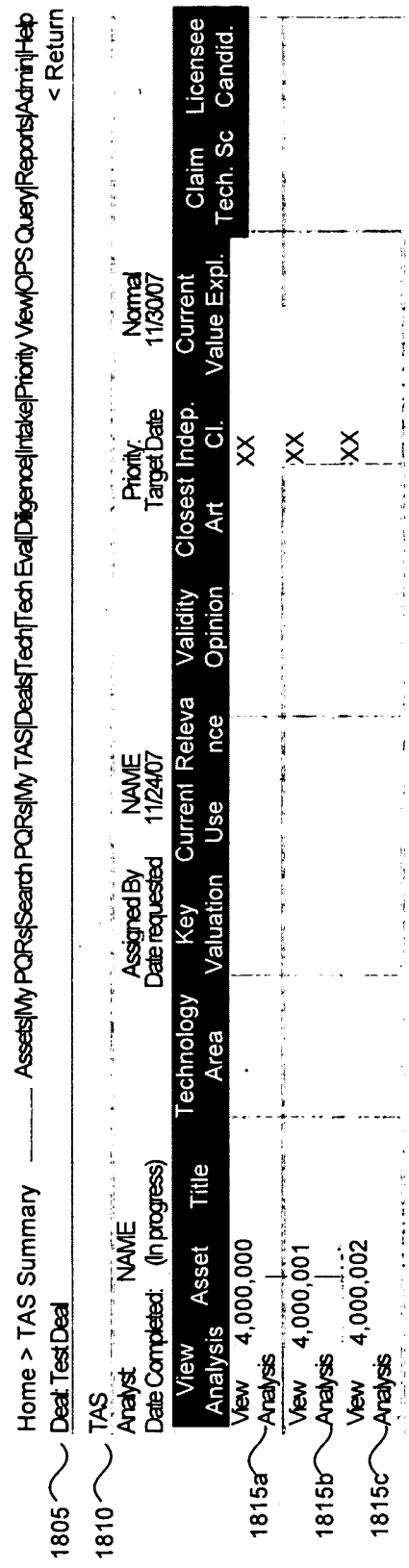
FIG. 18 is a display diagram showing a sample display presented by the facility in connection with a Technical Analysis Summary view in some embodiments.

FIG. 18 is a display diagram showing a sample display 1800 presented by the facility in connection with a Technical Analysis Summary view in some embodiments. The display 1800 corresponds to the Completed TAS Summary view of the Analysis and Valuation Management component 215 of FIG. 2. The PA, IA, and/or EA (or other user with the appropriate role-based permissions) can access the display 1800 to view summary information about a TAS. The display 1800 includes a Deal region 1805 which depicts the name of the Deal for which the TAS has been requested. The display 1800 also includes a region 1810 that displays the name of the TAS. The display 1800 also includes a columnar interface that depicts for each asset in the Deal, such as assets 1815a-c, information about the particular asset. This information includes the asset number (e.g., the number of a U.S. patent), the asset title, the technology area, key valuation, current use, relevance to standards, validity opinion, closest relevant art, independent claims, current value, current value explanation, claim technical scope, and licensee candidates.

Figure 19:
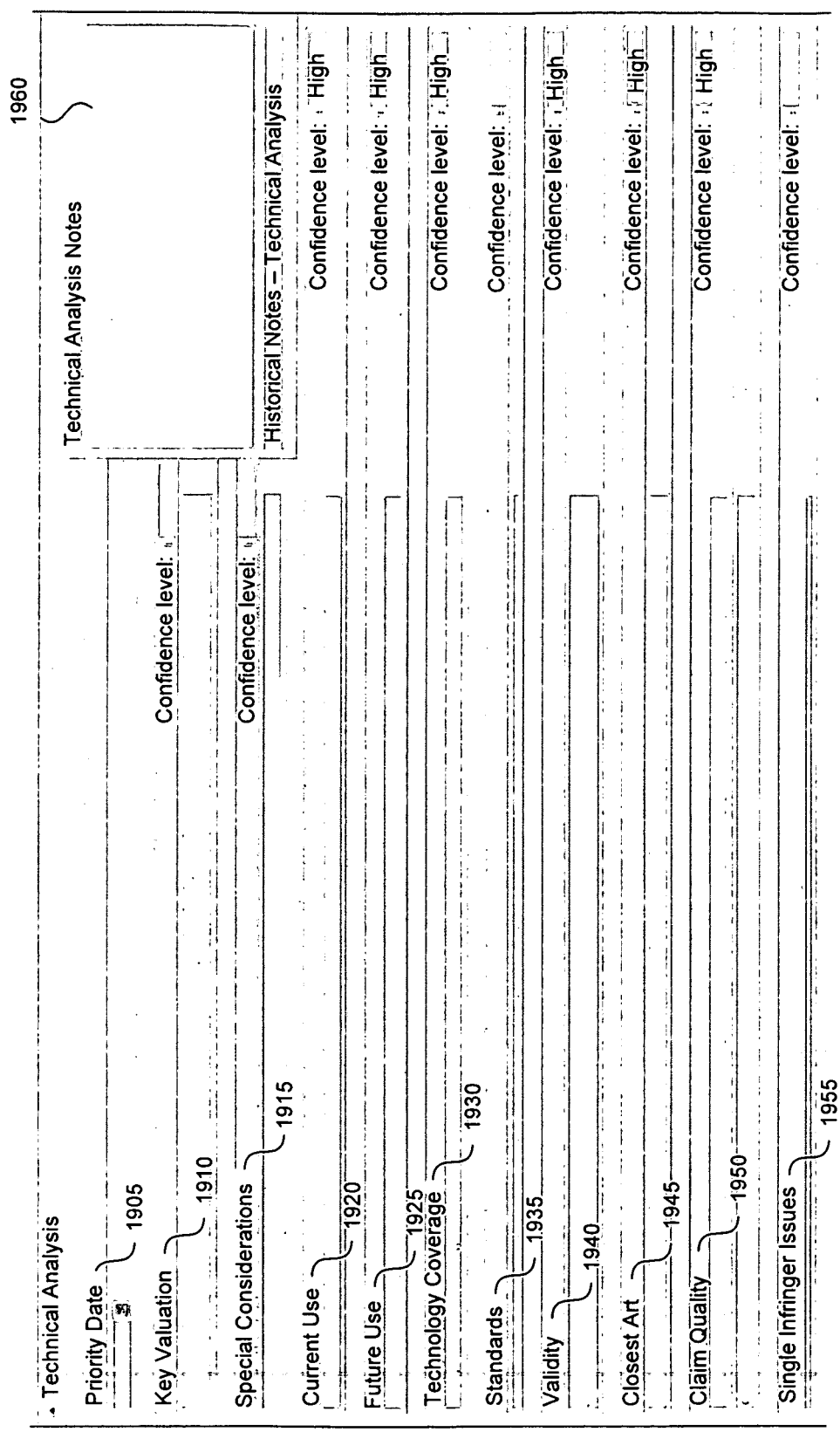
FIG. 19 is a display diagram showing a sample display presented by the facility in connection with a technical analysis for an asset in some embodiments.

FIG. 19 is a display diagram showing a sample display 1900 presented by the facility in connection with a technical analysis for a Deal asset in some embodiments. The display 1900 corresponds to the Technical Analysis view of the Analysis and Valuation Management component 215 of FIG. 2. The PA and/or the IA (or other user with the appropriate role-based permissions) can access the display 1900 to complete a technical analysis of a Deal asset. The display 1900 includes various regions in which the PA and/or the IA can provide details of the technical analysis of the Deal. These particular details include a priority date 1905, a key valuation 1910, a special considerations 1915, a current use 1920, a future 1925, technology coverage 1930, standards 1935, validity 1940, closest art 1945, claim quality 1950, and single infringer issues. For each or most of the details, the PA and/or the IA can specify a confidence level that indicates the level of confidence the PA and/or the IA has in the assessment of this particular aspect of the asset. The display 1900 also includes a notes region 1960 in which the PA and/or the IA can provide notes about the technical analysis.

FIG. 20 is a display diagram showing the display 1800 of FIG. 18, after a technical analysis has been performed for each asset in the Deal. The display 1800 depicts three assets, 1815a-c, for which a technical analysis has been performed, and the details of each technical analysis.

Figure 21:
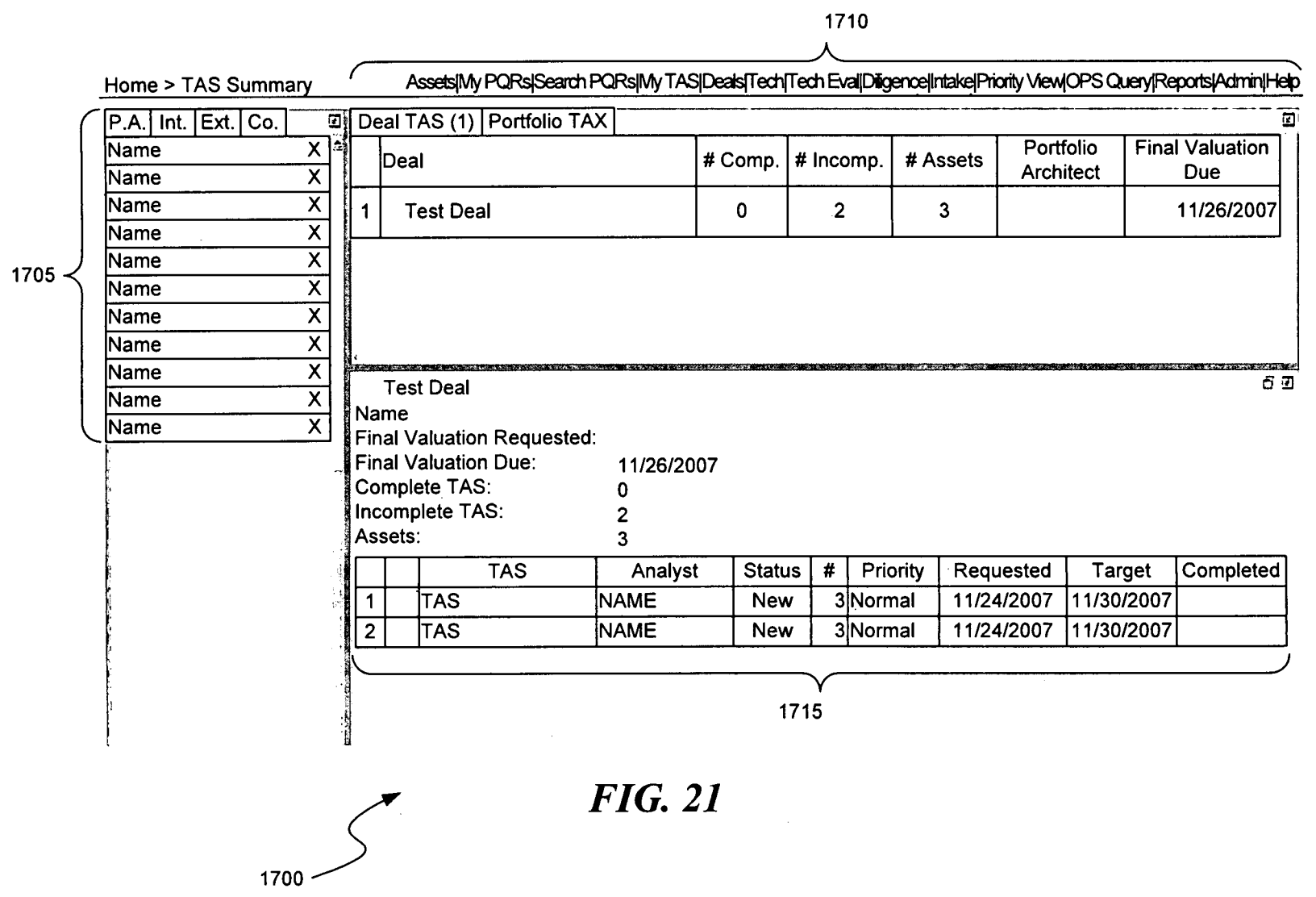

FIG. 21 is a display diagram showing the display 1700 of FIG. 17 depicting a TAS that has been assigned to an EA. The display 1700 includes a region 1705 showing the TASs that have been assigned to EAs. The display 1700 also includes a region 1710 showing the TASs for a particular Deal. The display 1700 also includes a region 1715 showing the assets in a particular Deal.

Figure 22:
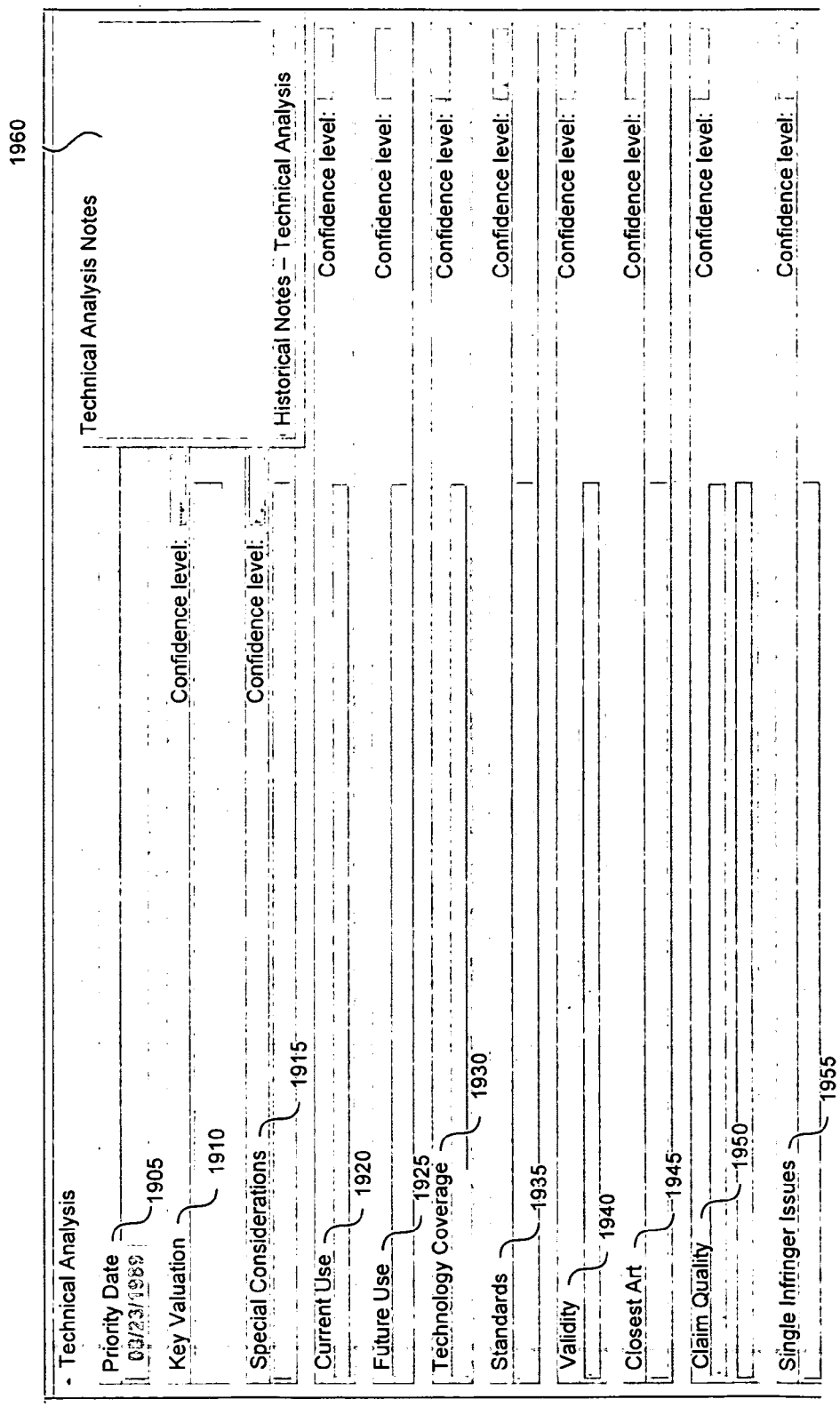

FIG. 22 is a display diagram of the display 1900 of FIG. 19 from the perspective of an EA. The EA can provide a technical analysis of an asset in a Deal by filling out the fields in the interface 1900. These fields include a priority date 1905, a key valuation 1910, a special considerations 1915, a current use 1920, a future use 1925, a technology coverage 1930, a standards 1935, a validity 1940, a closest art 1945, a claim quality 1950 and a single infringer issues 1955. With certain fields the EA can provide a confidence level indicating the level of confidence with which the EA has in his or her assessment. The interface 1900 also includes a notes region 1960 in which the EA can provide notes about his or her technical analysis.

Figure 23:
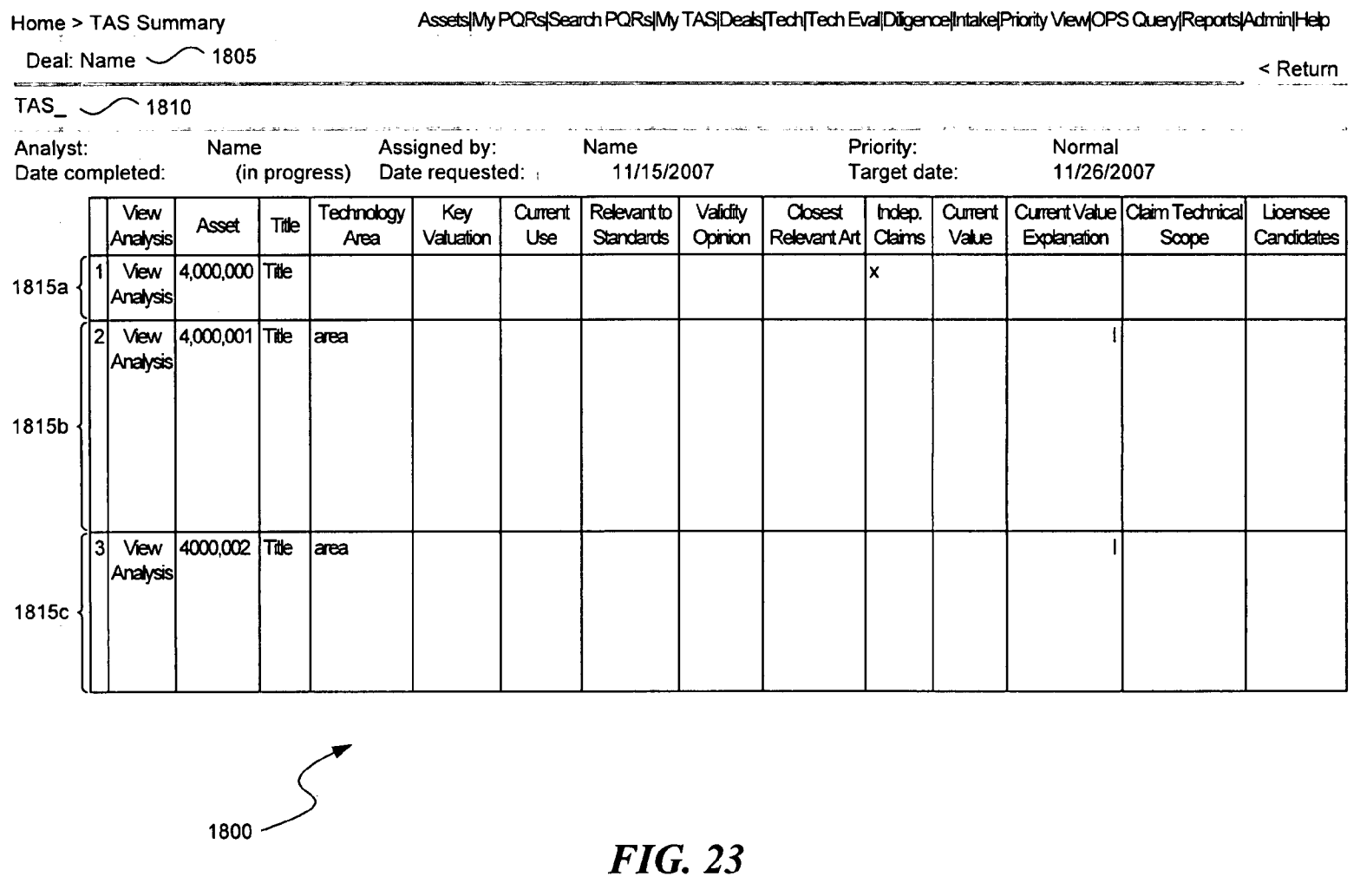

FIG. 23 is a display diagram showing the display 1800 of FIG. 18 depicting the results of a TAS summary provided by an EA. The display 1800 includes a Deal name 1805, a TAS name 1810 and a listing of the assets involved in the Deal, 1815a-c, for which a TAS has been performed.

FIG. 24 is a display diagram of the display 1200 of FIG. 12 depicting the TASs that have been performed for the assets in the Deal. As shown, the display 1200 includes a region 1210 which includes information about the technology valuation requested. The region 1210 displays several fields, such as final valuation complete, and date completed, which depict that the TAS has been requested and performed for the assets in the Deal. The TASs that have been performed are shown in region 2405.

Figure 25B:
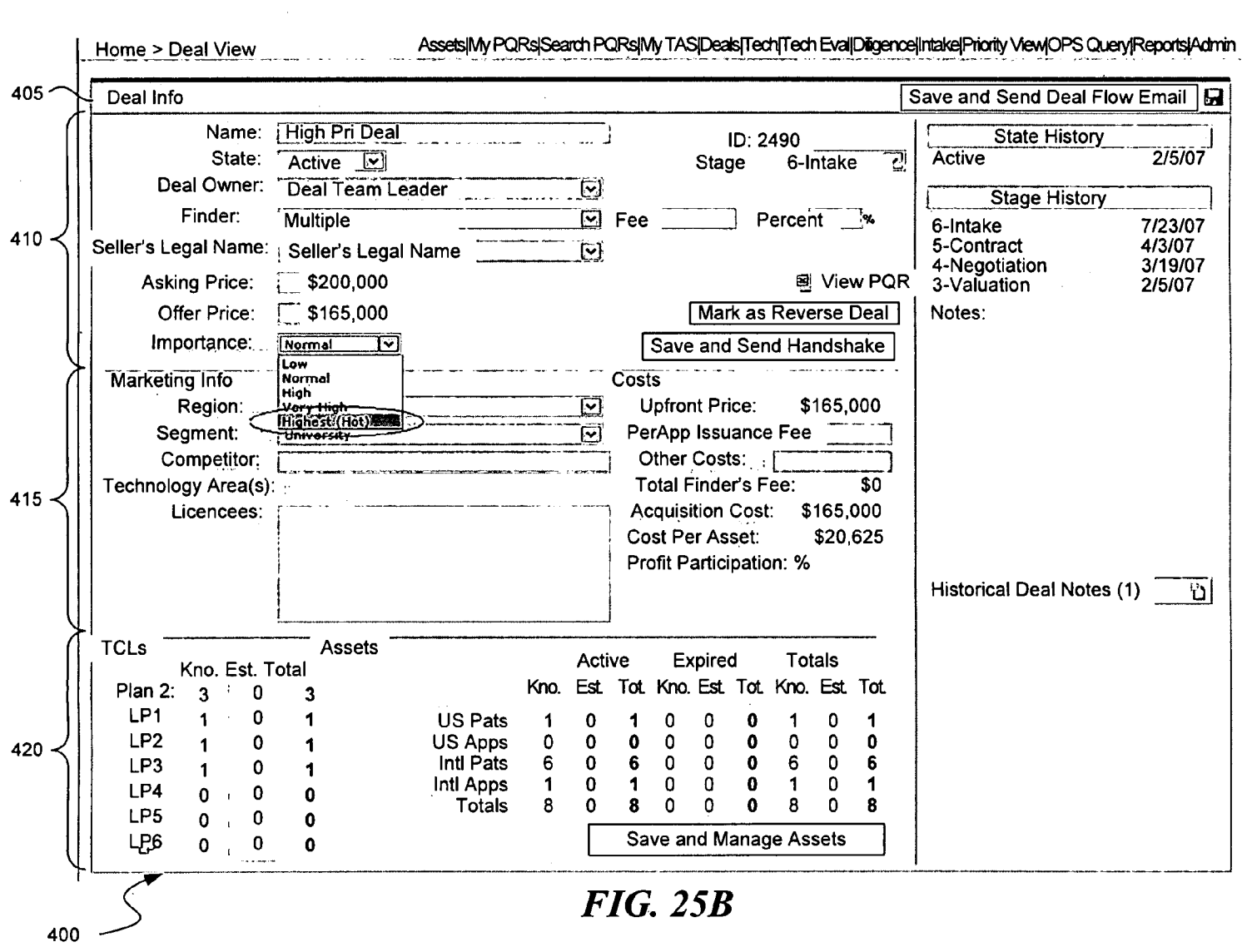

FIGS. 25A-C are display diagrams showing sample displays presented by the facility in connection with the priority of a Deal, the priority of the Deal being changed, and the results of a changed priority of a Deal, respectively, in some embodiments. In FIG. 25A the displays 2500 depicts Deals in different stages including a Final Valuation stage, a Due Diligence stage, an Intake-First Look stage, and an Intake-Resolving stage. In the Intake-Resolving stage, there is a high priority Deal, shown as item 2505. A DTL (or other user with the appropriate role-based permissions) can change the priority of this Deal by selecting the Deal and changing one or more of its attributes, such as the Deal priority. This can affect the tasks or work items associated with the particular Deal that are assigned to the various users associated with the Deal. In some embodiments, the facility elevates the priorities of the various tasks or work items associated with the Deal in order to convey the raised importance of the Deal to the various associated users.

FIG. 25B is a display diagram of the display 400 of FIG. 4 showing the importance, or priority, of a Deal being changed. The name of the Deal, as shown in region 410, is High Pri Deal. The importance of the Deal is currently normal. The DTL (or other user with the appropriate role-based permissions) can change the importance of the Deal. As depicted, the DTL has changed the importance from normal to highest. As previously noted, the changed importance of the Deal affects the tasks or work items associated with the Deal that are assigned to the various users associated with the Deal.

FIG. 25C is a display diagram of the display 2500 of FIG. 25A showing the Deal after its priority has been changed. As depicted, the Deal 2505 has had its priority changed from normal to highest priority. This has changed the color of the Deal, to give a visual indication to those users associated with the Deal of its new priority. In some embodiments, the facility uses other methods to visually display a higher or lower priority of a Deal, such as reordering the Deal in a list of Deals, and reordering the tasks or work items associated with that particular Deal in the work queues of the various users associated with the Deal.

In some embodiments, during the Valuation stage, the facility performs an estimate of a Total Cost of Ownership (TCO) of one or more assets in the Deal. In some embodiments, the facility enables a user, (e.g., a PA or other user with the appropriate role-based permissions) to perform the TCO of one or more assets in the Deal. In some embodiments, the facility obtains information regarding the TCO of one or more assets in the Deal from a user (e.g., a PA or other user with the appropriate role-based permissions) or from a service (e.g., a valuation service within or without the organization implementing the facility).

4. Negotiation

Negotiation generally refers to the process of negotiation over various aspects of a Deal (e.g., the assets in the Deal, the Deal price, etc.) and occurs primarily between the DTL and the seller. During Negotiation, the DTL uses information about the Deal and the assets in the Deal obtained during the Prospecting, Qualification and Valuation stages to assist with negotiation with the Seller. The DTL can also use information about the Deal obtained during the Diligence and Intake stages. Thus, one advantage provided by the facility in some embodiments is providing information to DTLs that is useful during the Negotiation process.

Figure 26:
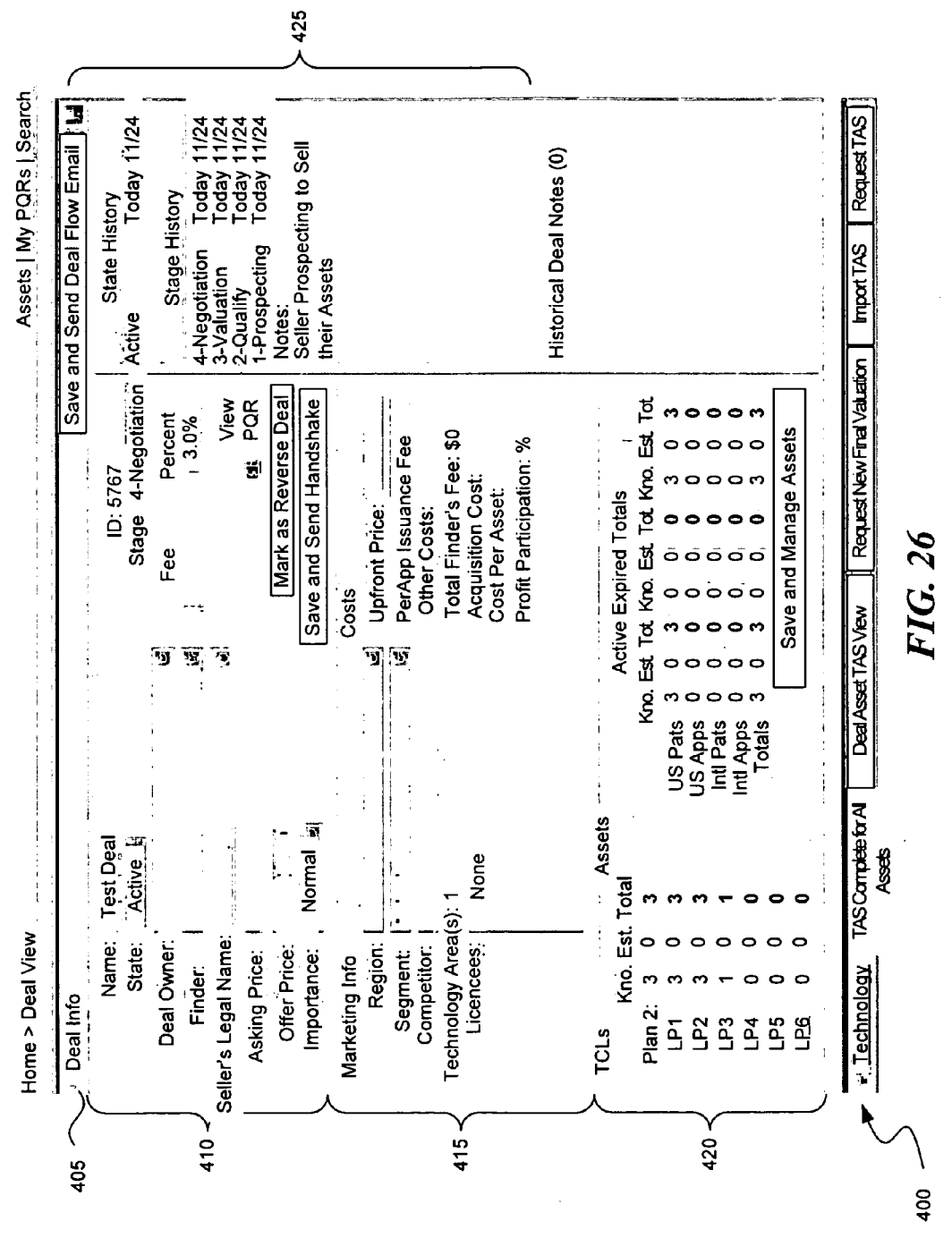

FIG. 26 is a display diagram of the display 400 of FIG. 4 depicting a Deal after it has moved to the Negotiation stage. This is shown in region 425, showing that the Deal in the stage history of the Deal is at Negotiation, after having completed the Prospecting, Qualification, and Valuation stages.

5. Diligence

Diligence generally refers to the process of discovering and analyzing assets related to assets in a Deal. For example, a U.S. patent application may have parent and children patents and/or patent applications. During the Diligence process the facility enables the discovery and analysis of such related assets.

Figure 27:
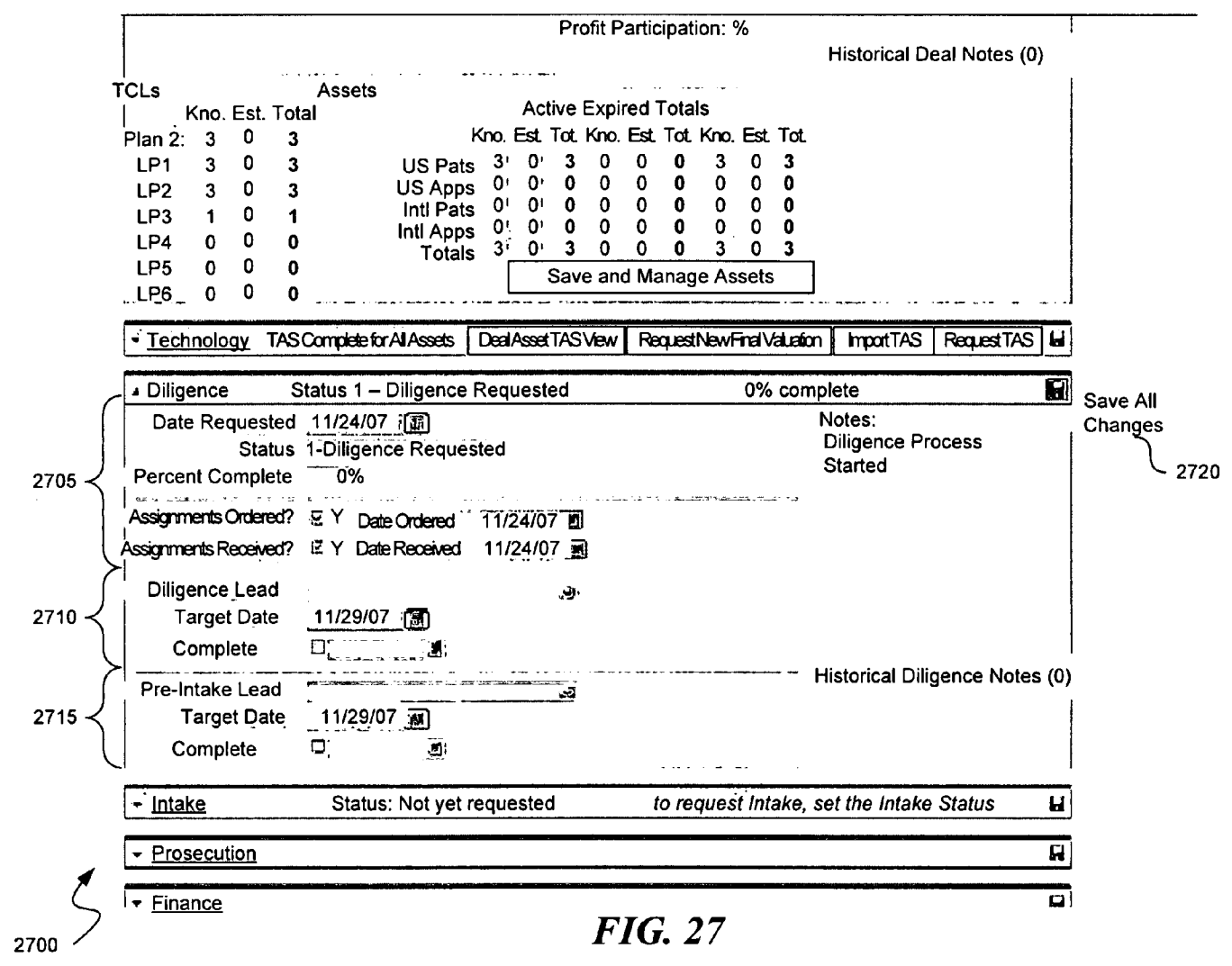

FIG. 27 is a display diagram of a display 2700 presented by the facility in connection with a Diligence Request in some embodiments. The display 2700 corresponds to the Diligence section of the Deal view of the Deal Management component 205 of FIG. 2. The DTL (or other user with the appropriate role-based permissions) can request Diligence for the Deal assets. The display 2700 includes a region 2705 in which the requestor can input, edit, and/or view information about the Diligence request, such as the date requested, the status and the percent complete. The display 2700 also includes a region 2710 in which a Diligence Lead (DL) can be assigned and a target date for the Diligence being completed. The interface 2700 also includes a region 2715 in which the DTL can specify, change and/or view a Pre-Intake Lead (PIL) and a target date for pre-intake. The DTL can save changes by selecting button 2720.

FIG. 28 is a display diagram showing a sample display 2800 presented by the facility in connection with a Diligence Manager view in some embodiments. The interface 2800 corresponds to the Diligence Manager Home view of the Diligence Management component 220 of FIG. 2. A Diligence Manager (DM) can access the display 2800 to view unassigned and assigned diligence requests. In region 2805 are shown unassigned Diligence requests and information about each Diligence request such as the Deal name, the DL, the PIL, the status, the date requested, the Diligence target date and the pre-intake target date. In region 2810 are shown assigned Diligence requests organized by name of the DL. In region 2815 are shown assigned pre-intake requests organized by name of the PIL.

Figure 29:
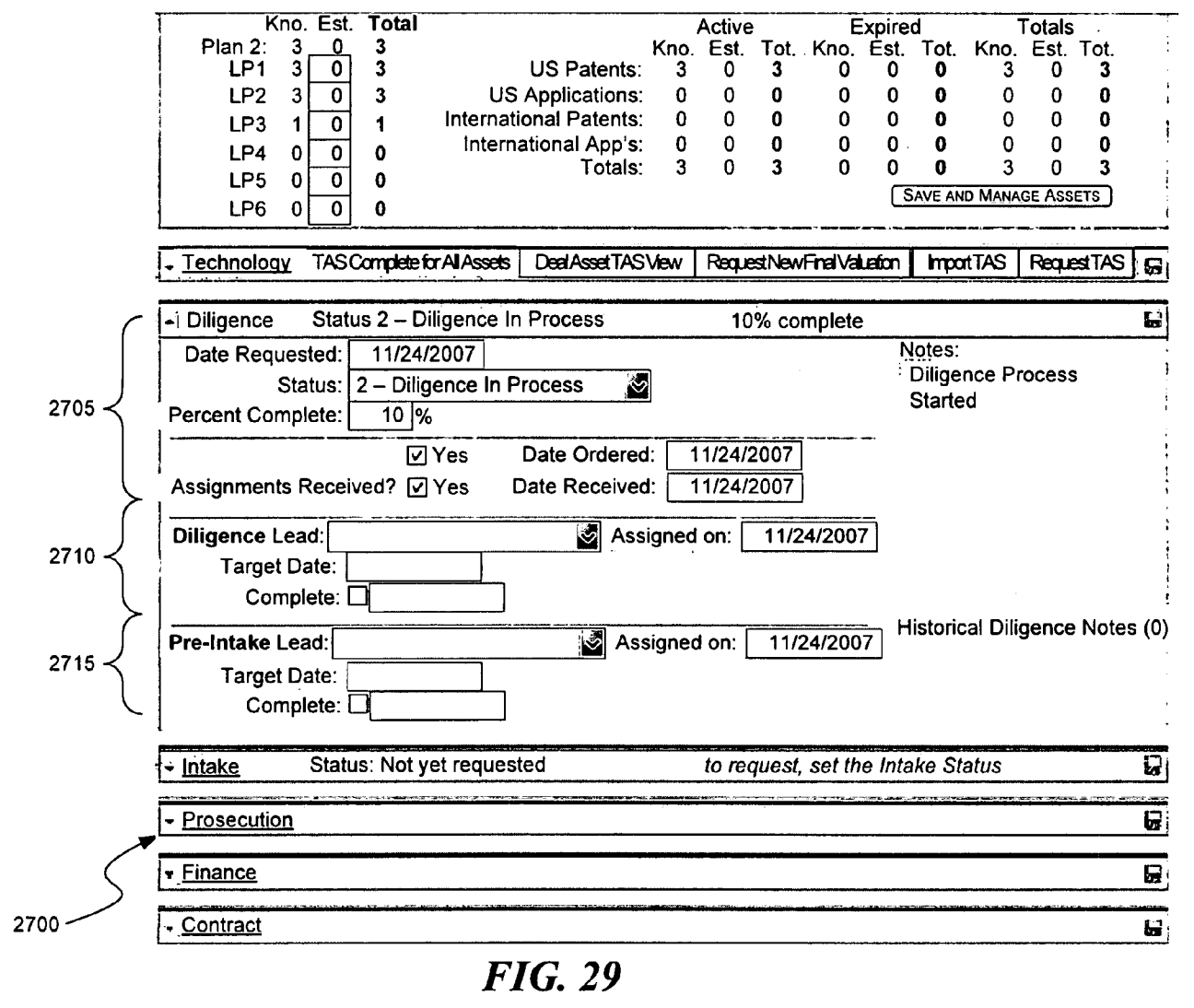

FIG. 29 is a display diagram showing the display 2700 of FIG. 27. As depicted, the display 2700 shows that a DL named Diligence Lead 1 has been selected, with a target date for the completion of the Diligence of Nov. 28, 2007. Region 2715 also shows that a PIL named Pre-Intake Lead 1 has been selected, with a target date of Nov. 28, 2007. In region 2705 the status of the Diligence is shown as 2-Diligence in progress, with a percent complete of 10%.

The DL navigates to the Deal view for the Deal and then the Deal asset management module to get the current lists of assets for the assigned Deal. This list is referred as the Seller's list of assets, and may not reflect the full family of applications and patents that are associated with the Seller's list. This Seller's list of assets is then submitted to a Master Diligence Report (MDR) process, which attempts to discover the full families of the assets. The MDR process is further described with reference to e.g., FIGS. 58A and 58B. The output of the MDR process is the Diligence Sheet, which is broken out by asset family.

FIG. 30 is a display diagram showing a sample display 3000 presented by the facility in connection with Diligence Sheets in some embodiments. The display 3000 presents the Diligence Sheet as organized by asset family and including all the assets (or substantially all the assets) within that particular family, and information about each particular asset. This information includes class codes, art unit, patent number, country, title, inventors, patent date, application number, and application date. The facility can use color or other indicators to indicate information about each asset. For example, certain assets can be colored a certain color to indicate the assets that are for sale by the Seller. Other assets can be colored another color to indicate that these assets may require further investigation.

After obtaining the Diligence Sheet, the DL then does further online discovery and exploration (e.g., manual verification of the information obtained through the MDR process) to ensure that the Diligence Sheet has the complete families for all assets in the Seller's list. Any important notes relating to filing history, status or family can be entered in lines on the Diligence Sheet provided directly below the pertinent asset. FIG. 31 depicts the display 3000 of FIG. 30 showing lines below pertinent assets that can be used to enter information about the particular asset.

Once all family assets (or substantially all family assets) are discovered and validated, the facility then produces the full Asset List for the Deal. If at any point a Seller's list asset is removed from the Deal by the Seller, it and potentially its family can be removed from the Deal. The DL has the responsibility of removing these assets from both the Diligence Sheet and the Deal. In some embodiments, when the DL removes an asset from the Diligence Sheet, the facility automatically removes the asset from the Deal. Similarly, if the Seller adds any assets to the Deal, the facility reruns the MDR process in order to discover any additional family member assets. The Diligence Lead can then manually validate the findings in the Diligence Sheet and also update the assets in the Deal Asset Management component.

Once the Diligence Lead has completed the automated and manual research to complete the full Asset List, the first step of Diligence is complete and the Diligence status is set to Diligence complete in the Deal view. On Diligence complete, the DM assigns the Deal to a PIL to take the Deal through the Pre-Intake step. Pre-Intake includes the ordering and receiving of assignments on the Full Asset List, as well as analysis of the title documents on the full asset list. Once finished, the Diligence status is set to pre-intake complete in the Deal view. On Pre-Intake complete, the Diligence Sheet on the Deal's full Asset List is locked and the assets in the Deal Asset Management component are updated as necessary.

6. Intake

Intake generally begins when Diligence is either complete or in progress. Intake generally refers to the discovery and resolution of any issues with the Deal's full Asset List that would prevent acquisition of the assets or to the unfettered ability post-acquisition to license any of those assets. When a Seller sells or offers to sell an asset there are typically supporting materials, such as file histories, that are associated with the asset. Generally, the Seller delivers the supporting materials to a user of the facility, such as a user in the role of an Intake Manager (IM). Alternatively, the IM can order supporting materials from a third-party provider, or the Seller can provide the supporting materials to the facility in an electronic format, such as by emailing or uploading the supporting materials to the facility.

When the supporting materials for the assets on the Full Asset List are received from the Seller, the IM can access the Deal View in the Deal Management component 205 of FIG. 2 and access the Intake section in order to set the Intake Status to "0—Intake Requested." FIG. 32 is a display diagram showing a sample display 3200 presented by the facility in connection with a Deal for which Intake has been requested in some embodiments. An IM (or other user with the appropriate role-based permissions) can access the display 3200 to input, edit and/or view information regarding Intake. In region 3205, the IM can set the Intake Status, such as shown as "0—Intake Requested," as well as other information, such as the date the Deal moved to Intake, the level of Intake review, and the percent complete. Intake comprises two steps: Intake First Look and Intake Resolving Issues. In region 3205, the IM can set an Intake lead for the Intake First Look step and specify whether the initial supporting materials have been received. In region 3215, the IM can specify aspects related to the Intake Resolving Issues step.

When the Intake Status is set to "0—Intake Requested," the Deal for which Intake has been requested is shown in the Intake Manager View of the Intake Management component 230 of FIG. 2 as an Unassigned Intake Request. FIG. 33 is a display diagram showing a sample display 3300 presented by the facility in connection with an Intake Manager view in some embodiments. The interface 3300 corresponds to the Intake Manager Home view of the Intake Management component 230 of FIG. 2. An IM (or other user with the appropriate role-based permissions) can access the display 3300 to input, edit and/or view assigned and unassigned Intake requests. The display 3300 is divided into two primary regions. A first region 3305 shows the Deals for which Intake has been requested, but for which no user has been assigned to perform Intake. A second region 3310 shows the assigned Intake requests, organized by Intake Leads (ILs).

FIG. 34 shows the display 3200 of FIG. 32 showing that the IM has assigned an IL to perform Intake for this particular Deal. The IM also indicates whether the Deal is to receive full Intake or abbreviated Intake in region 3205. The Intake status can then be changed to "1—Intake in Progress."

The IL gets a working copy of the Diligence Sheet for the Deal, which becomes the Intake Sheet. FIG. 35A is a display diagram showing a sample display 3500 presented by the facility in connection with an Intake Sheet for a Deal in some embodiments. Similar to the display 3000 of the Diligence Sheet of FIG. 30, the display 3500 presents the Intake Sheet as organized by asset family and including all the assets (or substantially all the assets) within that particular family, and information about each particular asset. This information includes class codes, art unit, patent number, country, title, inventors, patent date, application number, and application date.

If a Seller removes an asset from the Deal, it and potentially its family will be removed from the Deal. In some embodiments, the facility requires the IL to remove these assets from both the Intake Sheet and the list of assets in the Deal. In some embodiments, when an IL removes an asset from the Intake Sheet, the facility automatically removes the asset from the Deal. If the Seller adds any assets to the Deal, the facility reruns the MDR process in order to discover any additional family member assets. The IL can then manually validate the MDR findings on the Intake Sheet and also update the list of assets in the Deal.

For each asset in the Intake Sheet, the IL generally reviews the following about the asset: 1) missing documents; 2) mistakes in documents; 3) correct priority claims; 4) terminal disclaimers; 5) any problems that have occurred as a part of earlier prosecution of the asset; 6) confirming that maintenance payments to patent registries are current; 7) declarations reviews; 8) assignment reviews; 9) filing receipt reviews; 10) restriction requirements; 11) Office Action references complete; 12) issue fee requirements; 13) patent term adjustments; 14) reissue bar date; 15) inventorship corrections; and 16) status of applications. The IL is not limited to reviewing the items in the preceding list and can also review other aspects of the asset. The IL notes whether the review of the preceding items has turned up any issues on the Intake Sheet for each asset.

Once the IL has completed the review of the assets on the Full Asset List and the Intake Sheet is complete, the Intake Sheet is run through the Problems Report Process. The output of this is a synopsis of the problems discovered per asset. The facility or the IL then forwards the Problems Report to the Seller. FIG. 35B is a display diagram showing a sample display 3550 presented by the facility in connection with a Problems Report in some embodiments. The display 3550 presents a Problems Report in a table format. The Problems Report includes the following columns: a file number column 3555, a status column 3560, a document issues column 3565, a title issues column 3570, a seller action column 3575 and a resolution date column 3580. The Problems Report also includes a row 3585 which presents summary information for all of the assets (or substantially all of the assets) in the Problems Report. The Problems Report also includes rows 3590 (shown individually as rows 3590*a-h*) for each asset in the Problems Report. When the Problems Report is sent to the Seller, this is a trigger that the Intake First Look step is complete. The facility or the IM or IL then sets the Intake Status to "First Look Complete" in the Deal View of the Deal Management component 210 of FIG. 2.

After the Seller acknowledges receipt of the Problems Report, the Intake Resolving Issues step begins, and the IM can set the Intake Status in the Deal Management Module, Deal View, Intake section to "Intake—Resolving Issues." As issues on each asset in the Full Asset List are resolved, the IL notes the resolution on the Intake Sheet and tracks outstanding items until all (or substantially all) are complete. In the case that there are issues that burden an asset or asset family in the Deal too heavily, the DTL can determine whether to pull that asset or family out of the Deal so that the unfettered assets can be acquired. The Intake Sheet may be run through the Problems Report process more than once over time so that a current copy of the outstanding items can be shared with the Seller.

Once all Intake issues have been resolved or the resolution dates are known, the facility, the IM or the IL can set the Intake Status in the Deal View of the Deal Management component 210 of FIG. 2 to "Intake—Issues Resolved Complete." At this point, pre-funding meetings can be scheduled with the DTL.

7. Contracts

After Diligence and Intake have been completed, the Deal moves to the Contract stage. Alternately, the Contract stage can be commenced while Diligence and/or Intake are in progress. Generally, Contracts refers to the process of creating a legally binding contract for the transfer of the assets from the seller to the organization implementing the facility. FIG. 36 is a display diagram showing the display 400 of FIG. 4 presented by the facility depicting the Deal after it has moved to the Contract stage. This is shown in region 425, showing that the Deal in the stage history of the Deal is at Contract, after having completed the Prospecting, Qualification, Valuation and Negotiation stages.

The facility provides support for the Contract stage of Deals. The facility supports role-based access to contract-related information related to a Deal. The facility supports the following roles, in addition to those previously discussed: 1) Contract Team Manager (CTM)—a manager of the Contracts Team; 2) Contract Manager (CM)—a manager of one or more contracts; and 3) Contract Team Paralegal (CTP)—a paralegal assigned to one or more contracts.

A. CTM View

When a DTL first creates a Deal (or when the Deal is first saved), the facility creates a contract for it. The facility may require that a DTL provide certain attributes of a contract (e.g., the Acquisition Entity for the Deal) prior to Handshake. When Handshake occurs, the facility initiates a request to the Contracts team for assignment of the Deal to a CM. The CTM views this request in the CTM View. The new request appears first in the CTM View as an unassigned Deal. The CTM View allows the CTM to see all new Deals which have not yet been assigned to either an individual CM or to the "Contract Team" entity. The CTM can assign the Deal to either an individual CM or to the "Contract Team" entity. If the CTM assigns the request to the "Contract Team" entity, then all CMs in the Contract Team can view the Deal, and any individual CM can edit contract data for a Deal. The CTM view also allows the CTM to view the work queue for each CM, and, for each Deal, can view the current contract data in the Contract Manager Deal Workspace. The CTM can also reassign a Deal at any time from one CM to another CM.

B. CM View

In the CM View, a CM can view all Deals that have been assigned to the CM by the CTM. There are three sections in the CM View: 1) Team Contract Requests, which lists Deals assigned to the Contract Team; 2) New Contract Requests, which lists new assignments for which no work has been done by the CM; and 3) Current Contract Requests, which lists all in-progress assignments for the CM. The Team Contract Requests section lists all Deals assigned to the "Contract Team" entity and any CM on the team can work on any Deal in the Contract Team list. When a Deal is assigned to a specific CM, the Deal is displayed in the New Contract Requests list for that Contract Manager. After the CM opens and saves the New Contract Request item in the Contract Manager Deal Workspace, the Deal moves to the Current Contract Requests list. The Deal remains in the Current Contract Requests list or the Team Contract Requests list until either the Deal is reassigned to another CM or until the Contract work is complete and the Acquisition Notice (AN) for the Deal has been sent. A CM can view and edit contract details for a Deal by selecting the Deal in the CM View. When the CM selects the Deal, the facility displays the Contract Manager Deal Workspace for the selected Deal.

C. CTP View

A CTP can view all current, post-Handshake Deals in a single work queue in the CTIP View. A CTP can view or edit contract details for a Deal by selecting the Deal in the CTP View. When the CTP selects the Deal, the facility displays the Contract Manager Deal Workspace for the selected Deal.

D. Contract Manager Deal Workspace View

The CM uses the Contract Manager Deal Workspace to track the Contract activities and data for a Deal. A CM can access the Contract Manager Deal Workspace View from the CM View by selecting the Deal. A CTP can also access the Contract Manager Deal Workspace View from the CTP View by selecting the Deal. The Contract Manager Deal Workspace View can also be accessed as Read-only by the Contract Team Manager from the CTM View. In addition, the Contract data is also viewable as Read-only directly in the Deal View, Contract section. Both CMs and CTPs can edit contract-related details in the Contract Manager Deal Workspace View. When a Handshake occurs, the data in the Contract Manager Deal Workspace View is updated.

FIGS. 37-45 are display diagrams showing sample displays presented by the facility in connection with aspects of Deal contracts in some embodiments. The displays correspond to the views available in the Contract Management component 240 of FIG. 2. A CM, CTM, and/or CTP (or other user with the appropriate role-based permissions) can access the displays in order to input, view and/or edit information regarding the contract for a Deal. FIG. 37 is a display diagram of a display 3700 depicting an Entity and Limited Partners (LP) tabbed region. The display 3700 includes fields in which a CM or CTP can view or edit information regarding the entity and LPs involved in the Deal, such as the current LPs, the entity type, the agreement type, and the acquisition entity. Certain fields in the display 3700 may not be editable (e.g., entity type), as these may be provided upon Handshake by a DTL.

FIG. 38 is a display diagram of a display 3800 depicting a Contract tabbed region. The display 3800 includes fields in which a CM or CTP can view or edit information regarding the legal contract involved in the Deal, such as which party has the contract, the date the contract was requested, and the date the first draft was sent to the DTL. Certain fields in the display 3800 may not be editable (e.g., the date the contract was requested), as these may be provided upon Handshake by a DTL.

FIG. 39 is a display diagram of a display 3900 depicting a Licensees tabbed region. The display 3900 includes fields in which a CM or CTP can view or edit information regarding licensees related to the Deal, such as information from the Deal Team, known licensees, and potential licensees.

FIG. 40 is a display diagram of a display 4000 depicting an Agreements and Common Interest Agreement (CIA) tabbed region. The display 4000 includes fields in which a CM or CTP can view or edit information regarding Agreements and CIAs related to the Deal, such as whether a Non-Disclosure Agreement (NDA) was executed, whether a CIA was executed for the Seller, and the date a received CIA was executed.

FIG. 41 is a display diagram of a display 4100 depicting a UCC, Corporate Review and Diversion tabbed region. The display 4100 includes fields in which a CM or CTP can view or edit information regarding UCC, Corporate Review and Diversion information related to the Deal, such as whether the date a UCC search was performed and any issues uncovered.

FIG. 42 is a display diagram of a display 4200 depicting an Acquisition Notice (AN) tabbed region. The display 4200 includes fields in which a CM or CTP can view or edit information regarding AN information related to the Deal, such as the amount involved and whether an AN was sent. When the AN Sent field is checked in the CMD Workspace and the workspace is saved, the Deal is removed from the CM View of the CM and the CTP View of the CTP. In some embodiments, the facility moves the Deal to a completed work queue in the CM View and/or the CTP View. In some embodiments, the facility leaves the Deal in the work queues of the CM View and the CTP View, and marks the Deal as completed.

FIG. 43 is a display diagram of a display 4300 depicting a Counsel tabbed region. The display 4300 includes fields in which a CM or CTP can view or edit information regarding up to three Outside Counsel for acquisition, such as their contact information.

Figure 44:
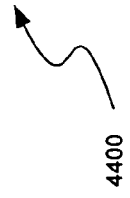

FIG. 44 is a display diagram of a display 4400 depicting a Documents tabbed region. The display 4400 includes fields in which a CM or CTP can view or edit information regarding documents related to the Deal, such as assignments, amendments, and corporate documents.

FIG. 45 is a display diagram of a display 4500 depicting a Contracts Summary Sheet tabbed region. The display 4500 includes fields regarding contract summary information related to the Deal. The display 4500 also includes a region which enables a CM or CTP to send an asset list email.

The Contract Manager Deal Workspace can also include other display (not shown) that enable CMs and CTPs to input, view and/or edit information about a Deal, such as information related to grantback licenses.

E. Deal View, Contract Section

The Contact section of the Deal View allows any user with the appropriate permissions on the Deal View to see the current state of the Contract management activity for that Deal. In general, the Contract section presents a read-only view of the information provided by the CM and/or the CTP in the Contract Manager Deal Workspace, with the addition of several fields appropriate to the Deal View, such as the name of the current CM, Temporary Notes, and Historical Notes. Other fields may be provided as necessary or desired.

8. Closing

Figure 46:
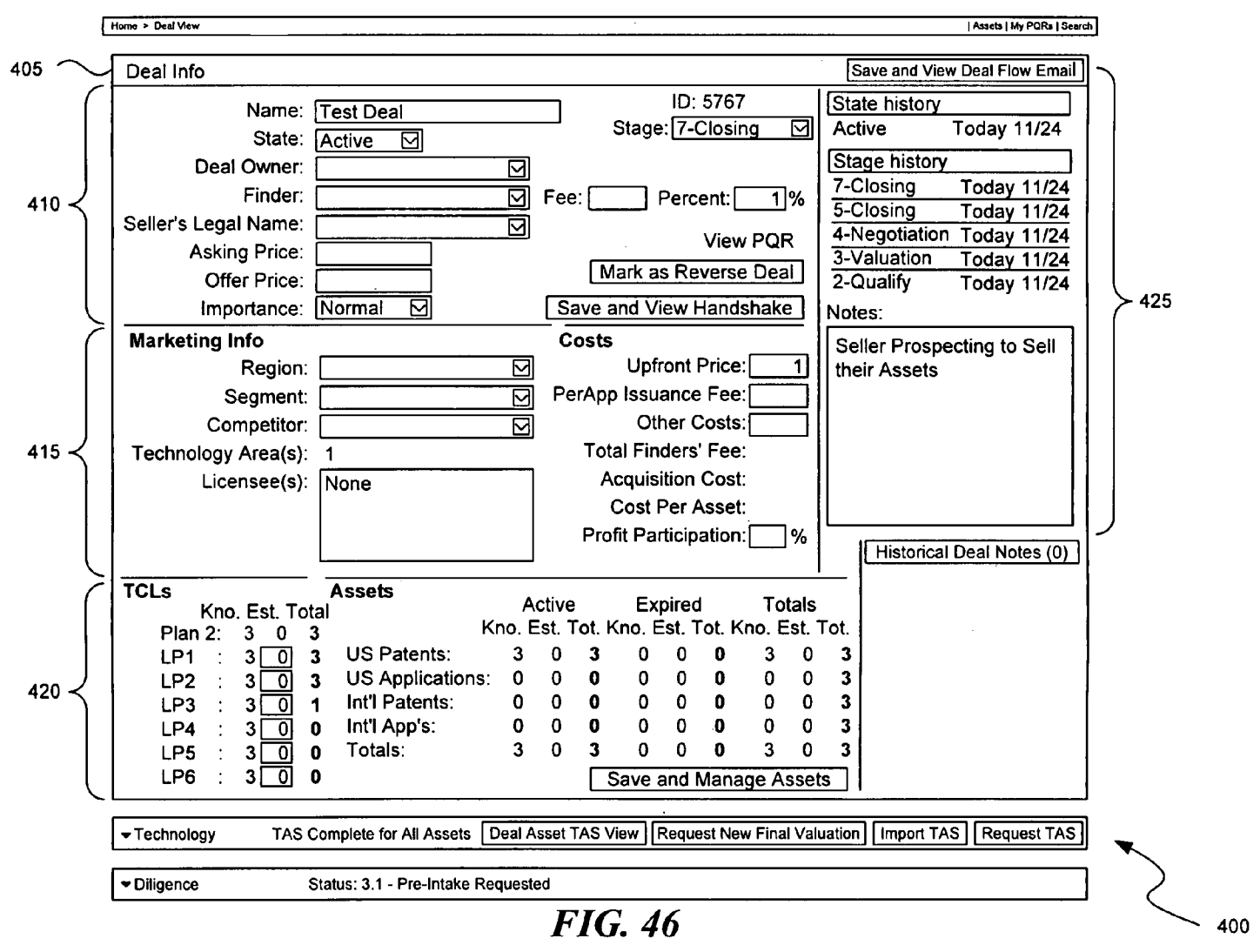

After contracts have been successfully completed, the Deal is typically funded and moves to a Closing stage. FIG. 46 is a display diagram showing the display 400 of FIG. 4 for a Deal at a Closing stage. The stage of the Deal is indicated in region 425 as "7—Closing." In some embodiments, the facility interacts with a separate financial system to effect payment to the seller for the assets in the Deal. In some embodiments, the facility interacts with separate systems to effect the recordation of the transfer of the assets (e.g., the facility may electronically provide assignment documents of U.S. patents and U.S. applications to the U.S. Patent and Trademark Office (USPTO) for recordation).

9. Post-Closing

After the Deal has closed and the organization implementing the facility has acquired the assets, the assets may require ongoing maintenance. For example, issued U.S. patents may require periodic maintenance fees to be paid. As another example, pending U.S. patent applications may require responses to outstanding USPTO office actions. The facility enables the ongoing maintenance of the assets in the Deal through a component of the facility called a Prosecution Action System (PAS).

The PAS enables both users within and without the organization implementing the facility to maintain acquired assets. A user within the organization may be in the role of a Portfolio Administrator (PA), who has responsibility for, among other things, administering a set, or portfolio, of acquired assets. Another user within the organization may be in the role of a Working Attorney (WA), who has responsibility for, among other things, the maintenance of one or more assets within one or more portfolios. An attorney outside the organization may be in the role of an Outside Counsel (OC), who has responsibility for, among other things, responding to correspondence by patent offices regarding assets.

In some embodiments, the PAS supports the following workflow: An OC receives correspondence (e.g., an office action) regarding an asset from a patent office that requires action or review by a PA and/or WA. The OC prepares a response or a recommendation regarding the correspondence. The OC accesses the PAS and is authenticated and authorized to use the PAS. The OC provides an indication of the asset. The PAS validates the OC-provided indication of the asset against a database. The OC provides the response or recommendation to the PAS. The PAS adds a work item regarding the provided response or recommendation to the work queue of the associated WA and/or PA. The WA and/or PA reviews the provided response or recommendation and provides PAS with comments regarding the provided response or recommendation. The WA and/or PA may also provide information regarding the quality of the response or recommendation, the time spent reviewing the response or recommendation, and other information to the PAS. The PAS updates the database to reflect the actions by the OC and the WA and/or PA. The PAS sends comments and/or instructions back to the OC via email. The PAS then clears WA and/or PA work queue of the work item.

The PAS supports the following actions, among others: 1) office actions and responses; 2) notices of allowance and continuation decisions; 3) restriction requirements and divisional decisions; 4) broadening reissue decisions; 5) foreign filing decisions; and 5) and national stage decisions.

Figure 47:
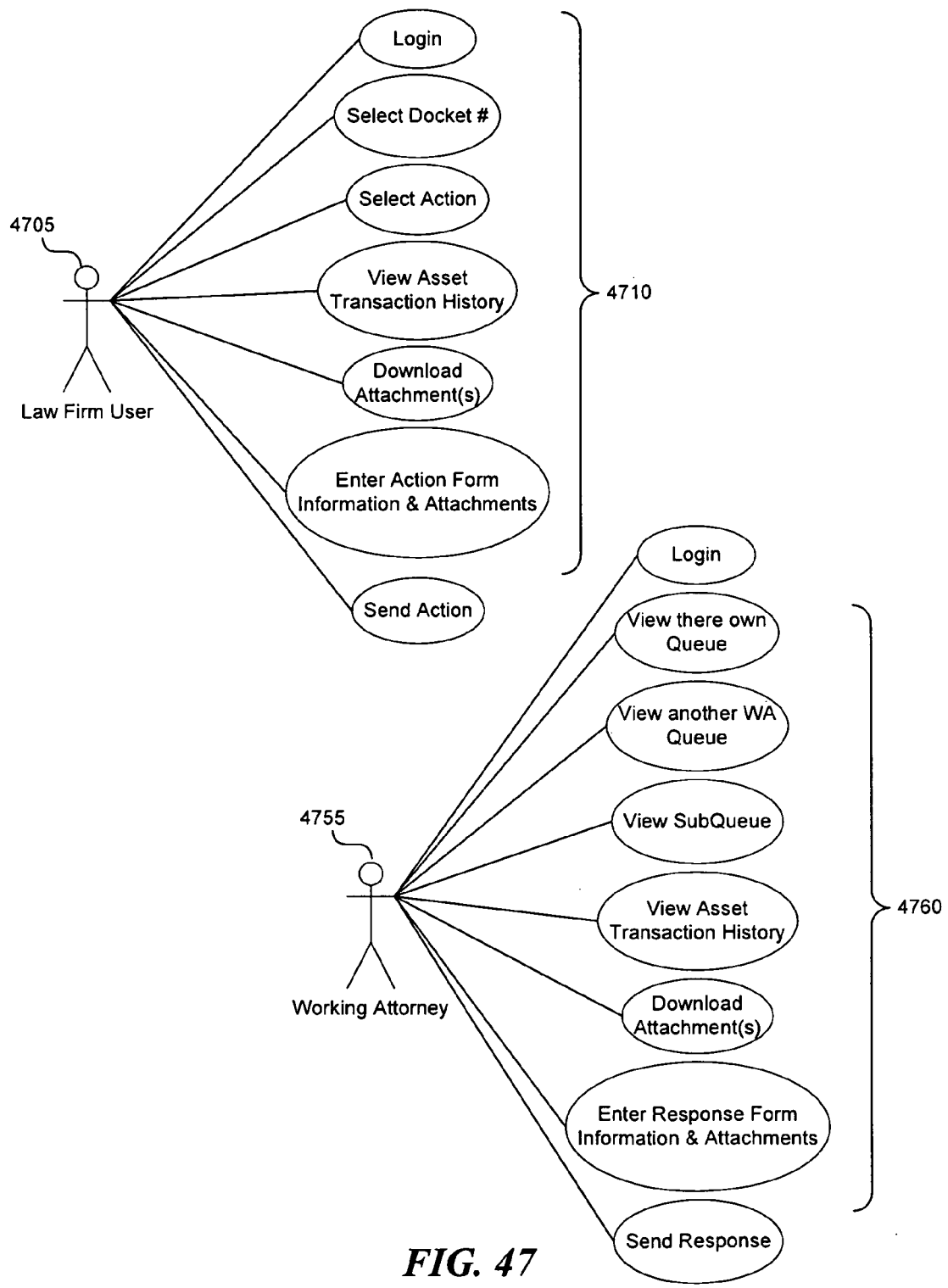
FIG. 47 is a display diagram showing actions available to users of a Prosecution Action System in some embodiments.

FIG. 47 is a display diagram showing actions 4710 available to a law firm user 4705 (e.g., an OC) and actions 4760 available to a WA in a Prosecution Action System in some embodiments. The actions 4710 include logging in to the PAS, selecting the docket number of an asset, selecting an action, viewing an asset transaction history, downloading attachments, entering action form information and attachments, and sending an action. The actions 4760 include logging in to the PAS, viewing the work queue of the WA, viewing the work queue of another WA, viewing a sub-work queue, viewing an asset transaction history, downloading attachments, entering response form information and attachments, and sending a response.

Figure 48:
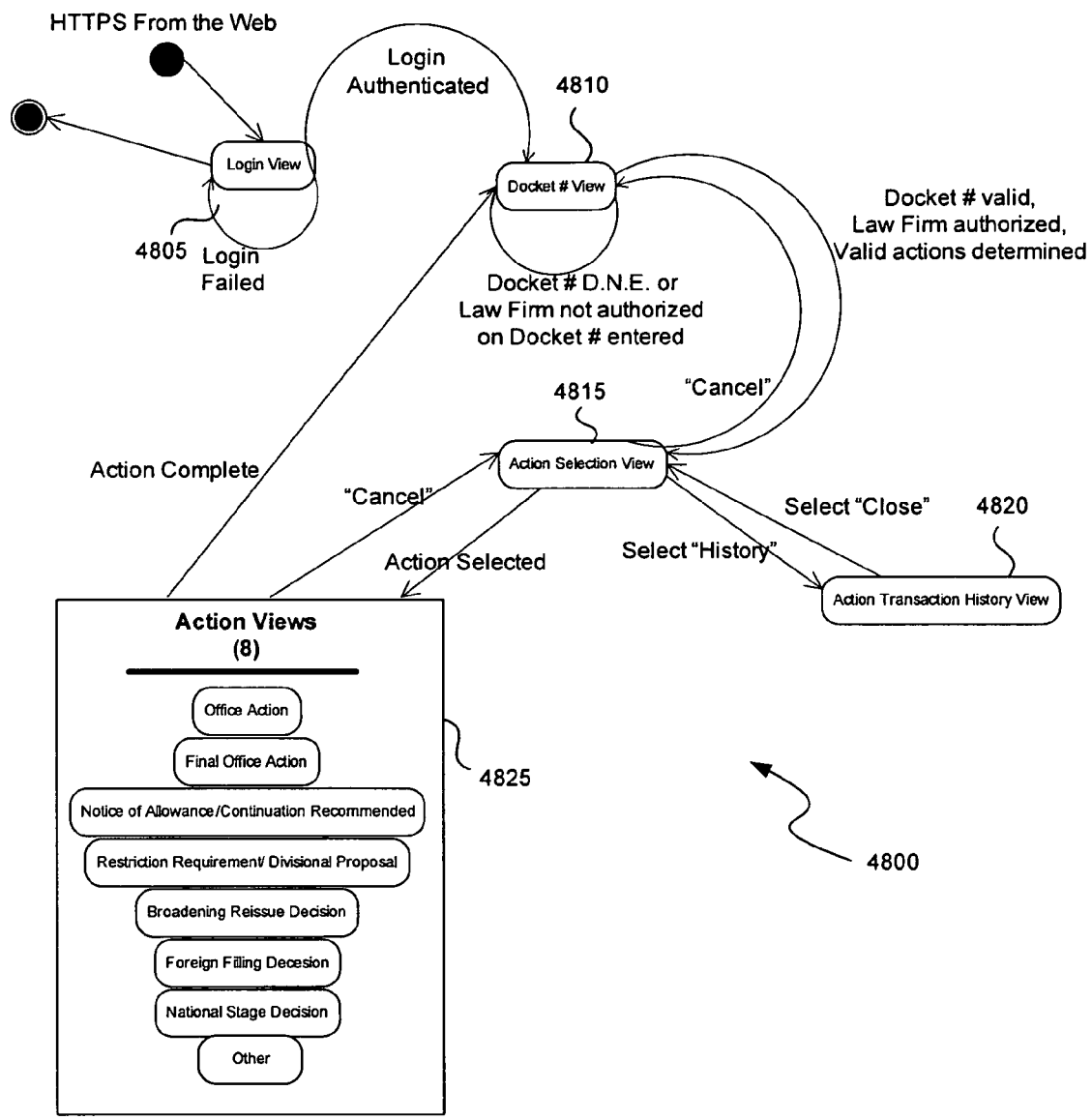
FIG. 48 is a diagram showing view flows for a law firm user of a Prosecution Action System in some embodiments.

FIG. 48 is a diagram showing view flows 4800 for a law firm user (e.g., an OC) of a Prosecution Action System in some embodiments. An OC accesses the PAS over a network connection (e.g., over the Web using a web browser with HTTPS) and sees a login view 4805. The OC provides credentials to authenticate himself or herself (e.g., a user name and password). If the PAS does not authenticate the OC, the OC is again presented with a login view 4805 and an indication of the unsuccessful authentication. If the PAS authenticates the OC, the PAS provides the OC with a docket number view 4810. The OC then provides a docket number (e.g., a docket number associated with the asset, such as an OC docket number or a WA docket number). If the OC provides a docket number that either does not exist or if the OC is not authorized to access the asset associated with the docket number, then the PAS provides the OC with the docket number view 4810 and an indication of the unsuccessful attempt to access the asset. If the docket number is valid and the OC is authorized to access the access the associated asset, then the PAS provides the OC with an action selection view 4815. The action selection view 4815 includes actions 4825, such as: 1) office action; 2) final office action; 3) notice of allowance/continuation recommended; 4) restriction requirement/divisional proposal; 5) broadening reissue decisions; 6) foreign filing decision; 7) national stage decision; and 8) other actions. The OC can also select viewing the history of an asset and be provided with an asset transaction history view 4820.

Figure 49:
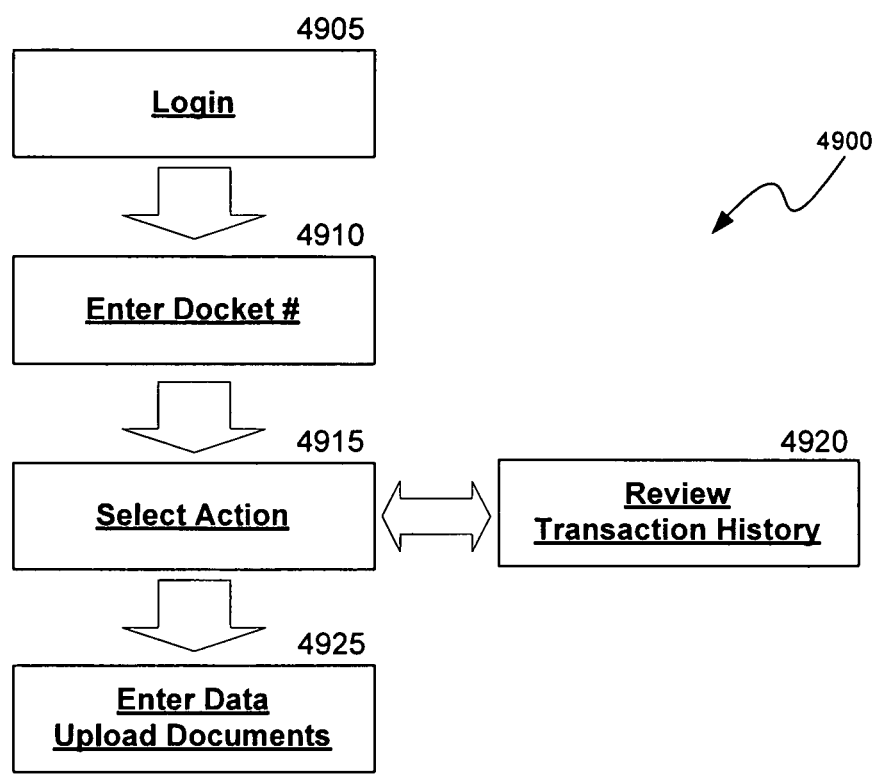
FIG. 49 is a flow diagram of a process implemented by the facility for a law firm user of a Prosecution Action System in some embodiments.

FIG. 49 is a flow diagram of a process 4900 implemented by the facility for a law firm user (e.g., an OC) of the PAS in some embodiments. At block 4905, the OC logs into the PAS. At block 4910, the OC enters the docket number of an asset to access. At block 4915, the OC selects an action for the asset. Alternately at block 4920, the OC can review the asset transaction history. At block 4925 the OC enters data and uploads documents (e.g., proposed office action responses) to the PAS.

Those skilled in the art will appreciate that the steps shown in FIG. 49 and in each of the flow diagrams discussed below in reference to FIGS. 53 and 54 may be altered in a variety of ways. For example, the order of the steps may be rearranged; substeps may be performed in parallel; shown steps may be omitted, or other steps may be included; etc.

FIG. 50 is a display diagram of a sample display 5000 presented by the facility in connection with OCs accessing the PAS. The OC can type in a one of two docket numbers: the OC docket number or the WA docket number. The OC can select "Cancel" to clear the entry fields. The OC can select "OK" to start the docket number validation process. If the docket number is validated for access by this OC, the PAS will take the user to the Action Selection View for the asset related to the docket number entered.

FIG. 51 is a display diagram of a sample display 5100 presented by the facility in connection with OCs selecting the action type for assets. The docket number has been validated in order for the OC to reach this view. In some embodiments, the docket number must pass two criteria checks to validate the user selection. These criteria checks compare the data entered by the user with data stored within a database. The following are the two criteria required for validation: 1) The docket number must exist in the database. If the OC entered an outside counsel docket number, the data can be pulled from the OC docket number field in the database; or if the OC entered a WA docket number, the data can be pulled from the WA docket field in the database. 2) The OC selecting the docket number must be associated with the law firm that is assigned to the asset referenced by the docket number.

In some embodiments, the facility determines the actions presented in the selection action list in the interface 5100 by the validation criteria. As previously noted, there are several possible actions: 1) office action; 2) final office action; 3) notice of allowance/continuation recommended; 4) restriction requirement/divisional proposal; 5) broadening reissue decisions; 6) foreign filing decision; 7) national stage decision; and 8) other actions. The facility provides a subset of the available actions for each specific docket selected by the OC. This subset is based on validation criteria stored in the database for each asset. For example, in order for the "office action" action to be available, the asset status must be filed. As another example, in order for the broadening reissue decisions to be available, the asset status must be granted (e.g., a patent must be issued, or granted) and the grant date must be less then 2 years in the past from the current date. In general, the validation criteria for available actions is described by the following table:

| | Validation Criteria | | | |
|---|---|---|---|---|
| Action Type | Asset Status | Grant Date | Asset Country | Application Date |
| Office Action | Filed | — | — | — |
| Final Office Action | Filed | — | — | — |
| Notice of Allowance/ Continuation Recommendation | Filed | — | — | — |
| Restriction Requirement/ Divisional Proposal | Filed | — | — | — |
| Broadening Reissue | Granted | less then 2 years in the past from current date | — | — |
| Foreign Filing Decision | Filed | — | — | 1 year or less in the past from current date |
| National Stage Decision | Filed | — | PCT or EPO | — |
| Other | — | — | - | — |

The validation criteria in the preceding table may be based on laws and regulations applicable to the asset which may be subject to change, and therefore, the validation criteria may also change.

The OC selects from the subset of available actions, determined in the validation process, in a drop-down list. If the OC selects "OK," they will navigate to the Action View corresponding to the action the OC selected from the action drop down list. Nothing will occur if they have not selected an action from the drop down list. If the OC selects "Cancel," they will navigate to the display 5000 of FIG. 50. If the OC selects "Asset Transaction History," they will be taken to an asset transaction history view, described with reference to, e.g., FIG. 57. If the OC selects the "HELP" link, they will navigate to an information page that may include tutorials for use in understanding the PAS. If the OC selects the "Action Not Found," their default mail client will be opened to send an email to the WA and/or PA.

FIG. 52 is a display diagram of a sample display 5200 presented by the facility in connection with OCs providing relevant information and attachments regarding assets. The display 5200 may change depending upon the action selected in the display 5100 of FIG. 51. For example, there may be eight (or more) variations of the display 5200, one for each of the eight possible actions. The display 5200 allows an OC to provide an email address, the date the action was mailed from the patent office, the due date for response, comments regarding the action and/or proposed response or recommendation, attach the office action, attach the proposed response or recommendation, to submit the provided information, and to cancel. Depending on the action selected, the display 5200 may have other buttons, such as a button to allow the OC to provide other documents or materials.

Figure 53:
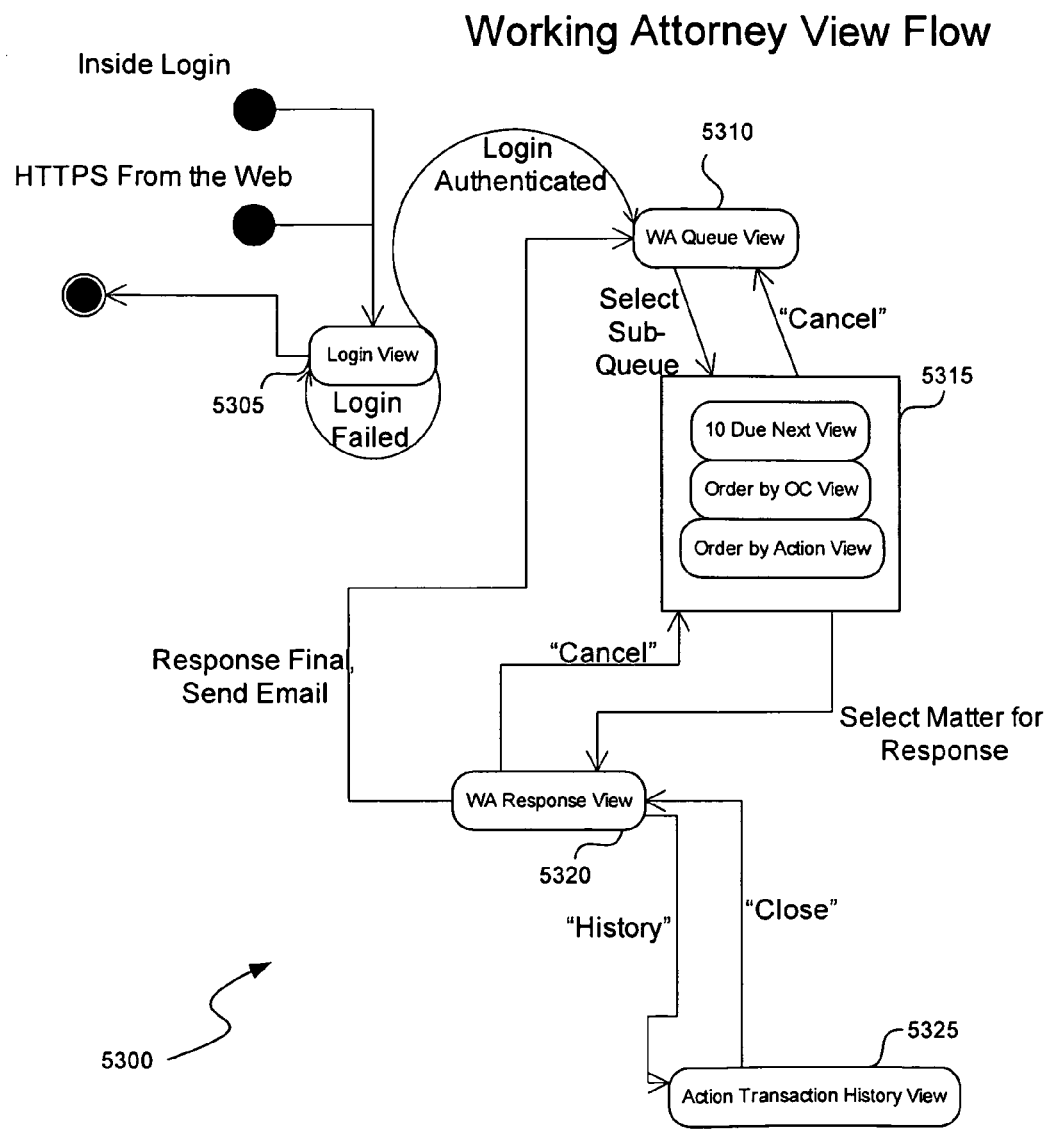
FIG. 53 is a diagram showing view flows for a working attorney user of a Prosecution Action System in some embodiments.

FIG. 53 is a diagram showing view flows 5300 for using the PAS from the perspective of a WA and/or a PA in some embodiments. A WA accesses the PAS over a network connection (e.g., over the Web using a web browser with HTTPS, or over an intranet connection) and sees a login view 5305. The WA provides credentials to authenticate himself or herself (e.g., a user name and password). If the PAS does not authenticate the WA, the WA is again presented with a login view 5305 and an indication of the unsuccessful authentication. If the PAS authenticates the WA, the PAS provides the WA with a work queue view 5310. The WA then can select a subset of the work queue, such as the ten work items next due, to order the work items by OC, or to order them by action. When the WA selects a work item, the PAS presents the WA with a response view 5320. The WA can select viewing the history of an asset and be provided with an asset transaction history view 5325.

Figure 54:
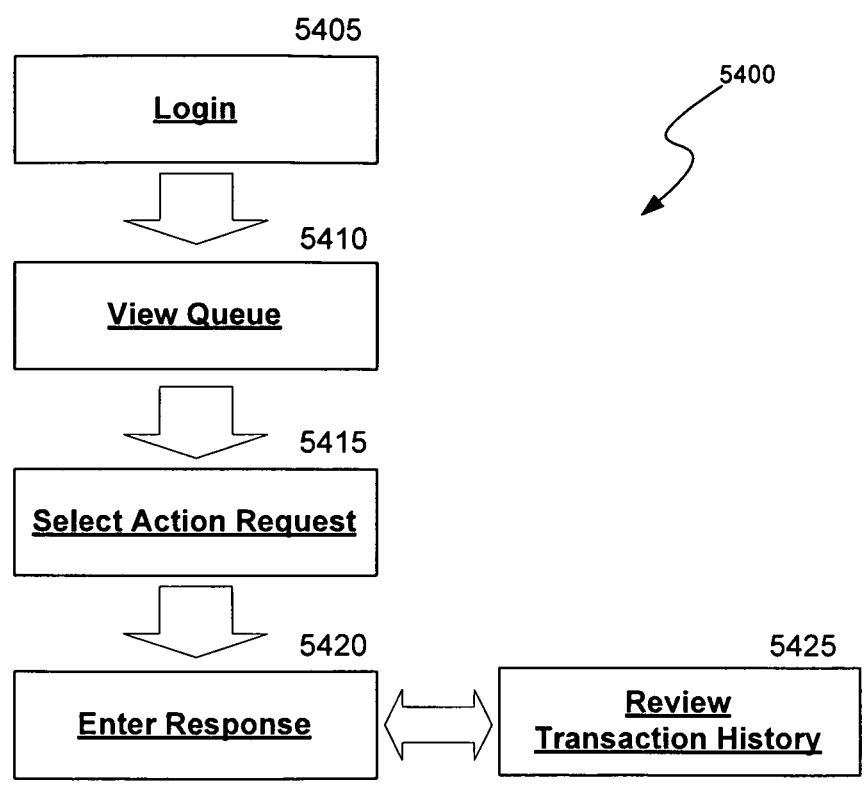
FIG. 54 is a flow diagram of a process implemented by the facility for a working attorney user of a Prosecution Action System in some embodiments.

FIG. 54 is a flow diagram of a process 5400 implemented by the facility for a WA user of the Prosecution Action System in some embodiments. At block 5405, the WA logs into the PAS. At block 5410, the WA views his or her work queue. At block 5415, the WA selects an action request for an asset. At block 5420 the WA enters a response to an action request. Alternately at block 5425, the WA can review the asset transaction history.

Figure 56:
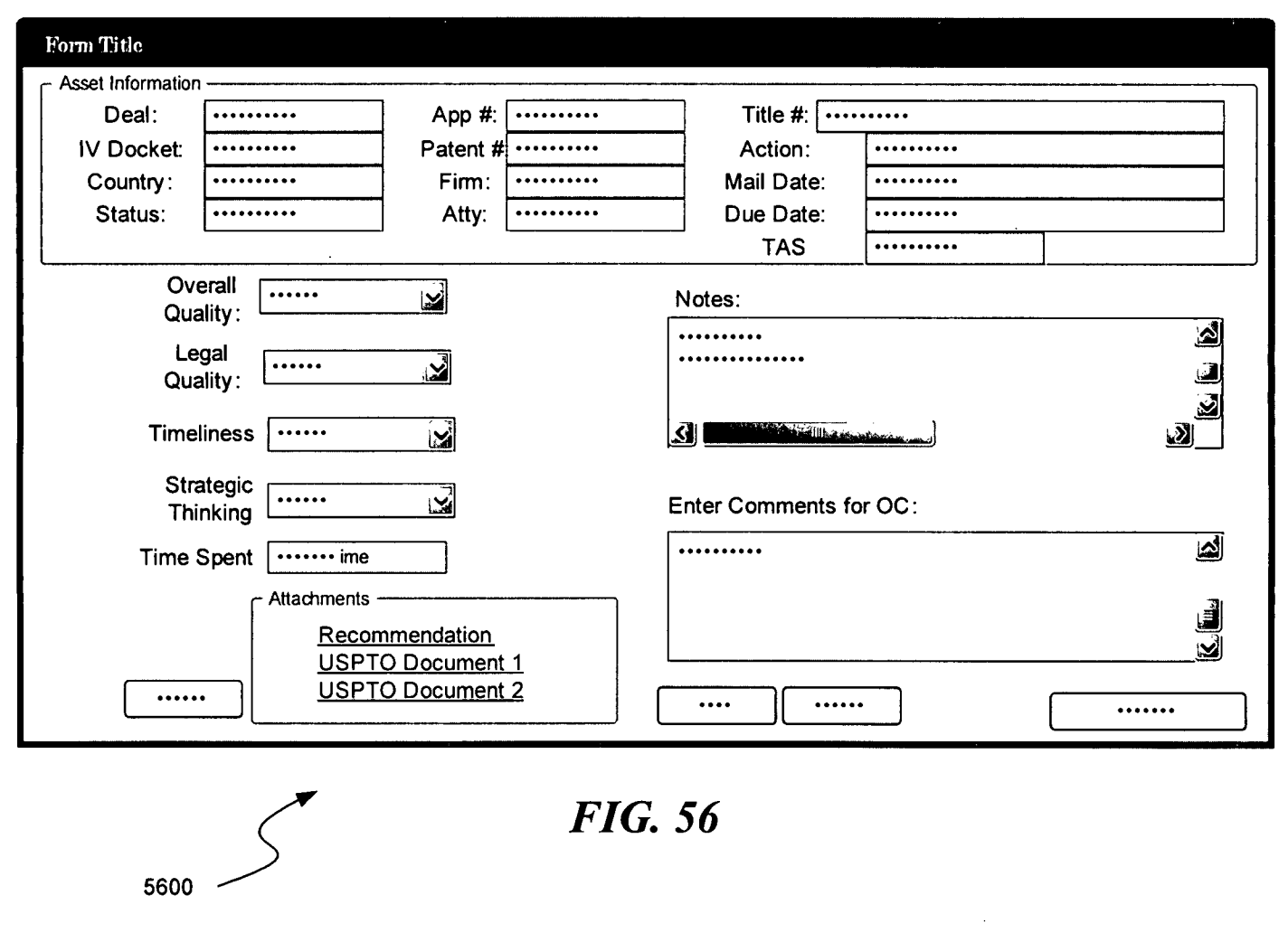

FIG. 55 is a display diagram showing a sample display 5500 presented by the facility in connection with a WA queue interface in some embodiments. The WA can click on a number of tabs 5510 to see different arrangements of work items awaiting their review. The tab "25 Due Next" shows work items in descending order with closest due date to the current time listed first. Response requests with the same due date are listed in order of earliest entry by OC. The WA can select a response request and navigate to the action response view for that response request, such as is shown in FIG. 56. For the tab "Order by OC" the WA can view action requests organized by OC. Each OC entry selected can list at the bottom of the view 25 action response requests in descending order with closest due date to the current time listed first. Response requests with the same due date should then be listed in order of earliest entry by OC. The WA can select a response request and navigate to the action response view for that response request, such as is shown in FIG. 56. The "Order by Action" tab shows work items ordered by action. Each action selected can list at the bottom of the view 25 action response requests in descending order with closest due date to the current time listed first. Response requests with the same due date are then listed in order of earliest entry by OC. The WA can select a response request and navigate to the action response view for that response request, such as is shown in FIG. 56. In some embodiments, the work items listed on each tab are displayed with information about the work item, such as the due date, the WA docket number, the Deal, the country, the application number, the patent number, the title, and other information. Each tab has a drop down list field to select which WA (or paralegal) queue to view. In some embodiments, this field is set to the work queue of the WA currently logged in. The WA can choose to view and edit other WA work queues for which the WA has the appropriate permissions. If the WA chooses to view another WA's work queue, the PAS can indicate that it is a different WA's work queue by use of color or other indicators.

FIG. 56 is a display diagram showing a sample display 5600 presented by the facility in connection with an action response interface for a WA in some embodiments. The display 5600 shows contents of fields retrieved from a database, such as the Deal name, the WA docket number, the country, the status, the application number, the patent number, the title, and other information. The display 5600 has links to the OC-provided proposed response or recommendation and supporting documents. The WA can provide information regarding the proposed response provided by the OC, such as the overall quality, the legal quality, the timeliness and the strategic thinking. The WA can also provide note regarding the work item, comments for the OC, and enter the time the WA spent on the work item. The WA can also attach other documents regarding the work item. The options available in the action field can be populated based upon the action type. For example, the following table provides available options, based upon the action type:

| Action Response View, Action Response Selection Options | |
| --- | --- |
| Action Type | drop-down box options |
| Office Action | Revise and File Response. |
| | Revise and return new draft. |
| | Do not file response/Abandon. |
| Final Office Action | Revise and File Response. |
| | File RCE. |
| | File Appeal. |
| | Do not file response/Abandon. |
| NOA/Continuation | File Continuation |
| | Do Not File Continuation |
| Restriction/Divisional | File Divisional |
| | Do Not File Divisional |
| Broadening Reissue | File Broadening Reissue. |
| | Do not File Broadening Reissue. |
| Foreign Filing | File PCT. |
| | File National Stage. |
| | Do Not Foreign File. |
| National Stage | File National Stage. |
| | Do Not File National Stage. |
| Other. | No options |

If the WA selects the send button in display 5600, the facility generates an email to be sent to the appropriate OC that provides the WA-provided instructions, attachments, and any other materials.

The facility then updates the database based upon the action response, according to the following table:

| Action Response View, Database Update | |
| --- | --- |
| Action Response Type | Database Update |
| Revise and File Response. | — |
| Revise and return new draft. | — |
| Do not file response/Abandon. | Mark Status "INACTIVE" |
| File RCE. | — |
| File Appeal. | — |
| File Continuation | Create new Continuation record |
| Do Not File Continuation | — |
| File Divisional | Create new Divisional record |
| Do Not File Divisional | — |
| File Broadening Reissue. | Create new Reissue record |
| Do not File Broadening Reissue. | — |
| File PCT. | Create new PCT record |
| File National Stage. | Create new National Stage record |
| Do Not Foreign File. | — |
| Do Not File National Stage. | — |
| No options | — |

If the WA selects the history button of display 5600, an asset transaction history view is displayed, such as is shown in FIG. 57.

FIG. 57 is a display diagram showing a sample display 5700 presented by the facility in connection with an asset transaction history interface in some embodiments. The display 5700 displays certain information, such as the Deal, the WA docket number, the country, the status, the application number, the patent number, the title, and other information, in non-editable fields. The display 5700 also displays information in the following table in columns:

| Asset Transaction History View, Columns | |
|---|---|
| Column | Source |
| Submission Date | The date the law firm user submitted the action response request |
| Submitted By | The law firm user that submitted the action response request |
| Action Type | The action response requested by the law firm user |
| Action Due Date | The due date entered by the law firm user for this action response request |
| Status | "Incomplete" - Action Response Request submitted, working attorney has not responded<br>"Complete" - Working Attorney has completed the action response |
| Working Attorney | Working Attorney from database field "Working Attorney" |

An OC and/or a WA can select an individual asset history record, and navigate to the action response view display 5600 of FIG. 56. If the status of the individual asset history record is incomplete, then the WA can process the response as normal. An OC, however, may have read-only access and not be able to view certain fields, such as the overall quality, the legal quality, the timeliness, the strategic thinking, notes, and time spent. If the status of the individual asset history record is complete, then the response would be read-only for both WAs and OCs.

Master Diligence Review (MDR)

The MDR is a process that discovers the full family of an asset. For example, if the organization is trying to acquire an asset that is a U.S. patent, it would be useful to know, for various purposes, if the asset has family members such as parent patents or applications and/or child patents or applications. The output of the MDR process is the Diligence Sheet, such as is shown in FIG. 30.

In some embodiments, the MDR process is performed by three components. The first component is an agent to gather the necessary information. The second component is a data store to maintain the information and track the progress of the agent. The third component is an API to queue requests, check their status, and retrieve the results.

The agent is a service that retrieves information from web-based data sources (e.g., the USPTO website). The agent duplicates the requests that a standard web browser makes for information from web-based data sources. In some embodiments, the agent controls the rate of requests. In the event that a request fails, the agent can retry the request at regular intervals. The data store is a database that keeps the information gathered from various sources in a consistent format. One problem with web-based data sources is that they often do not present a coherent view of a family. Therefore, in some embodiments the facility combines data from various web-based data sources to obtain a coherent view. In some embodiments, the facility source-tags data to allow business logic to choose the best source of information. Additionally, the store can allow for easy cleanup of old or stale data. The API is available for the submission of new matter requests, requests for status, and for the retrieval of request results.

Figure 58A:
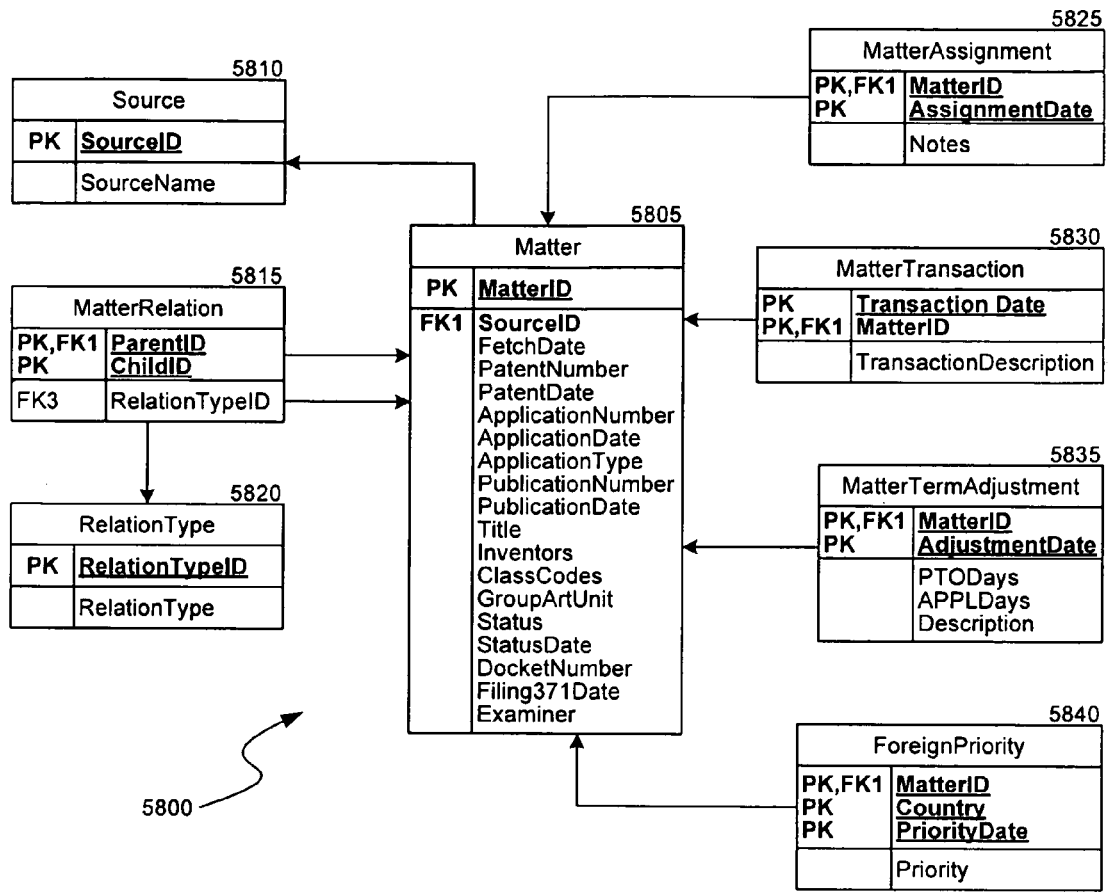
FIGS. 58A and 58B are database diagrams showing data structures implemented by the facility for a Master Diligence Review process in some embodiments.
Figure 58B:
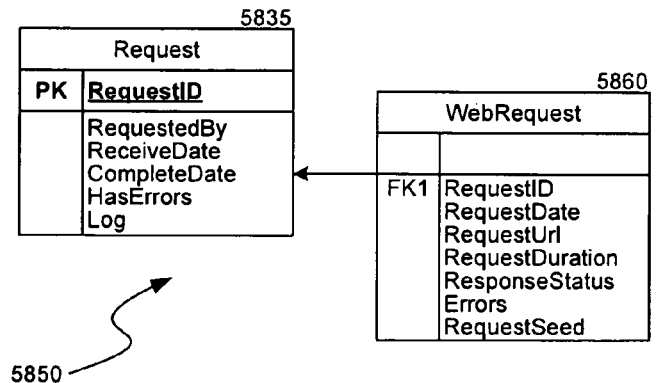

FIGS. 58A and 58B are database diagrams showing data structures implemented by the facility for a Master Diligence Review process in some embodiments. FIG. 58A is a database diagram of a schema 5800 for the data store, and FIG. 58B is a database diagram of a schema 5850 for the request queue used by the retrieval API.

In some embodiments, the agent scans the request table 5855 for new requests. When a request is queued, the agent requests and parses the information, storing it in the data store. Also, each request is logged with a status. If there are rules that limit the request, they are applied by the agent. The agent can access various web-based data sources in order to obtain family member information about an asset. These web-based data sources include the USPTO Public Pair website, the USPTO Patent Assignments website, and the USPTO issued patent and published applications website. For example, the agent can obtain information about an asset's parents and children from the continuity tab of the USPTO Public Pair website, and store this information in the Matter-Relation table 5815.

While FIGS. 58A and 58B show tables whose contents and organization are designed to make them more comprehensible by a human reader, those skilled in the art will appreciate that actual data structures used by the facility to store this information may differ from the tables shown, in that they, for example, may be organized in a different manner; may contain more or less information than shown; may be compressed and/or encrypted; etc.

Operating Environment

Figure 59:
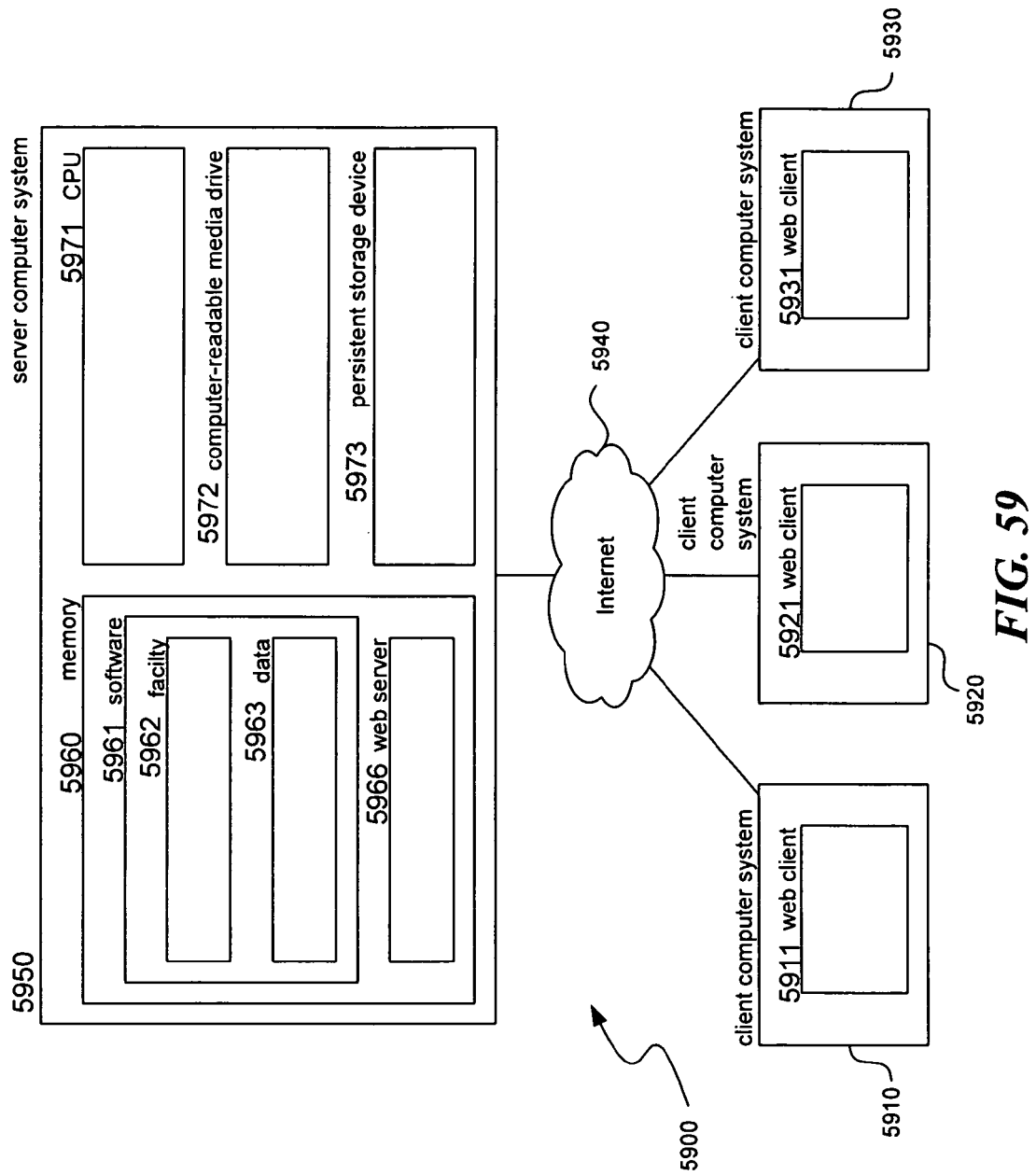
FIG. 59 is a block diagram showing a typical environment in which the facility operates in some embodiments.

FIG. 59 is a high-level block diagram showing a typical environment 5900 in which the facility operates in some embodiments. The block diagram shows several client computer systems, such as client computer systems 5910, 5920, and 5930. Each of the client computer systems includes a web client computer program for browsing the World Wide Web, such as web clients 5911, 5921, and 5931. The client computer systems are connected via the Internet 5940 to a server computer system 5950 hosting the facility. Those skilled in the art will recognize that client computer systems could be connected to the server computer system by networks other than the Internet, however.

The server computer system 5950 includes a memory 5960. The memory 5960 includes software 5961 incorporating both the facility 5962 and data 5963 typically used by facility. The memory further includes a web server computer program 5966 for delivering web pages in response to requests from web clients. While items 5962 and 5963 are stored in memory while being used, those skilled in the art will appreciate that these items, or portions of them, maybe be transferred between memory and a persistent storage device 5973 for purposes of memory management and data integrity. The server computer system further includes one or more central processing units (CPU) 5971 for executing programs, such as programs 5961, 5962, and 5966, and a computer-readable medium drive 5972 for reading information or installing programs such as the facility from computer-readable media, such as a floppy disk, a CD-ROM, a DVD, or a USB flash drive.

CONCLUSION

While various embodiments are described in terms of the environment described above, those skilled in the art will appreciate that the facility may be implemented in a variety of other environments including a single, monolithic computer system, as well as various other combinations of computer systems or similar devices connected in various ways. In various embodiments, a variety of computing systems or other different client devices may be used in place of the web client computer systems, such as mobile phones, personal digital assistants, televisions, cameras, etc.

It will be appreciated by those skilled in the art that the above-described facility may be straightforwardly adapted or extended in various ways. For example, the facility may enable the division of the process of finding, acquiring, and maintaining assets into stages other than the nine stages described herein. While the foregoing description makes reference to particular embodiments, the scope of the invention is defined solely by the claims that follow and the elements recited therein.

We claim:

1. A method in a computing system having a processor and a memory for enabling users to find and acquire intellectual property assets, comprising:

receiving an indication of a first set of potentially acquirable intellectual property assets;

receiving an indication of pre-determined qualification criteria used to determine whether potentially acquirable intellectual property assets fall within one or more sets of assets that a first organization desires to obtain;

determining, by the computing system, whether each of one or more of the potentially acquirable intellectual property assets of the first set is qualified based on the pre-determined qualification criteria, wherein potentially acquirable intellectual property assets of the first set that satisfy the pre-determined qualification criteria are qualified and wherein potentially acquirable intellectual property assets of the first set that do not satisfy the pre-determined qualification criteria are not qualified;

receiving an indication of a valuation attributed to one or more of the qualified potentially acquirable intellectual property assets of the first set, wherein the valuation attributed to one or more of the qualified potentially acquirable intellectual property assets of the first set is determined at least in part by a review of one or more of the potentially acquirable intellectual property assets of the first set;

providing, by the computing system, information regarding one or more of the qualified potentially acquirable intellectual property assets of the first set to a user for use in negotiating the acquisition of one or more of the potentially acquirable intellectual property assets of the first set; and identifying a second set of intellectual property assets other than the potentially acquirable intellectual property assets of the first set, wherein each identified intellectual property asset of the second set is identified based at least in part on a relationship between the identified intellectual property asset of the second set and one or more of the potentially acquirable intellectual property assets of the first set, wherein the relationship serving as the basis for identifying at least one of the identified intellectual property assets of the second set is a common inventor or common assignee between the at least one of the identified intellectual property assets of the second set and one or more of the potentially acquirable intellectual property assets of the first set.

2. The method of claim 1 wherein the potentially acquirable intellectual property assets of the first set include at least one of a U.S. patent, a U.S. patent application, a non-U.S. patent, and a non-U.S. patent application.

3. The method of claim 1, further comprising:
providing information regarding the identified intellectual property assets of the second set to the user for use in negotiating the acquisition of one or more of the potentially acquirable intellectual property assets of the first set.

4. The method of claim 1, further comprising:
receiving an indication of a third set of potentially acquirable intellectual property assets;
identifying intellectual property assets other than the potentially acquirable intellectual property assets of the third set that are each related to one or more of the potentially acquirable intellectual property assets of the third set; and
providing information regarding one or more of the potentially acquirable intellectual property assets of the third set and the identified related intellectual property assets to the user for use in negotiating the acquisition of one or more of the third set of potentially acquirable intellectual property assets.

5. The method of claim 1, further comprising receiving information regarding a problem associated with one of the potentially acquirable intellectual property assets of the first set.

6. The method of claim 5, further comprising flagging the problematic potentially acquirable intellectual property asset as not acquirable.

7. The method of claim 5, further comprising producing a report identifying the problem associated with the problematic potentially acquirable intellectual property asset.

8. The method of claim 5, further comprising receiving information regarding a resolution of the problem associated with the problematic potentially acquirable intellectual property asset.

9. The method of claim 1, further comprising receiving details to be included in a legal contract to acquire one or more of the potentially acquirable intellectual property assets of the first set.

10. The method of claim 1, further comprising producing a legal contract to acquire one or more of the potentially acquirable intellectual property assets of the first set.

11. The method of claim 1 wherein the indication of the first set of potentially acquirable intellectual property assets is received from an owner of one or more of the potentially acquirable intellectual property assets of the first set.

12. The method of claim 1 wherein the indication of the first set of potentially acquirable intellectual property assets is received from a prospective buyer of one or more of the potentially acquirable intellectual property assets of the first set.

13. The method of claim 1 wherein the indication of the first set of potentially acquirable intellectual property assets is received from a party other than an owner of or a prospective buyer of one or more of the potentially acquirable intellectual property assets of the first set.

14. The method of claim 1 wherein the review is a legal review of one or more of the potentially acquirable intellectual property assets of the first set.

15. The method of claim 1, further comprising receiving information regarding a third set of potentially acquirable intellectual property assets, wherein each of the potentially acquirable intellectual property assets of the third set is related to at least one of the potentially acquirable intellectual property assets of the first set.

16. The method of claim 15 wherein the relationship between at least one of the potentially acquirable intellectual property assets of the third set and a potentially acquirable intellectual property asset of the first set is based at least in part upon classifications of the potentially acquirable intellectual property assets of the first and third sets.

17. A computing system for enabling users to find and acquire intellectual property assets, comprising:
  a receiving element configured to receive an indication of a first set of potentially acquirable intellectual property assets;
  a processor configured to determine whether each of one or more of the potentially acquirable intellectual property assets is qualified based on pre-determined qualification criteria, wherein potentially acquirable intellectual property assets of the first set that satisfy the pre-determined qualification criteria are qualified and wherein potentially acquirable intellectual property assets of the first set that do not satisfy the pre-determined qualification criteria are not qualified;
  a receiving element configured to receive an indication of one or more valuations attributed to the potentially acquirable intellectual property assets, wherein the one or more valuations attributed to one or more of the potentially acquirable intellectual property assets of the first set are determined at least in part by a review of one or more of the potentially acquirable intellectual property assets of the first set; and
  an output element configured to output information regarding one or more of the potentially acquirable intellectual property assets to a user for use in negotiating the acquisition of one or more of the potentially acquirable intellectual property assets; and
  an identification element configured to identify a second set of intellectual property assets other than the potentially acquirable intellectual property assets of the first set, wherein each identified intellectual property asset of the second set is identified based at least in part on a relationship between the identified intellectual property asset of the second set and one or more of the potentially acquirable intellectual property assets of the first set, wherein the relationship serving as the basis for identifying at least one of the identified intellectual property assets of the second set is a common inventor or common assignee between the at least one of the identified intellectual property assets of the second set and one or more of the potentially acquirable intellectual property assets of the first set.

18. The computing system of claim 17, further comprising a determining element configured to determine if the potentially acquirable intellectual property assets are related to other intellectual property assets.

19. The computing system of claim 17, further comprising a receiving element configured to receive information regarding a problem associated with a potentially acquirable intellectual property asset.

20. The computing system of claim 17, further comprising a receiving element configured to receive details to be included in a legal contract to acquire one or more of the potentially acquirable intellectual property assets.

21. The computing system of claim 17 wherein the indication of the first set of potentially acquirable intellectual property assets is received from an owner of one or more of the potentially acquirable intellectual property assets.

22. The computing system of claim 17 wherein the indication of the first set of potentially acquirable intellectual property assets is received from a prospective buyer of one or more of the potentially acquirable intellectual property assets.

23. A computer-readable storage device storing instructions capable of causing a computing system having a processor and a memory to enable users to perform operations for finding and acquiring intellectual property assets, the operations comprising:
  receiving an indication of a first set of potentially acquirable intellectual property assets;
  qualifying one or more of the potentially acquirable intellectual property assets of the first set using at least one pre-determined qualification criterion, wherein intellectual property assets of the first set that satisfy the at least one pre-determined qualification criterion are qualified and wherein intellectual property assets of the first set that do not satisfy the at least one pre-determined qualification criterion are not qualified;
  receiving an indication of one or more valuations attributed to one or more of the potentially acquirable intellectual property assets of the first set, wherein the one or more valuations attributed to one or more of the potentially acquirable intellectual property assets of the first set are determined at least in part by a review of one or more of the potentially acquirable intellectual property assets of the first set;
  providing information regarding one or more of the potentially acquirable intellectual property assets of the first set to a user for use in negotiating the acquisition of one or more of the potentially acquirable intellectual property assets of the first set; and
  identifying a second set of intellectual property assets other than the potentially acquirable intellectual property assets of the first set, wherein each identified intellectual property asset of the second set is identified based at least in part on a relationship between the identified intellectual property asset of the second set and one or more of the potentially acquirable intellectual property assets of the first set, wherein the relationship serving as the basis for identifying at least one of the identified intellectual property assets of the second set is a common inventor or common assignee between the at least one of the identified intellectual property assets of the second set and one or more of the potentially acquirable intellectual property assets of the first set.

24. The computer-readable storage device of claim 23 wherein the potentially acquirable intellectual property assets of the first set include at least one of a U.S. patent, a U.S. patent application, a non-U.S. patent, and a non-U.S. patent application.

25. The computer-readable storage device of claim 23, the operations further comprising:
  identifying intellectual property assets other than the potentially acquirable property assets of the first set that are each related to one or more of the potentially acquirable intellectual property assets of the first set; and
  providing information regarding the identified related intellectual property assets to the user for use in negotiating the acquisition of one or more of the potentially acquirable intellectual property assets of the first set.

26. The computer-readable storage device of claim 23, the operations further comprising:
  receiving an indication of a third set of potentially acquirable intellectual property assets;
  identifying intellectual property assets other than the potentially acquirable intellectual property assets of the third set that are each related to one or more of the potentially acquirable intellectual property assets of the third set; and providing information regarding one or more of the potentially acquirable intellectual property assets of the third set and the identified related intellectual property assets to the user for use in negotiating the acquisition of one or more of the third set of potentially acquirable intellectual property assets.

27. The computer-readable storage device of claim 23, the operations further comprising receiving information regarding a problem associated with one of the potentially acquirable intellectual property assets of the first set.

28. The computer-readable storage device of claim 27, the operations further comprising flagging the problematic potentially acquirable intellectual property asset as not acquirable.

29. The computer-readable storage device of claim 27, the operations further comprising producing a report identifying the problem associated with the problematic potentially acquirable intellectual property asset.

30. The computer-readable storage device of claim 27, further comprising receiving information regarding a resolution of the problem associated with the problematic potentially acquirable intellectual property asset.

31. The computer-readable storage device of claim 23, the operations further comprising receiving details to be included in a legal contract to acquire one or more of the potentially acquirable intellectual property assets of the first set.

32. The computer-readable storage device of claim 23, the operations further comprising producing a legal contract to acquire one or more of the potentially acquirable intellectual property assets of the first set.

33. The computer-readable storage device of claim 23 wherein the indication of the first set of potentially acquirable intellectual property assets is received from an owner of one or more of the potentially acquirable intellectual property assets of the first set.

34. The computer-readable storage device of claim 23 wherein the indication of the first set of potentially acquirable intellectual property assets is received from a prospective buyer of one or more of the potentially acquirable intellectual property assets of the first set.

35. The computer-readable storage device of claim 23 wherein the indication of the first set of potentially acquirable intellectual property assets of the first set is received from a party other than an owner of or a prospective buyer of one or more of the potentially acquirable intellectual property assets of the first set.

36. The computer-readable storage device of claim 23 wherein the review is a legal review of one or more of the potentially acquirable intellectual property assets of the first set.

37. The computer-readable storage device of claim 23, further comprising receiving information regarding a third set of potentially acquirable intellectual property assets, wherein each of the potentially acquirable intellectual property assets of the third set is related to at least one of the potentially acquirable intellectual property assets of the first set.

38. The computer-readable storage device of claim 37 wherein the relationship between at least one of the potentially acquirable intellectual property assets of the third set and a potentially acquirable intellectual property asset of the first set is based at least in part upon classifications of the potentially acquirable intellectual property assets of the first and third sets.

39. The method of claim 15 wherein the relationship between at least one of the potentially acquirable intellectual property assets of the third set and a potentially acquirable intellectual property asset of the first set is based at least in part upon technology categories of the potentially acquirable intellectual property assets of the first and third sets.

40. The computer-readable storage device of claim 37 wherein the relationship between at least one of the potentially acquirable intellectual property assets of the third set and a potentially acquirable intellectual property asset of the first set is based at least in part upon technology categories of the potentially acquirable intellectual property assets of the first and third sets.

\* \* \* \* \*